US012478887B2

(12) United States Patent
Chirokov et al.

(10) Patent No.: US 12,478,887 B2
(45) Date of Patent: Nov. 25, 2025

(54) METHOD FOR MANAGING AND CONTROLLING TARGET SHOOTING SESSION AND SYSTEM ASSOCIATED THEREWITH

(71) Applicant: Blaster Digital, LLC, Orange Village, OH (US)

(72) Inventors: Valeri B. Chirokov, Orange Village, OH (US); Vladimir E. Koltunov, Saint-Petersberg (RU); Charles J. Galati, Chardon, OH (US)

(73) Assignee: Blaster Digital, LLC, Orange Village, OH (US)

( * ) Notice: Subject to any disclaimer, the term of this patent is extended or adjusted under 35 U.S.C. 154(b) by 253 days.

(21) Appl. No.: 18/009,636

(22) PCT Filed: Jun. 11, 2021

(86) PCT No.: PCT/US2021/036989
§ 371 (c)(1),
(2) Date: Dec. 9, 2022

(87) PCT Pub. No.: WO2021/252884
PCT Pub. Date: Dec. 16, 2021

(65) Prior Publication Data

US 2023/0226454 A1 Jul. 20, 2023

Related U.S. Application Data

(60) Provisional application No. 63/038,383, filed on Jun. 12, 2020.

(51) Int. Cl.
*A63F 13/837* (2014.01)
*A63F 13/219* (2014.01)
(Continued)

(52) U.S. Cl.
CPC .......... *A63F 13/837* (2014.09); *A63F 13/219* (2014.09); *A63F 13/245* (2014.09);
(Continued)

(58) Field of Classification Search
CPC .... A63F 13/837; A63F 13/219; A63F 13/245; A63F 13/358; A63F 13/46; A63F 13/655
See application file for complete search history.

(56) References Cited

U.S. PATENT DOCUMENTS 8,978,287 B1 * 3/2015 Riley .................... F41G 11/004 42/141
9,129,356 B2 * 9/2015 Dougal ................ G06V 10/751
(Continued)

OTHER PUBLICATIONS

Jhunjhunwala, Rohit K., "Projector Camera Applications: Shooting Range Simulation", M. Tech. Project 2nd Stage Report, Jan. 9, 2006 (Retrieved on Aug. 11, 2021 from <URL: https://citeseerx.ist.psu.edu/viewdoc/download?doi=10.1.1.101.1738&rep=rep1&type=pdf> Entire Document.
(Continued)

*Primary Examiner* — Malina D. Blaise
(74) *Attorney, Agent, or Firm* — Lippes Mathias LLP

(57) ABSTRACT

A method for managing and controlling a target shooting session includes initiating the target shooting session includes receiving a stream of video frames; displaying a graphic image representative of the target; processing the stream of video frames to generate a series of video images; processing the series of video images to detect a target area exhibiting a difference; analyzing the target area in the consecutive video images to determine if the difference is representative of target penetration; updating the graphic image to show a graphic target penetration; determining a participant score; and updating the graphic image on the display device to show the participant score. A system for managing and controlling a target shooting session includes
(Continued)

a target assembly, a video camera, and a user computing device. In another embodiment, the system includes a target assembly, a video camera, and a non-transitory computer-readable medium storing a target shooting application program.

19 Claims, 37 Drawing Sheets

(51) Int. Cl.

| | |
|---|---|
| ***A63F 13/245*** | (2014.01) |
| ***A63F 13/358*** | (2014.01) |
| ***A63F 13/46*** | (2014.01) |
| ***A63F 13/655*** | (2014.01) |

(52) U.S. Cl.
CPC ............ *A63F 13/358* (2014.09); *A63F 13/46* (2014.09); *A63F 13/655* (2014.09)

(56) References Cited

U.S. PATENT DOCUMENTS

| | | | | |
|---|---|---|---|---|
| 9,891,028 | B2 | 2/2018 | Ghani | |
| 10,060,713 | B2 | 8/2018 | Ghani | |
| 2009/0052783 | A1* | 2/2009 | Aoki | H04N 5/147 382/209 |
| 2014/0200088 | A1* | 7/2014 | Vaioli | A63D 1/00 463/7 |
| 2014/0300088 | A1 | 10/2014 | Vaioli et al. | |
| 2015/0123346 | A1* | 5/2015 | Mason | F41J 5/02 273/371 |
| 2017/0370683 | A1* | 12/2017 | Ghani | A63F 13/837 |
| 2018/0202775 | A1* | 7/2018 | Ghani | F41J 5/14 |
| 2018/0353864 | A1* | 12/2018 | Valdez | A63F 13/46 |
| 2024/0007611 | A1* | 1/2024 | Chen | H04N 13/31 |

OTHER PUBLICATIONS

International Search Report of International Application No. PCT/US2021/036989, dated Sep. 2, 2021, 1 page.

* cited by examiner

*Flow chart for the system that records bullet hits.*

1. The camera can be mounted on the shooting booth behind the shooter.

4. Several cameras can be mounted in fixed places on the ceiling in such a way as to track the target while it moves.

METHOD FOR MANAGING AND CONTROLLING TARGET SHOOTING SESSION AND SYSTEM ASSOCIATED THEREWITH

CROSS-REFERENCE TO RELATED APPLICATION

This application claims priority to and the benefit of U.S. Provisional Patent Application Ser. No. 63/038,383, filed Jun. 12, 2020, and entitled METHOD AND APPARATUS FOR DYNAMIC RECOGNITION OF PROJECTILE PENETRATION, the contents of which are fully incorporated herein by reference.

BACKGROUND

The exemplary embodiments described herein relate to a method and apparatus for managing and controlling a target shooting session. The method and apparatus operate in conjunction with a weapon discharging (e.g., shooting, firing, launching) a projectile (e.g., bullet, round, pellet) toward the target (e.g., paper target, target card, or any suitable material easily penetrated by the projectile). The weapon may be a toy or training weapon (e.g., a BB gun, pellet gun, airsoft gun, or the like), a firearm, or any type of weapon capable of discharging projectiles. It finds particular application in user gaming systems, multiuser gaming systems, shooting lanes, shooting ranges, and training systems and will be described with particular reference thereto. However, it is to be appreciated that the method and apparatus described herein is also amenable to other like applications in which weapons are used to discharge a projectile at a target in any gaming, training, or competition environment.

Shooting sports include competitive and recreational sporting activities involving proficiency tests of accuracy, precision, and speed in shooting—the art of using various types of ranged firearms, mainly referring to man-portable guns (firearms and air guns, in forms such as handguns, rifles and shotguns) and bows/crossbows.

Different disciplines of shooting sports can be categorized by equipment, shooting distances, targets, time limits and degrees of athleticism involved. Shooting sports may involve both team and individual competition, and team performance is usually assessed by summing the scores of the individual team members. Due to the noise of shooting and the high (and often lethal) impact energy of the projectiles, shooting sports are typically conducted at either designated permanent shooting ranges or temporary shooting fields in the area away from settlements.

Shooter video games or shooters are a subgenre of action video games where the focus is almost entirely on the defeat of the character's enemies using the weapons given to the player. Usually, these weapons are firearms or some other long-range weapons, and can be used in combination with other tools such as grenades for indirect offense, armor for additional defense, or accessories such as telescopic sights to modify the behavior of the weapons. A common resource found in many shooter games is ammunition, armor or health, or upgrades which augment the player character's weapons.

Shooter games test the player's spatial awareness, reflexes, and speed in both isolated single player and networked multiplayer environments. Shooter games encompass many subgenres that have the commonality of focusing on the actions of the avatar engaging in combat with a weapon against both code-driven enemies and other avatars controlled by other players.

It is desirable to combine certain aspects of recreational and competitive shooting activities and shooter video game activities in a computer-controlled system to control and manage target shooting sessions using actual weapons, projectiles, and targets.

BRIEF DESCRIPTION

In one aspect, a method for managing and controlling a target shooting session is provided. In one embodiment, the method includes initiating a target shooting session at a user computing device in conjunction with a target shooting application program, wherein the user computing device is in operative communication with a video camera of a target shooting system, wherein the video camera is positioned such that a target is within a field of view of the video camera, wherein the target is releasably secured to a target assembly of the target shooting system, wherein the target shooting session includes a plurality of rounds, wherein a participant operates a weapon to discharge at least one projectile toward the target during each round of the target shooting session; receiving a stream of video frames from the video camera at the user computing device during the target shooting session; displaying a graphic image representative of the target on a display device associated with the user computing device; processing the stream of video frames to generate a series of video images of the target for the corresponding round; and processing the series of video images to detect a target area exhibiting a difference in consecutive video images.

In another aspect, a system for managing and controlling a target shooting session is provided. In one embodiment, the system includes a target assembly, a video camera, and a user computing device. The target assembly includes a target, a target holder configured to releasably secure the target, and a target stand configured to support the target holder and to secure the target holder in a desired position. The system is configured to permit positioning of the video camera and the target assembly such that the target is within a field of view of the video camera. The user computing device in operative communication with the video camera and configured to manage and control a target shooting session. The user computing device includes at least one processor, a storage device in operative communication with the at least one processor and storing a target shooting application program, and a display device in operative communication with the at least one processor. The at least one processor, in conjunction with the target shooting application program, is configured to initiate the target shooting session, wherein the target shooting session includes a plurality of rounds. The system is configured to enable a participant to operate a weapon to discharge at least one projectile toward the target during each round of the target shooting session. The at least one processor, in conjunction with the target shooting application program, is configured to receive a stream of video frames from the video camera during the target shooting session. The at least one processor, in conjunction with the target shooting application program, is configured to display a graphic image representation of the target on the display device. The at least one processor, in conjunction with the target shooting application program, is configured to process the stream of video frames to generate a series of video images of the target for the corresponding round. The at least one processor, in conjunction with the target shooting application program, is configured to process the series of video images to detect a target area exhibiting a difference in consecutive video images.

In another embodiment, a system for managing and controlling a target shooting session includes a target assembly, a video camera, and a non-transitory computer-readable medium storing a target shooting application program that, when executed by at least one processor, cause a user computing device in operative communication with the video camera to perform a method for managing and controlling a target shooting session. The target assembly includes a target, a target holder configured to releasably secure the target, and a target stand configured to support the target holder and to secure the target holder in a desired position. The system is configured to permit positioning of the video camera and the target assembly such that the target is within a field of view of the video camera. The method for managing and controlling a target shooting session includes initiating the target shooting session, wherein the target shooting session includes a plurality of rounds, wherein the system is configured to enable a participant to operate a weapon to discharge at least one projectile toward the target during each round of the target shooting session; receiving a stream of video frames from the video camera during the target shooting session; displaying a graphic image representative of the target on a display device associated with the user computing device; processing the stream of video frames to generate a series of video images of the target for the corresponding round; processing the series of video images to detect a target area exhibiting a difference in consecutive video images; analyzing the target area in the consecutive video images to determine if the difference is representative of target penetration by a first projectile discharged from the weapon during the corresponding round of the target shooting session; updating the graphic image on the display device to show a graphic target penetration by the first projectile after determining the difference was representative of target penetration; determining a participant score for the target shooting session based at least in part on target penetration by the first projectile; and updating the graphic image on the display device to show the participant score for the target shooting session based at least in part on target penetration by the first projectile.

In yet another aspect, a non-transitory computer-readable medium is provided. The non-transitory computer-readable medium storing a target shooting application program that, when executed by at least one processor, cause a user computing device to perform a method for managing and controlling a target shooting session in a target shooting system. The method including initiating the target shooting session, wherein the user computing device is in operative communication with a video camera of the target shooting system, wherein the video camera is positioned such that a target is within a field of view of the video camera, wherein the target is releasably secured to a target assembly of the target shooting system, wherein the target shooting session includes a plurality of rounds, wherein a participant operates a weapon to discharge at least one projectile toward the target during each round of the target shooting session; receiving a stream of video frames from the video camera during the target shooting session; displaying a graphic image representative of the target on a display device associated with the user computing device; processing the stream of video frames to generate a series of video images of the target for the corresponding round; processing the series of video images to detect a target area exhibiting a difference in consecutive video images; analyzing the target area in the consecutive video images to determine if the difference is representative of target penetration by a first projectile discharged from the weapon during the corresponding round of the target shooting session; updating the graphic image on the display device to show a graphic target penetration by the first projectile after determining the difference was representative of target penetration; determining a participant score for the target shooting session based at least in part on target penetration by the first projectile; and updating the graphic image on the display device to show the participant score for the target shooting session based at least in part on target penetration by the first projectile.

DETAILED DESCRIPTION

The various embodiments of a method and apparatus for dynamic recognition of projectile penetration of a target describe a detection system that processes and analyzes a video stream of an image of the target produced by a camera. The detection system operates in conjunction with a user discharging (e.g., shooting, firing, launching) a projectile (e.g., bullet, round, pellet) from a weapon toward a target (e.g., paper target, target card, or any suitable object at which the discharging device is aimed). The discharging device may be a firearm or any type of weapon capable of discharging projectiles. The detection system includes at least one processor for image processing of the video stream. The image processing includes searching for a fresh penetration in the shooting target by analyzing individual image frames of the video stream. The detection system searches for traces of possible damage to the target surface and selects the bullet hits among the detected target surface damage. The detection system creates a database of such hits and transmits the database to high-level software. A video subsystem uses an imaging device and high-level software to capture an image of the target for display to the shooter on a user computing device. The video subsystem can also show hits on the displayed target based on the recognition of projectile penetration. After detecting a penetration or successive penetrations of the target, the detection system can also determine a score for each shot and/or for a round of shots. The detection system can display the number of shots fired, the number of hits, and the resulting scoring to the shooter on the user computing device. Additional shooting statistics can be calculated based on the image processing and analysis of the video stream, for example, an average time between shots can be calculated based on a set of detected projectile penetration over time.

The scope of the detection system is determined by high-level software that defines the algorithms associated with the image processing and video frame analysis. The detection system can be used to save the results and view the progress of the shooting. The detection system can be used for both amateur and professional purposes. Similarly, the detection system can be used for both recreational and competitive shooting. The detection system can be used to record the results of shooting competitions. The detection system can be used to improve the skills during personal shooting practice. A shooting game for one or several participants can be built based on this detection system. The detection system can be used for law enforcement (e.g., police) or military (e.g., army) shooting practice.

Figure 1:
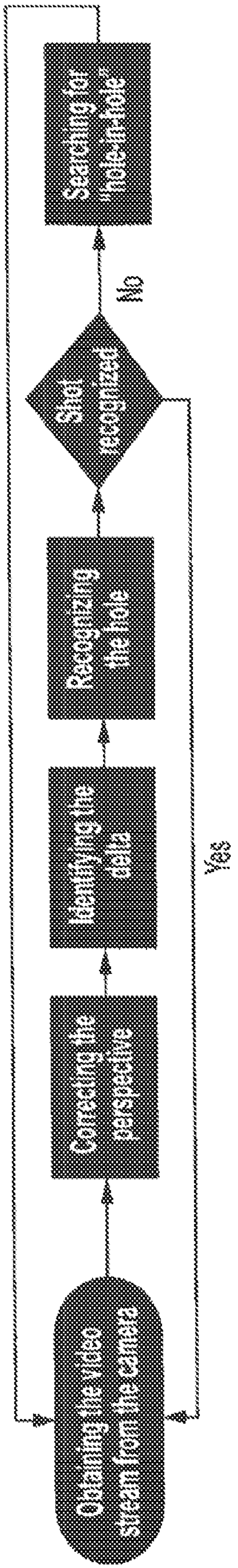
FIG. 1 is a flowchart of an exemplary embodiment of a process for dynamic recognition of projectile penetration of a target.

With reference to FIG. 1, an exemplary embodiment of a process for dynamic recognition of projectile penetration of a target is shown in a flow chart. The implemented detection system is used to detect and record hits during a target shooting session. An IP camera is aimed at a front surface of the target and recording video. The camera is installed at a desired distance from the target and at an arbitrary fixed angle to the target's surface such that the entire target is within the field of view. The camera software is continuously broadcasting a video stream of the target's surface. The video stream from the camera is processed and analyzed by the detection system. As shown if FIG. 1, the process of recognizing and analyzing bullet holes in frames of the video stream includes several stages: i) obtaining the video stream from the camera, ii) correcting the perspective, iii) identifying the delta between frames, iv) recognizing the shot hole, and v) if no hole is recognized over a predetermined time, searching for a "hole-in-hole," "bullet-to-bullet" hit.

In conjunction with "obtaining the video stream from the camera," an IP camera is used to capture the target image. The camera can be located close to the target or at a substantial distance depending, for example, on its zoom and resolution capabilities and settings. The camera used and its lens must provide a bullet hole image that is represented in a pixel resolution that permits filtering of noise levels in the video stream received from the camera. For example, the pixel resolution for a bullet hole image may be 10×10 pixels in size if the camera noise level is low enough to permit satisfactory image processing and analysis of the image. The target is mounted on a stand, a movable rail, or a frame. The target must be fixed to the stand to minimize the displacement and bending of the surface from being hit by bullets.

In conjunction with "correcting the perspective," before analyzing the image obtained in each frame, the target must be correctly displayed on a 2-dimensional plane. For this purpose, it is necessary to make sure that the target's surface plane is perpendicular to the camera lens. However, the camera cannot be positioned such that the lens is perpendicular because that location is in the firing line. For example, the camera can be raised above the perpendicular line of sight to the target, shifted to the left or right, or lowered below it. This camera shift from the perpendicular line of sight leads to a distortion of the frame's geometric perspective of the target. For example, circular targets in such frames look oval (see FIG. 2). The shape of man-sized targets and other targets are distorted as well due to the line of sight of the camera.

Figure 2:
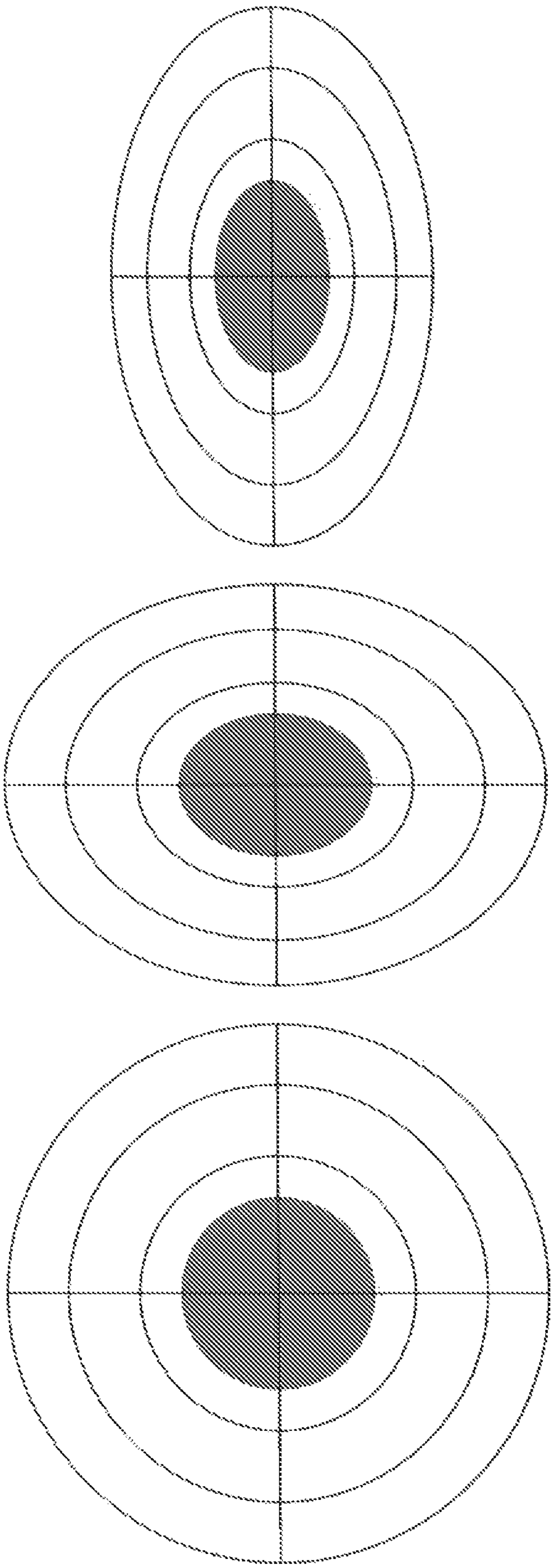
FIG. 2 shows examples of geometric distortions of a target.

With reference to FIG. 2, examples of geometric distortions of a circular target are shown. Perspective distortions lead to a loss of proportional dimensions in areas located at different distances from the camera. The same number of frame pixels are equal to different physical distances on the target sheet. Likewise, geometric distortion of the shape of a penetration (e.g., bullet hole), which depends on its location on the target, complicates the subsequent image processing and analysis. Incorrect image processing and analysis leads to erroneous detections of penetrations of the target as well as incorrect scoring for hitting the target. The correct hole geometry improves the functioning of the image processing for "hole-in-hole" recognition. Thus, the image processing includes pre-processing steps that minimize or eliminate geometric distortions. In some instances, complete elimination of geometric distortion can be achieved.

A linear mathematical transformation can be used to eliminate geometric distortions. With this type of transformation, one can relatively roughly calculate the necessary correction factor and apply it to the video frame. However, this method does not ensure the satisfactory level of accuracy, especially in real shooting conditions. The target is constantly shifted or rotated slightly by projectile hits (e.g., gunfire). For example, the correction coefficient calculated in advance of shooting may not correspond to the state (i.e., shift or rotation) of the target after the first projectile hit. Moreover, each subsequent projectile hit may further change the state of the target. To accommodate these conditions, the detection system uses specialized graphic markers (see FIG. 3) to adjust the video frame to minimize or eliminate spatial distortion.

Figure 3:
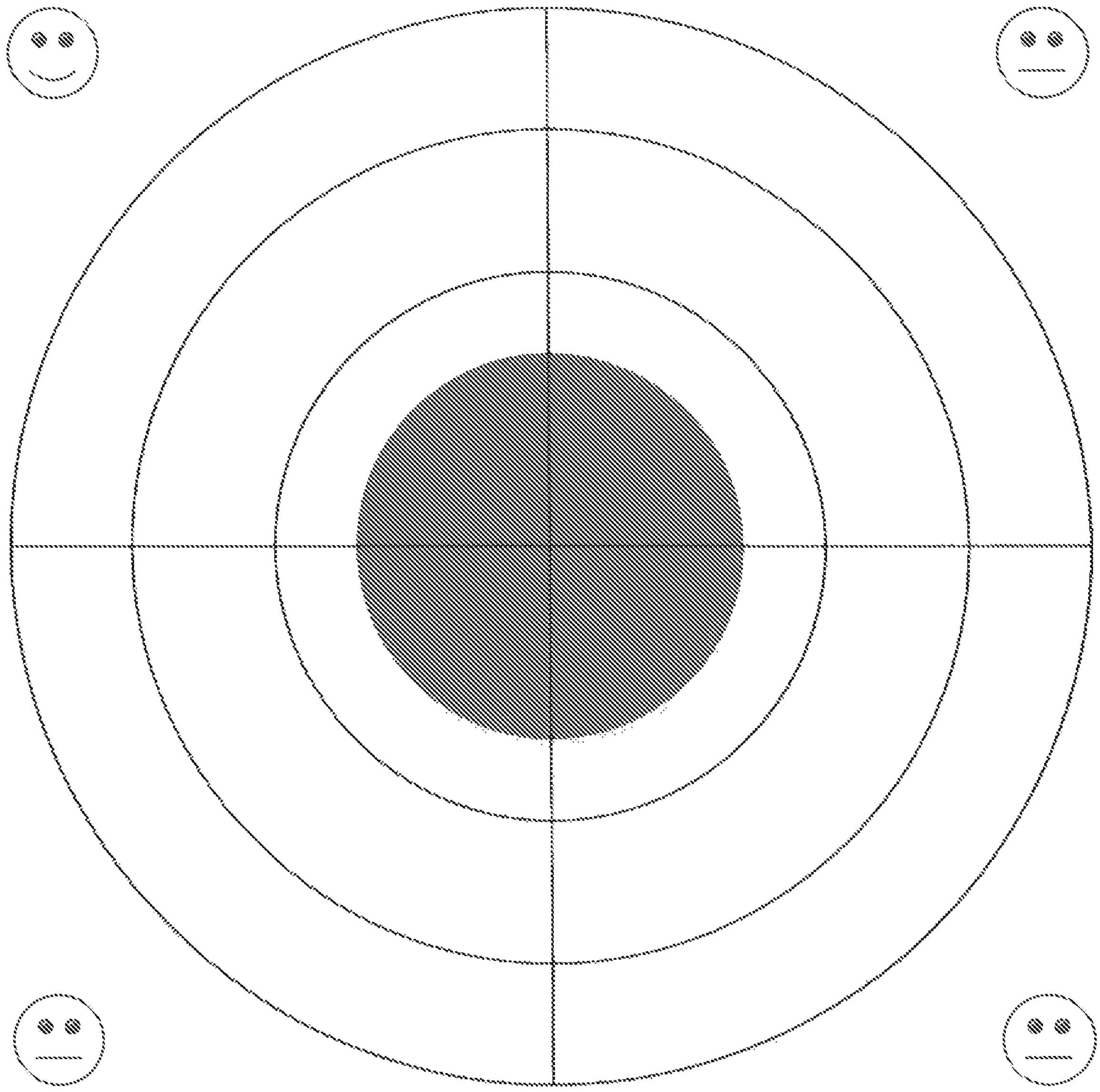
FIG. 3 shows an exemplary embodiment of a target with graphic markers.

With reference to FIG. 3, an exemplary embodiment of a target with examples of specialized graphic markers is shown. The specialized graphic markers include four or more graphic symbols easily recognizable during image processing of the video stream. Graphic symbols may be identical to each other or have a different shape. Differently shaped symbols may be used to define the sides of the target (i.e., top-bottom, left-right). Establishing reference points for the different sides is useful during the computerized analysis of non-symmetric target cards. Graphic symbols are located at known locations on the target. The image processing software recognizes image fragments of the graphic symbols in the video frame of the target. The detection system knows the exact distance between the graphic markers and their relative positioning on the target. Based on this knowledge, the image processing software performs an affine transformation of parts of the resulting video frame of the target. Different fragments of the video frame are expanded, rotated, and shifted relative to each other. The modification is carried out to restore the broken spatial perspective. The result is a video frame in which the markers are located as on the original target. This means that other fragments of the image are located at the correct distance from each other. Since all these distances are correct, the geometric shape of the target is also true.

The shots fired at the target card bend the card outwards and press the penetration area inwards. The target warps and bends, while maintaining the distance between the markers. Thus, nonlinear distortions of the target image appear in the frame. The image processing software responsible for correcting the perspective can compensate for the linear displacement of the target parts. Nonlinear distortions of the target's physical surface are not filtered out at this stage of processing. Nonlinear distortions are processed later, at the stage of contour recognition using deep learning technology.

With reference again to FIG. 1, as for "identifying the delta," after highlighting the target's working area using markers, the image processing software pre-processes the video frame. Possible noises are removed from the image in the video frame, after which an adjusted video frame image is stored in a buffer. The buffer is executed in the FIFO (First Input-First Output) stack format. Before the delta calculation procedure starts, the buffer can store a number of frames depending on its size (i.e., storage capability). Once the buffer is filled with a sequence of video frames, its contents are divided into three parts. The parts of the buffer are conditionally called "past," "now," and "future" (see FIG. 4).

Figure 4:
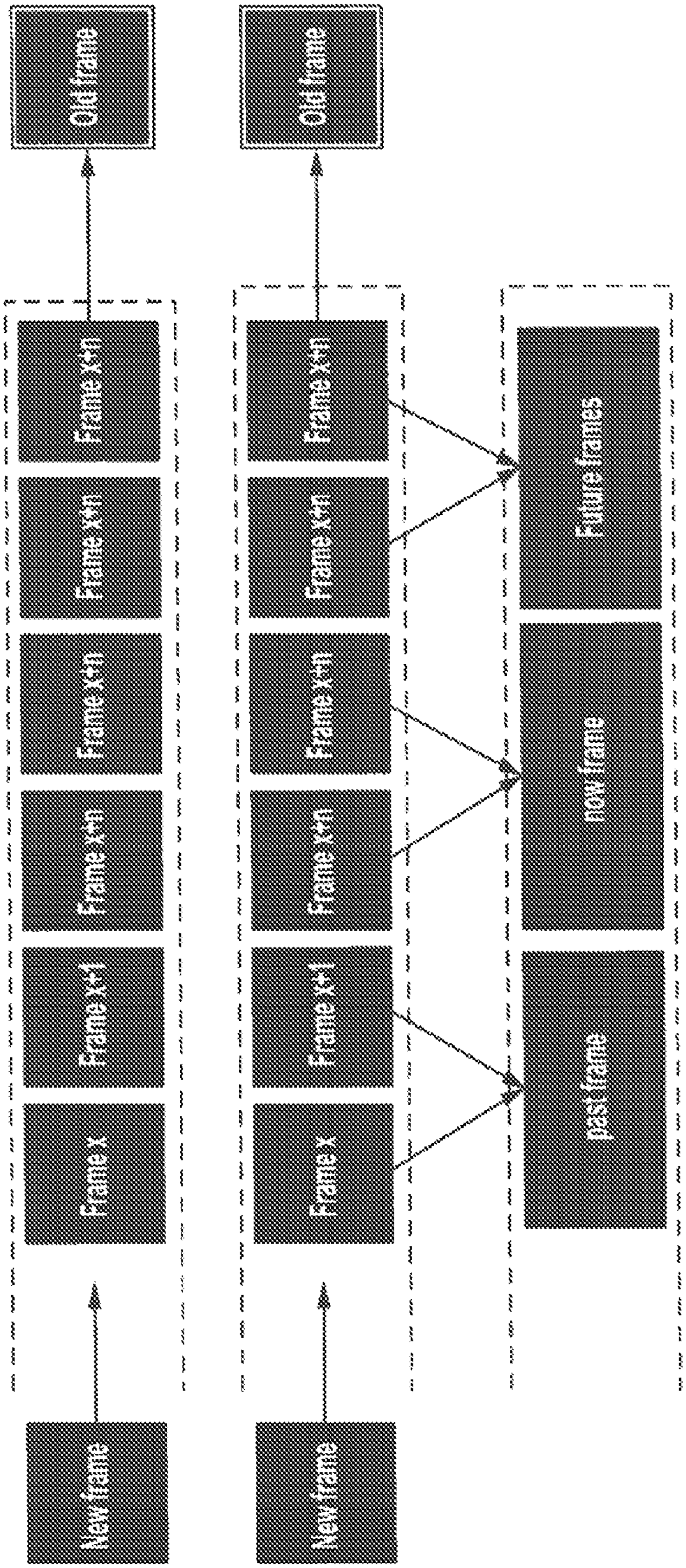
FIG. 4 is a functional diagram of an exemplary embodiment of a FIFO buffer for analyzing target frames of a target for dynamic recognition of projectile penetration of the target.

With reference to FIG. 4, an exemplary embodiment of a FIFO buffer for analyzing target frames of a target for dynamic recognition of projectile penetration of the target is shown in a functional diagram. The FIFO buffer including three parts—past frames, now frames, and future frames. Each of these three parts can consist of one or several frames. Three resulting frames are generated from these sets of frames using compensation processing techniques (averaging, median curve, and summation). These three resulting frames are involved in further processing. The delta of the two frames' contents is calculated between the frames of the "past" and the "now" using mathematical software. The difference between them is further enhanced by the mathematical operations of the software. For example, bright, clear contours may become even more contrasting. Faded contours with low brightness may remain low contrast. Such low contrast contours may represent the camera's digital noise or minor artifacts on the target's surface. The end result passes through several threshold filters, allowing estimating of the value of the detected contour. Contours that fall below a predetermined threshold value are discarded. This preliminary elimination of false positives allows the detection system to avoid overloading computing resources of the neural network by avoiding excessive processing.

As new frames are added, the buffer shifts according to the FIFO stack rule. The video frame at the top of the stack is discarded. All other frames move up one by one, and the new frame takes up a position at the beginning of the buffer. Then, the compensation routines for image processing form the three averaged frames of the "past," "now," and "future" are re-run, and the cycle repeats.

As for "recognizing the hole," the delta that passes through threshold filters is a physical artifact appearing on the real target. A neural network trained to search for contours of bullet holes distinguishes between the shot mark and various interferences. The deep learning library is pre-trained on a set of images of holes of various calibers and various types of projectiles (e.g., spherical metal or plastic balls, pellets, and cartridges). The holes used in training were located at different angles and were left from bullets shot from different weapons. The contours of such holes have a characteristic shape, uniquely identifiable by a person as a bullet hole. The neural network classifies the shape of these holes in the similar way. Contours that do not resemble the bullet mark are detected using the deep learning technology and are discarded. Such contours may be due to non-linear distortions of the target, patterns on the target's surface, or other artifacts in the image. The neural network is pre-trained on a set of specific, frequently repeated distortions and artifacts. The neural network classifies them as a mark that is not a bullet hole and excludes from further processing. If the shooter uses a non-standard weapon or a type of projectile that has not been trained, it will have a shot mark that may be unfamiliar to the neural network. In another embodiment, the image processing can include learning processes to further train the neural network in new images of bullet holes. After the neural network is trained using the new information, the detection system can begin to recognize the new shot mark. Thus, the detection system can include a machine intelligence system used can be trained and enhanced.

As for "searching for 'hole-in-hole'," to ensure the recognition software routines function properly, detection of each shot on a clean part of the target is achieved as described above. However, during actual shooting, the hole from one shot may be superimposed on the mark from another shot. Optical systems are not able to detect the absolutely accurate "bullet-to-bullet" hit. It cannot be recognized by either the human eye or the image processing software that processes the camera image. Another type of penetration is when the mark from the second bullet falls on the mark of the first in a slightly uneven way, breaking its mark. When going through the "delta search" algorithm described above, such a hit gives the changed contour of one of the previously recognized holes. At the same time, the contours of the other bullet holes remain unchanged. Under these circumstances, if the image processing software cannot find a new shot mark on the target using the detection routines described above, another routine can be launched for a lower level of recognition. The routine for the lower level of recognition may conduct a "hole-in-hole search".

The "hole-in-hole" routine scans the vicinity of all previously recorded hits in its database, searching for previously unrecorded changes in the image between the "past" frame and the "now" frame. If such a change is detected, the "hole-in-hole" routine estimates its value. If the number of changes exceeds a threshold value, the hole is entered into a database of suspects for a bullet-to-bullet hit. The hole in the "past" image is divided into small fragments consisting of groups of pixels. The software of the algorithm tries to find the fragments corresponding to them in the "now" snapshot. To do this, the algorithm uses affine transformations to track the possible "motion vector" of different parts of the hole. The target could have moved sideways or turned from bullet hits or wind exposure. The hole geometry could have also changed due to the displacement of the target. If all the motion vectors of the fragments can be projected onto a new image, then the contour will be the same hole that is shifted to the side. If the algorithm fails to superpose the location and size of the new and previous fragments, this fragment will be the mark from the new shot—the shot hitting the hole remaining from the previous hit.

Figure 5:
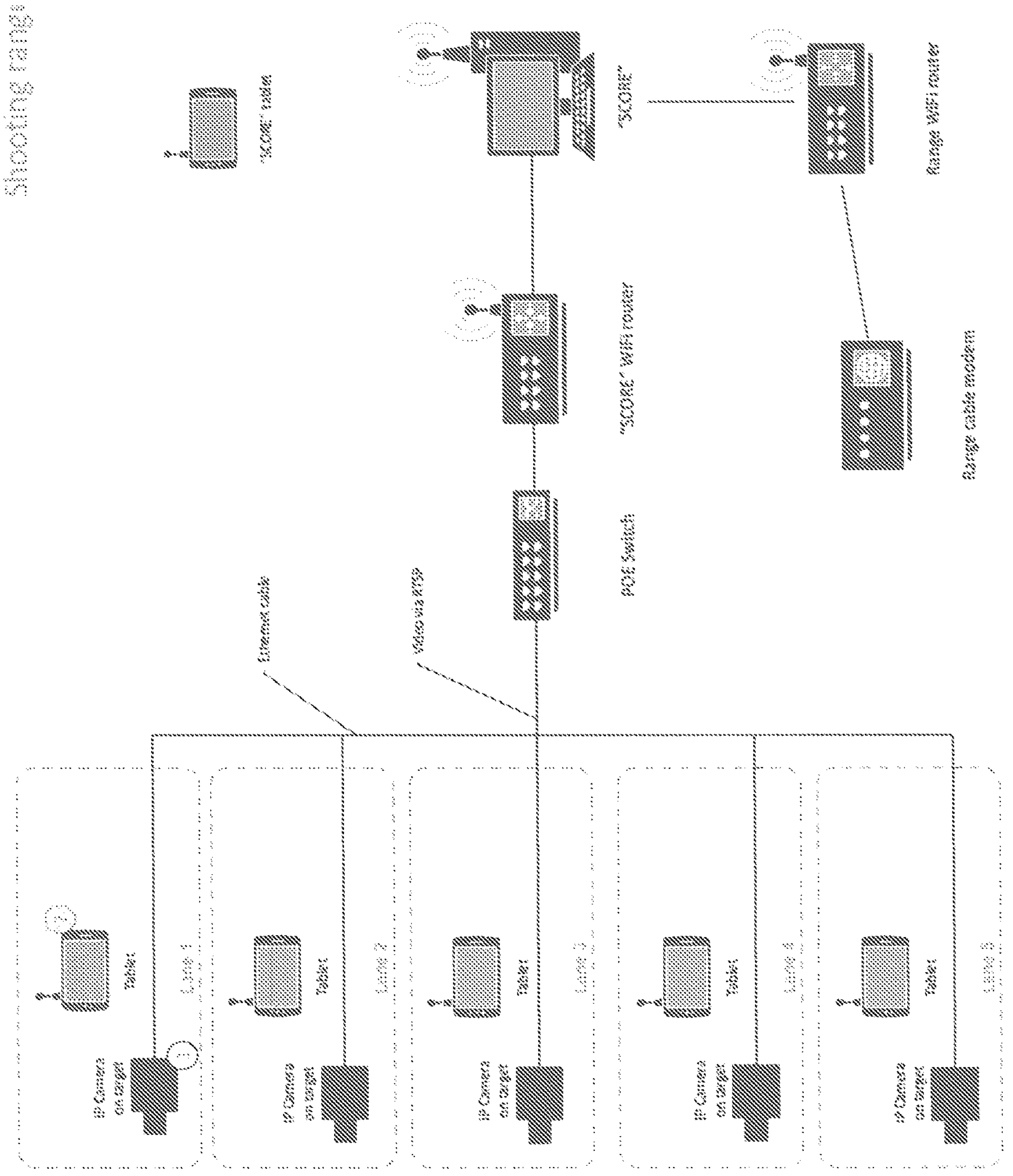
FIG. 5 is a functional diagram of an exemplary embodiment of a detection system for dynamic recognition of projectile penetration at a shooting range.

With reference to FIG. 5, an exemplary embodiment of a detection system for a shooting range or gallery is shown in a functional diagram. The detection system includes an IP video camera for each shooting booth or lane, an Ethernet switch with power over Ethernet (POE) support, a "score" Wi-Fi router, a tablet for each shooting booth or lane, a "score" tablet that lists the total score for all shooting booths, and a "score" controller computer. The detection system may be configured for external communications to remote servers and/or computing devices via a "range" Wi-Fi router and a "range" Internet access port, such as a cable modem.

Figure 6:
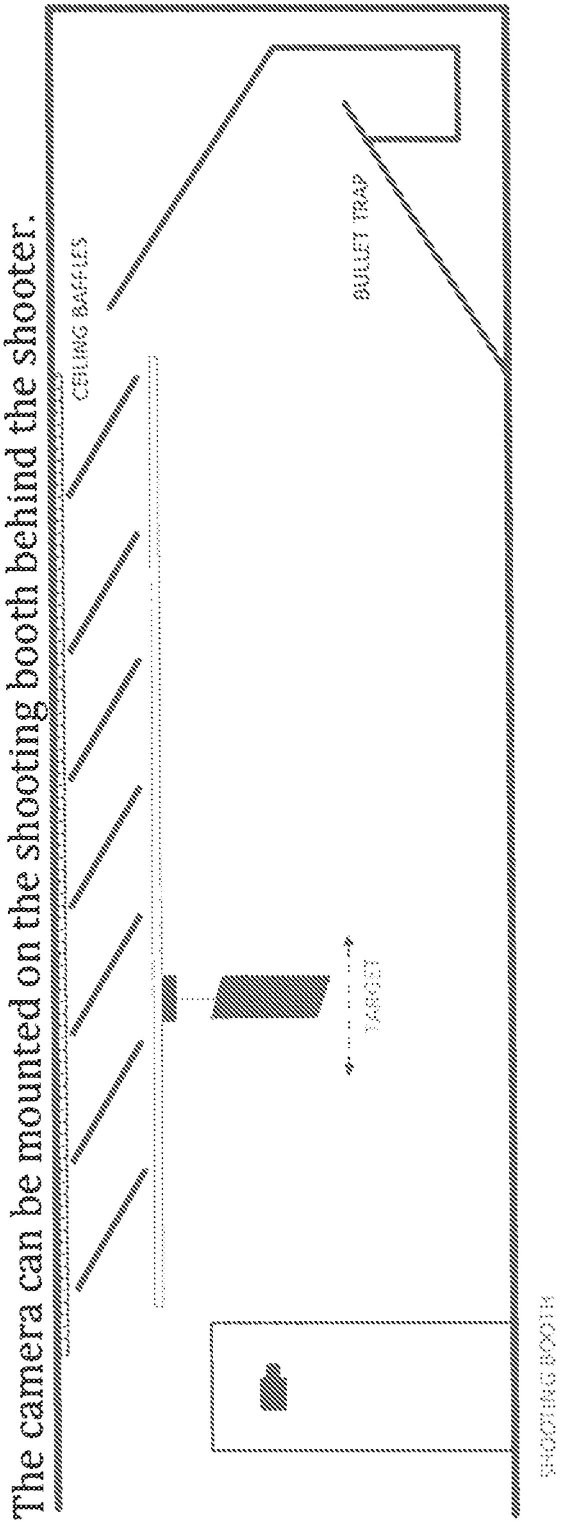
FIG. 6 is a functional diagram of an exemplary embodiment of detection system components for a shooting lane.
Figure 7:
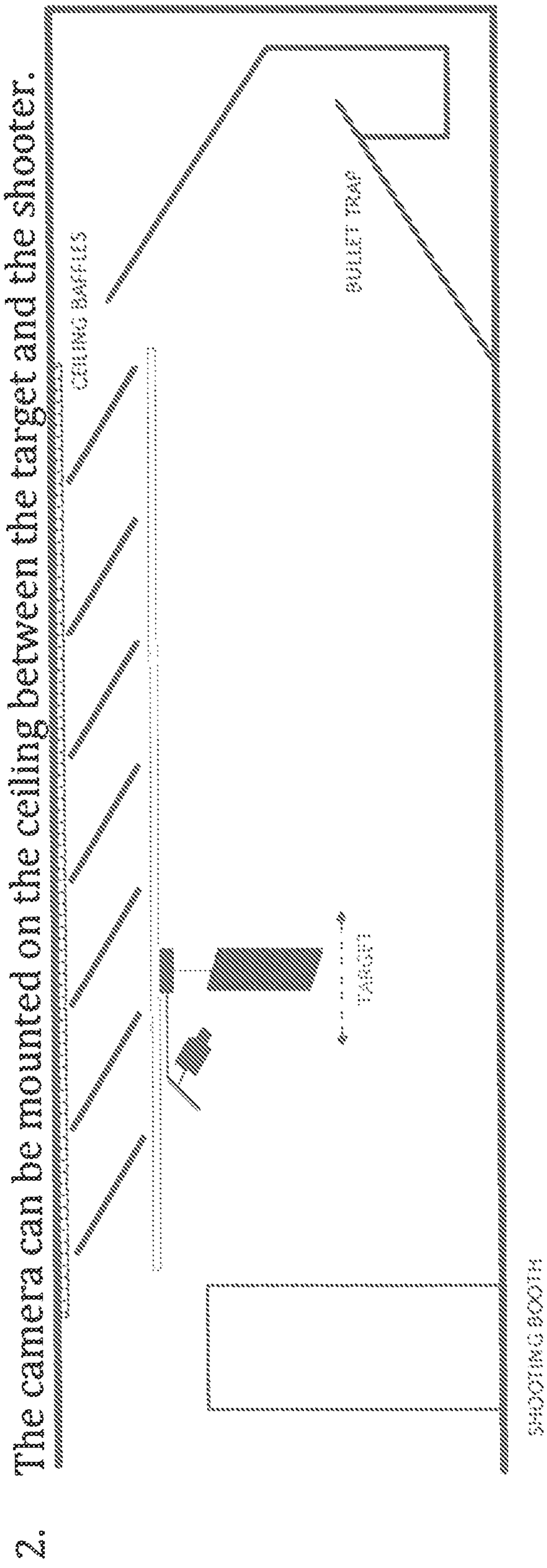
FIG. 7 is a functional diagram of another exemplary embodiment of detection system components for a shooting lane.
Figure 8:
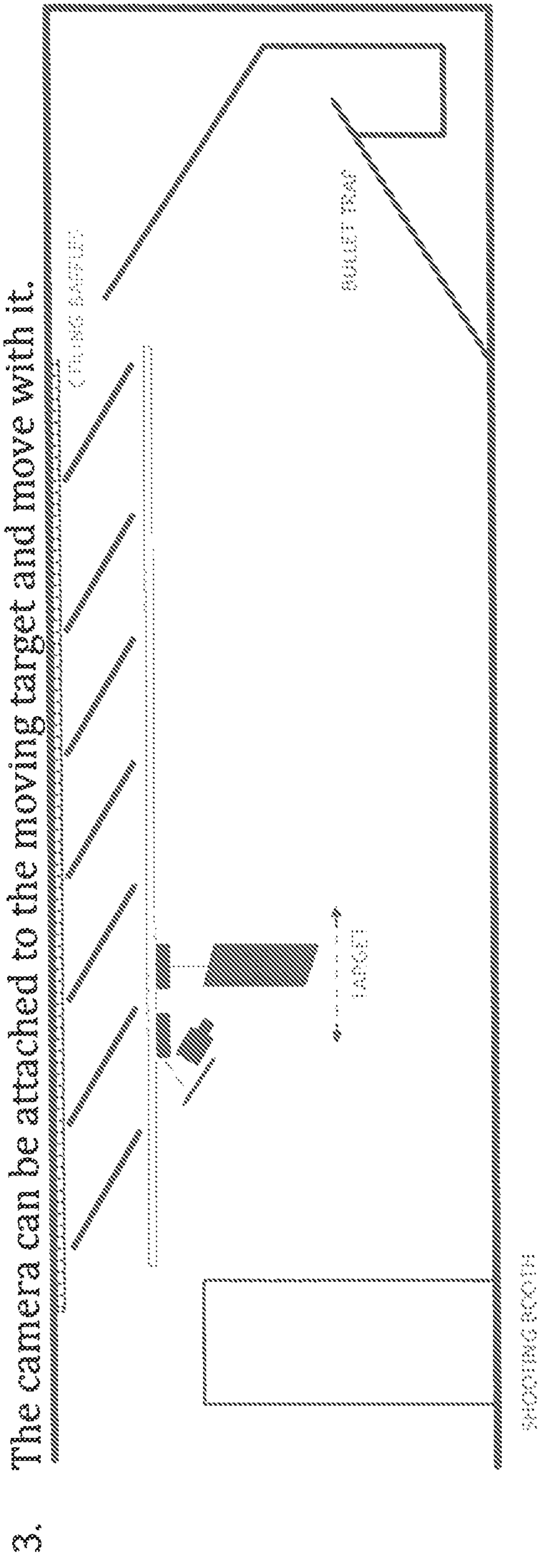
FIG. 8 is a functional diagram of yet another exemplary embodiment of detection system components for a shooting lane.
Figure 9:
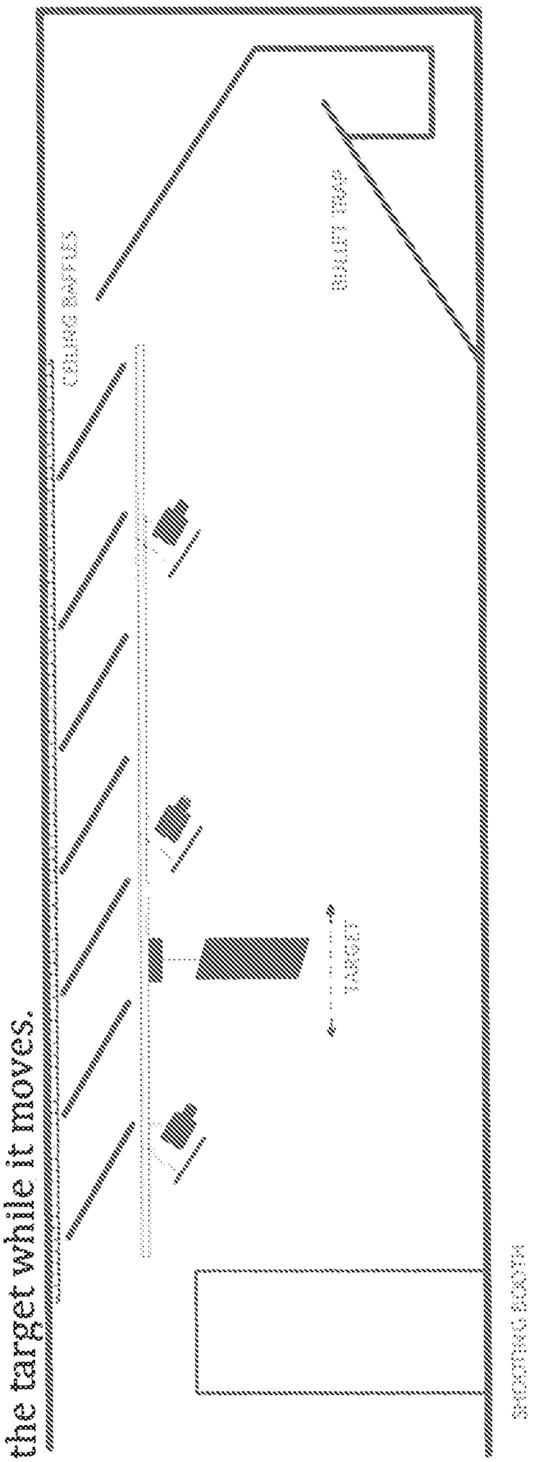
FIG. 9 is a functional diagram of still another exemplary embodiment of a detection system for shooting lane.

The IP video cameras are used to record when the bullet hits its target. The number of cameras is equal to or exceeds the number of shooting positions that are in use simultaneously. Cameras are installed opposite to each of the targets in a convenient place at a distance that is sufficient to capture the image of the target surface. The camera may be mounted in front of the target in various ways. For example, i) the camera can be mounted on the shooting booth behind the shooter (see FIG. 6); ii) the camera can be mounted on the ceiling between the target and the shooter (see FIG. 7), iii) the camera can be attached to the moving target and move with it (see FIG. 8), or iv) several cameras can be mounted in fixed places on the ceiling in such a way as to track the target while it moves (see FIG. 9).

With reference again to FIG. 5, after startup of the detection system, the cameras can broadcast the image of the corresponding target to the controller computer regardless of whether there is shooting at the moment. The detection system is essentially in standby and ready to operate. After a shot hits a given target, the detection system records the hit.

As for the Ethernet switch with POE support, in an exemplary embodiment of the detection system, the IP cameras are interconnected within a single network using an Ethernet cable and connected to the Ethernet switch. An Ethernet cable from the "score" Wi-Fi router is connected to a port on the Ethernet switch. The Ethernet cables from the IP cameras are connected to the other Ethernet switch ports. The cameras are powered via Ethernet using POE technology.

As for the "score" WI-FI router, the Wi-Fi router is a device for collecting and transmitting a video feed from the IP cameras in the detection system. The video stream from the Ethernet switch is delivered to the Wi-Fi router. The Wi-Fi router establishes a wireless connection with the "score" controller computer. The controller computer can be located anywhere it can be conveniently accessed. In addition, the Wi-Fi router provides topology support for a wired and wireless LAN for communications with tablets in the shooting booths as well as the IP cameras.

As for the shooting booth tablets, the tablets are installed in the shooting booths and indicate the individual results of the player's shooting using, for example, an arrow overlaid on a display of the target. The display shows a large image of the target, on which the bullet hits from the current session are highlighted. Players can select a table that lists the number of detected shots as well as the number and scores of hits for viewing on the display. For example, the table may be shown at one side of the display. The player can also choose the type of competition or challenge for the shooting session. The player can view the history of completed competitions on the display of the tablet.

As for the "score" tablet, this tablet lists the score for all shooting booths. For example, this tablet may be installed at a judge's post. The "score" tablet displays data about all players participating in the competition at the same time. Both judges and spectators can follow the competitions using a "score" tablet.

As for the "score" controller computer, this computer receives and processes the video feed from the IP cameras. The result of image processing is displayed on shooting booth tablets and the "score" tablet. Where the controller computer has access to the Internet, the shooting data can be transmitted to the cloud or a server that allows competitors and spectators from around the world to access the data for the competition.

Figure 10:
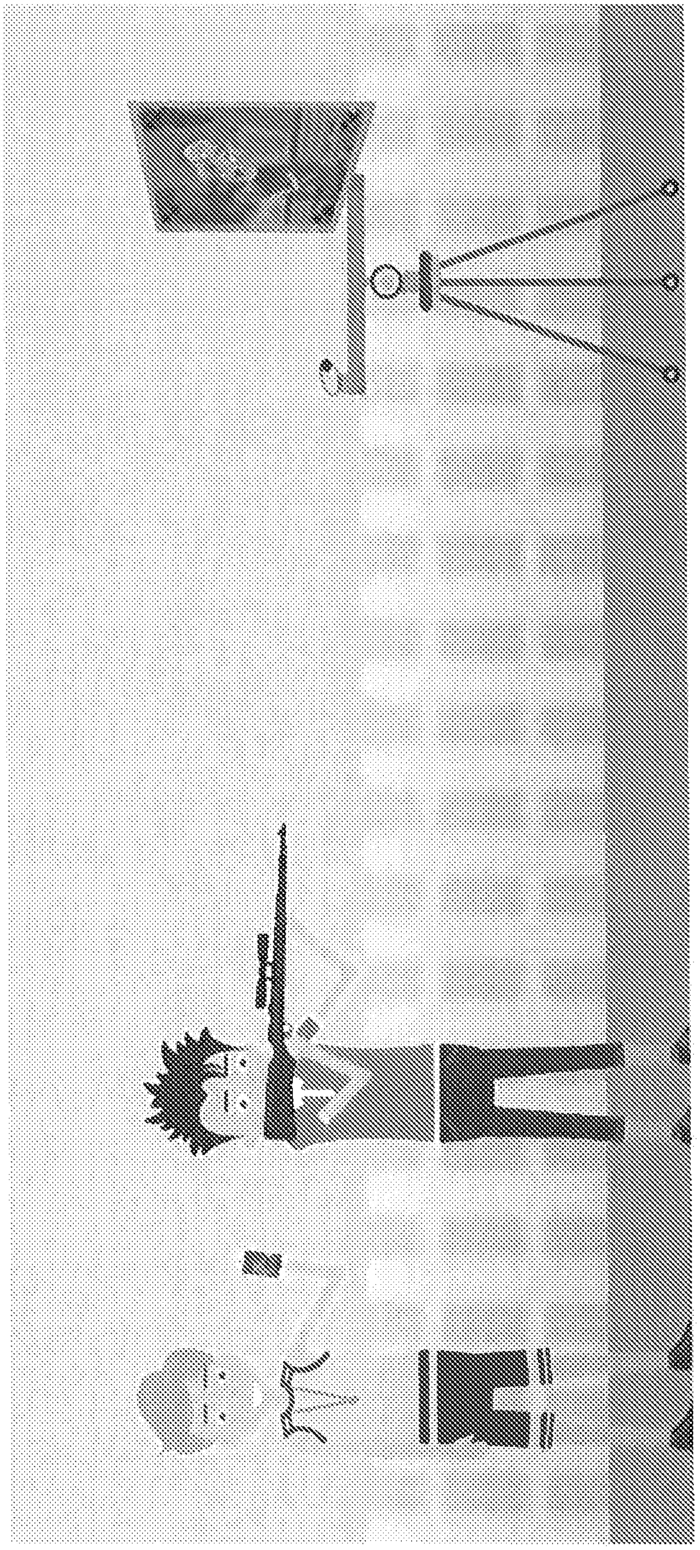
FIG. 10 is an illustration of an exemplary embodiment of a user gaming system.

With reference to FIG. 10, an exemplary embodiment of the user gaming system is illustrated. The user gaming system is configured for use as an at-home automated reality target gaming system. The gaming system includes a Wi-Fi camera, a portable stand, and a paper target holder. The built-in Wi-Fi camera system brings real targets into a virtual world, taking air guns to the next level. For example, a player can use a standard air gun with classic BB's or pellets to fire at a target. There is no need for a special rifle to use the gaming system. All targets include a unique code for a simple find and play setup. Embedded AI technology captures each shot with near real-time precision for immediate shot score and shot tracking. The user can choose from multiple targets associated with different target shooting games. The selected target is displayed on a user computing device via a target gaming app. For example, the target gaming app may be referred to as BBBlaster. The app updates the display after shots hitting the target are detected. Additional information about the hit may be displayed as well as accumulated scoring and statistics for the shooting session. The targets and games range from automated standard targets to fully animated and timed game play. With web connectivity, the user can download new targets and shooting games that are supported by the target gaming app. The user gaming system can be integrated into a multi-user gaming system that provides multi-player possibilities that can bridge the link between distant players so all players can join in a recreational or competitive target shooting game. Local target shooting games are also available with tournament style play.

Figure 11:
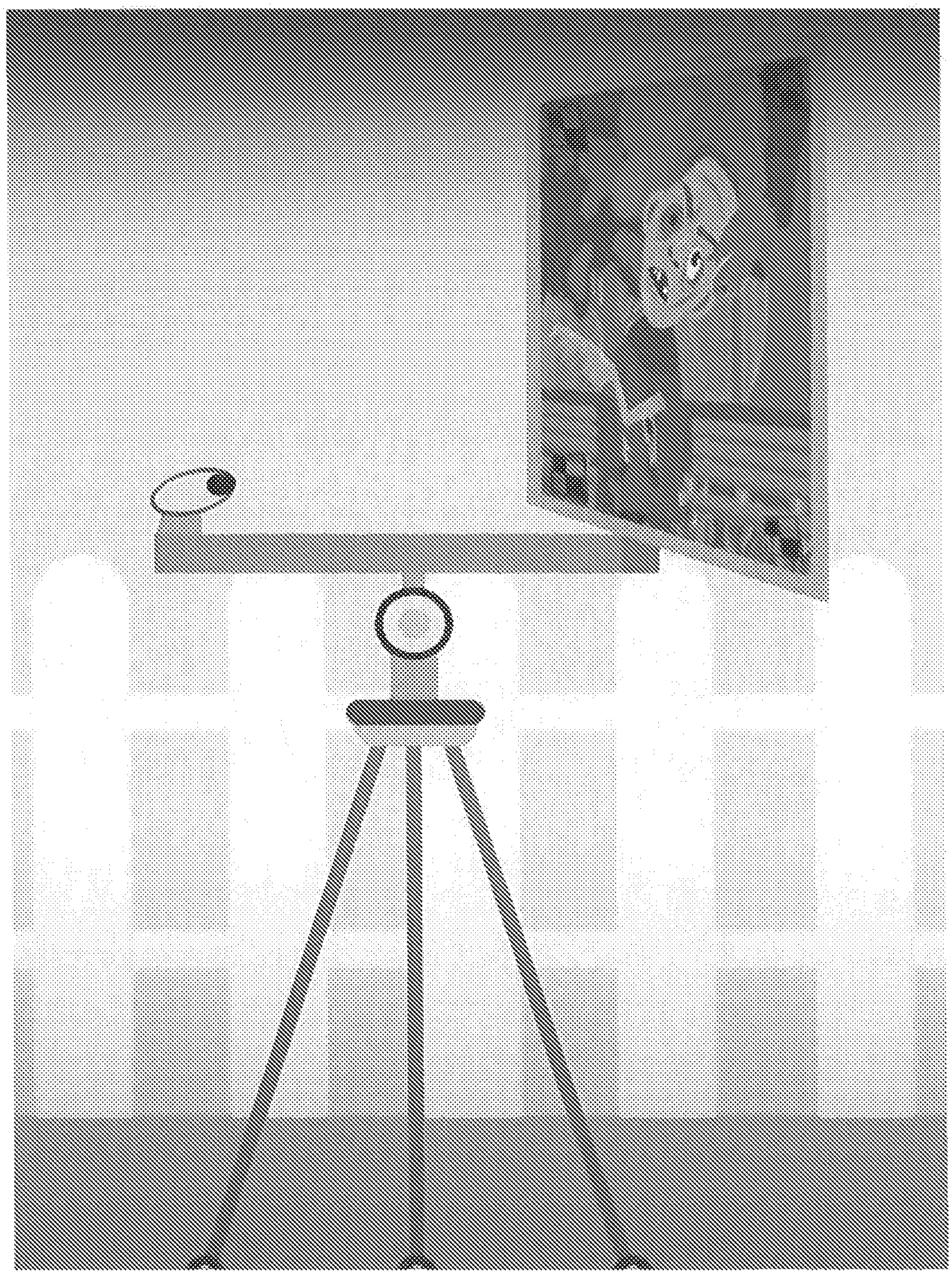
FIG. 11 is an illustration of an exemplary embodiment of a target assembly for a user gaming system.
Figure 12:
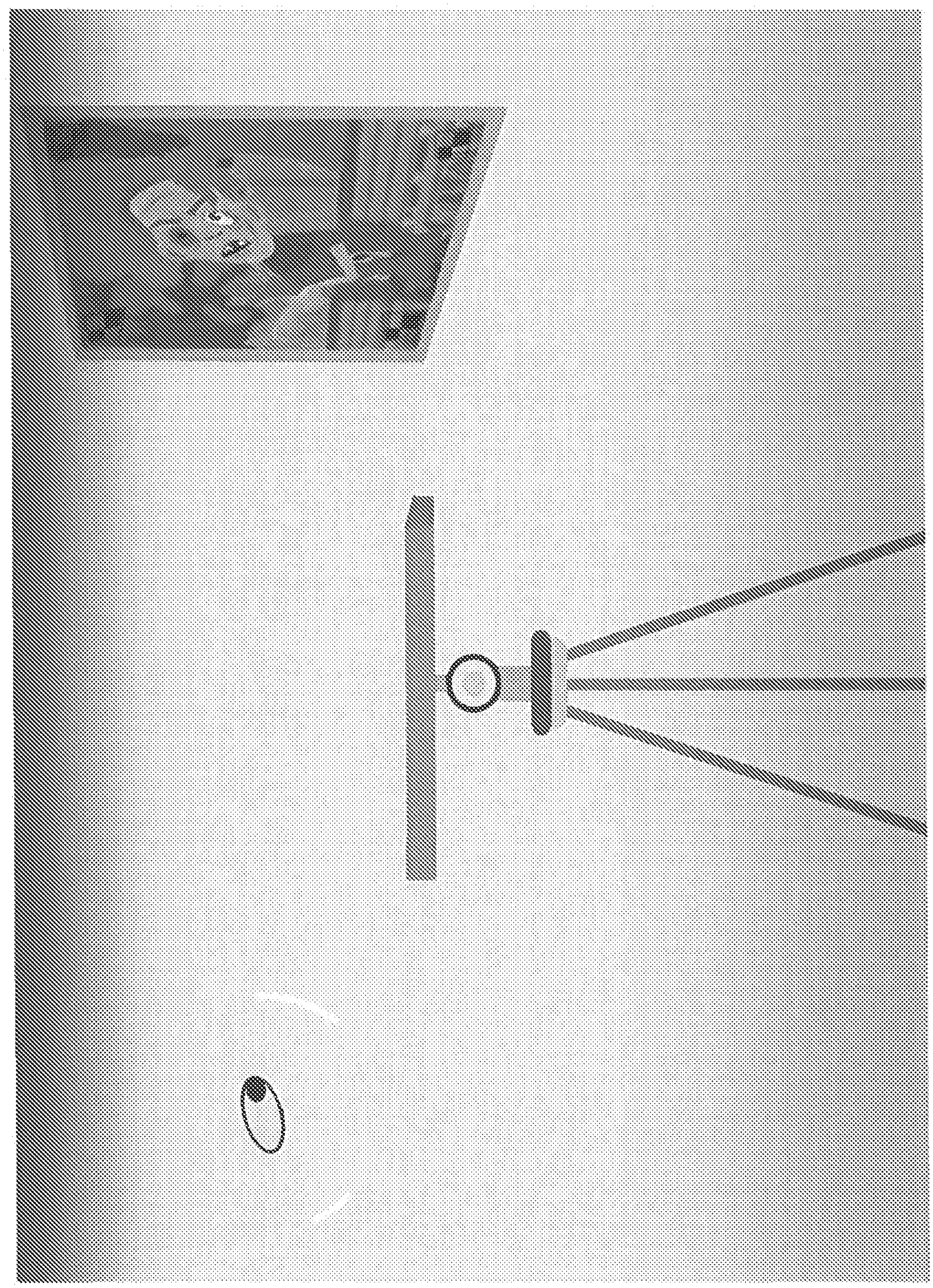
FIG. 12 is an exploded view of the target assembly of FIG. 11.
Figure 21:
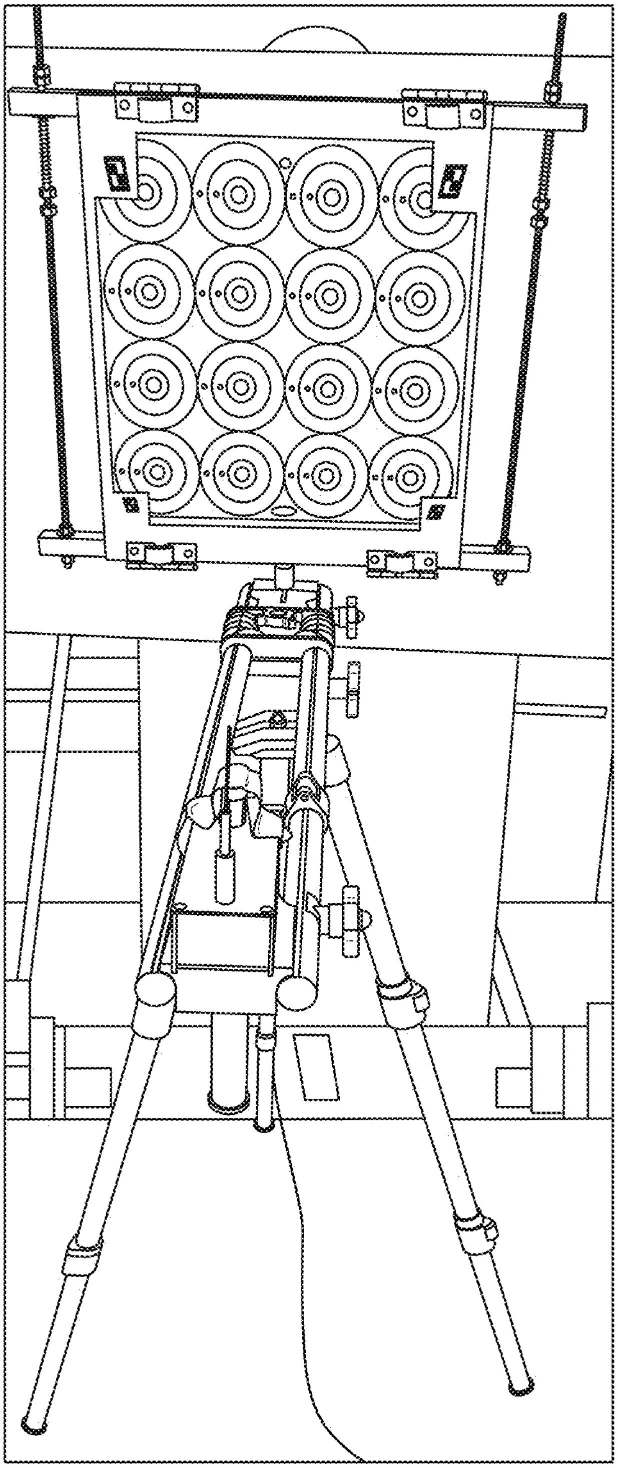
FIG. 21 shows a front view of an exemplary embodiment of a stand for the target assembly.

With reference to FIGS. 11, 12, and 21, an exemplary embodiment of a target assembly for a target gaming system is illustrated in assembled form and in an exploded view. The target assembly includes a stand, a camera, a target holder, and a target. The target holder may include a frame configured to temporarily secure the target. The stand can be based on a tripod or any suitable stable structure. The stand includes a generally horizontal member with two ends. The target holder (i.e., frame) being positioned on one end of the horizontal member and the camera being mounted on an opposing end of the horizontal member. The frame and camera ends of the horizontal member allow for each aspect to work hand-in-hand. For example, attaching hardware for the frame, the camera, or both the frame and camera may permit the position of the items to be adjusted along the horizontal member. Attaching hardware for securing the generally horizontal member to the stand may permit the horizontal member to be slid in the horizontal direction such that, for example, the camera end is closer to the stand. Similarly, the attaching hardware on the stand can be adjustable to permit the camera mount, the horizontal member mount, and/or the target holder mount to pivot such that the horizontal member is at an angle, rather than horizontal, with the camera lower than the target holder.

The frame holds the target in place while the camera is focused on the target. For example, the target can be fired at with an air propelled weapon, such as a BB gun. The camera positioned and adjusted such that a video stream from the camera capture the entire geometric dimensions of the target so that holes and marks created from shots hitting the target are present in the video stream. The stand assures that the placement of both objects allows for a suitable video stream.

The camera generates a video stream of the target and communicates the video stream to a user computing device. For example, the user computing device can be a smartphone or any computing device suitable for displaying an image processed from the video stream. Communications between the camera and the user computing device can be wireless (see FIG. 17) using Wi-Fi, Bluetooth, and any suitable wireless technology. For Wi-Fi communications, the camera or the user computing device can be configured as a Wi-Fi hotspot. The communication capability could be incorporated into the camera by the manufacturer. Alternatively, the communication capability could be added to the camera using a small single computer developed for such applications by a computer manufacturer, such as Raspberry Pi Foundation, which makes the Raspberry Pi Zero W. The camera may be powered by a rechargeable battery or an external power source. The camera can be used while it is charging.

Figure 13:
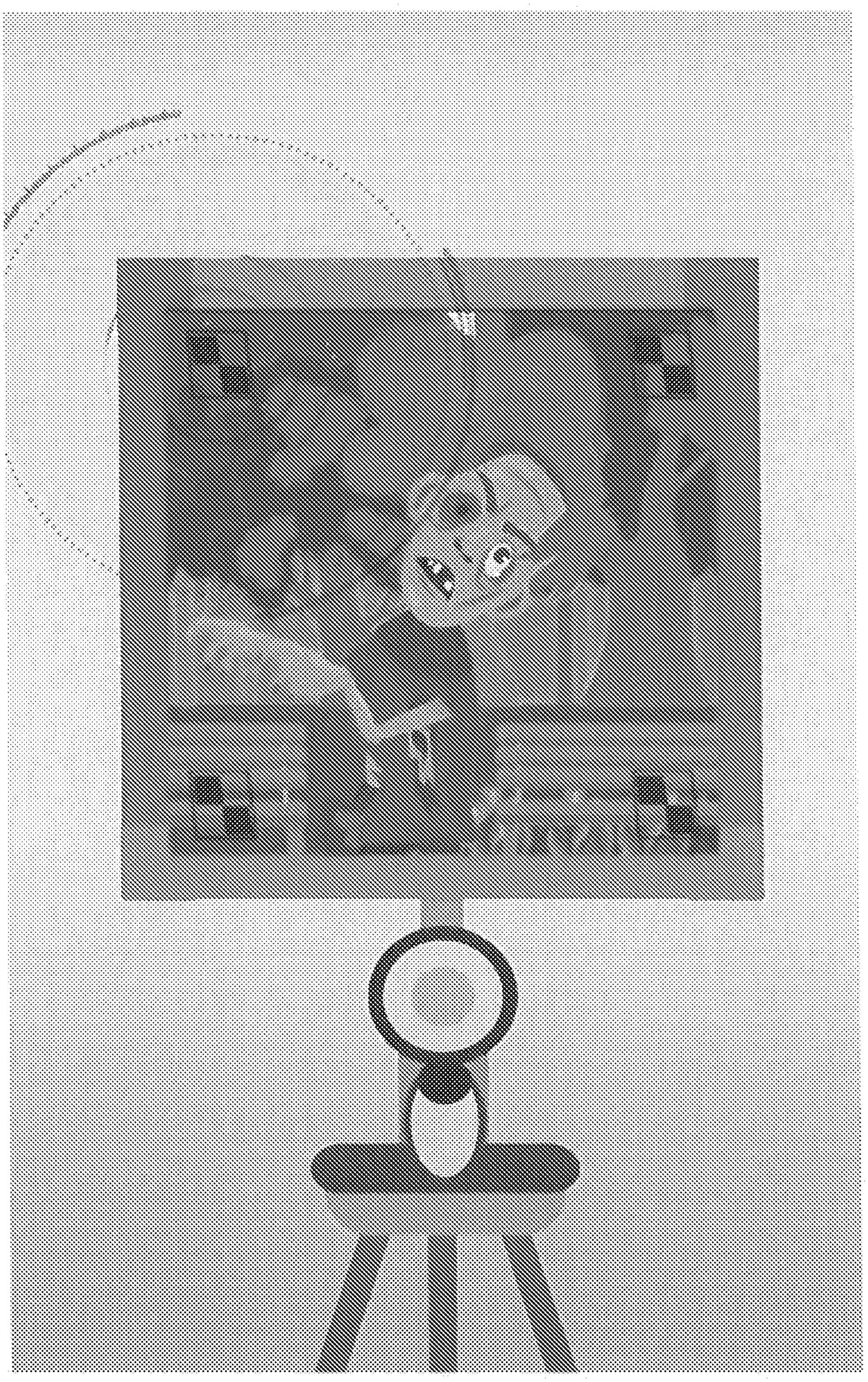
FIG. 13 shows another exemplary embodiment of a target with graphic markers.

With reference to FIG. 13, another exemplary embodiment of a square target includes graphical markers at each corner. The markers in this embodiment are the same. In other embodiments, one or more of the markers can be different. The markers establish reference points for adjusting the perspective of the target in the video stream because the camera is positioned offset from a central axis to the target to avoid being in the line of fire. The target gaming app performs image adjustments using the reference points to form an image of the target for display on the user computing device with a centered, middle point of view on a central axis to the target.

Figure 14:
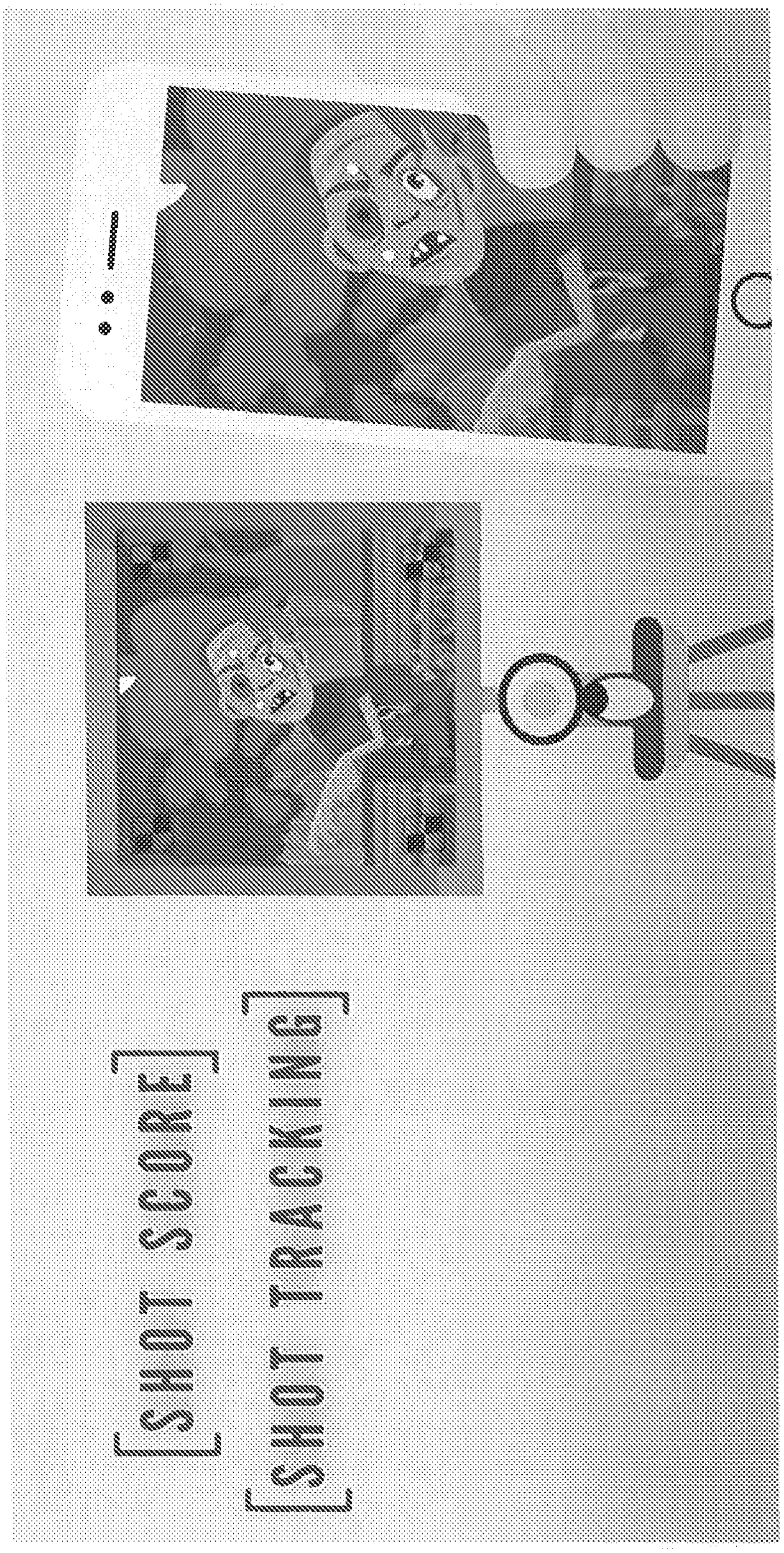
FIG. 14 is an illustration of an exemplary embodiment of a target assembly and a user computing device showing synchronization of shot score and tracking during a game.

With reference to FIG. 14, an exemplary embodiment of a target assembly and a user computing device show synchronization of shot score and tracking during a game. Note the two projectile penetrations on the target held by the target assembly are replicated on the target displayed on the user computing device by the target gaming app.

Figure 15:
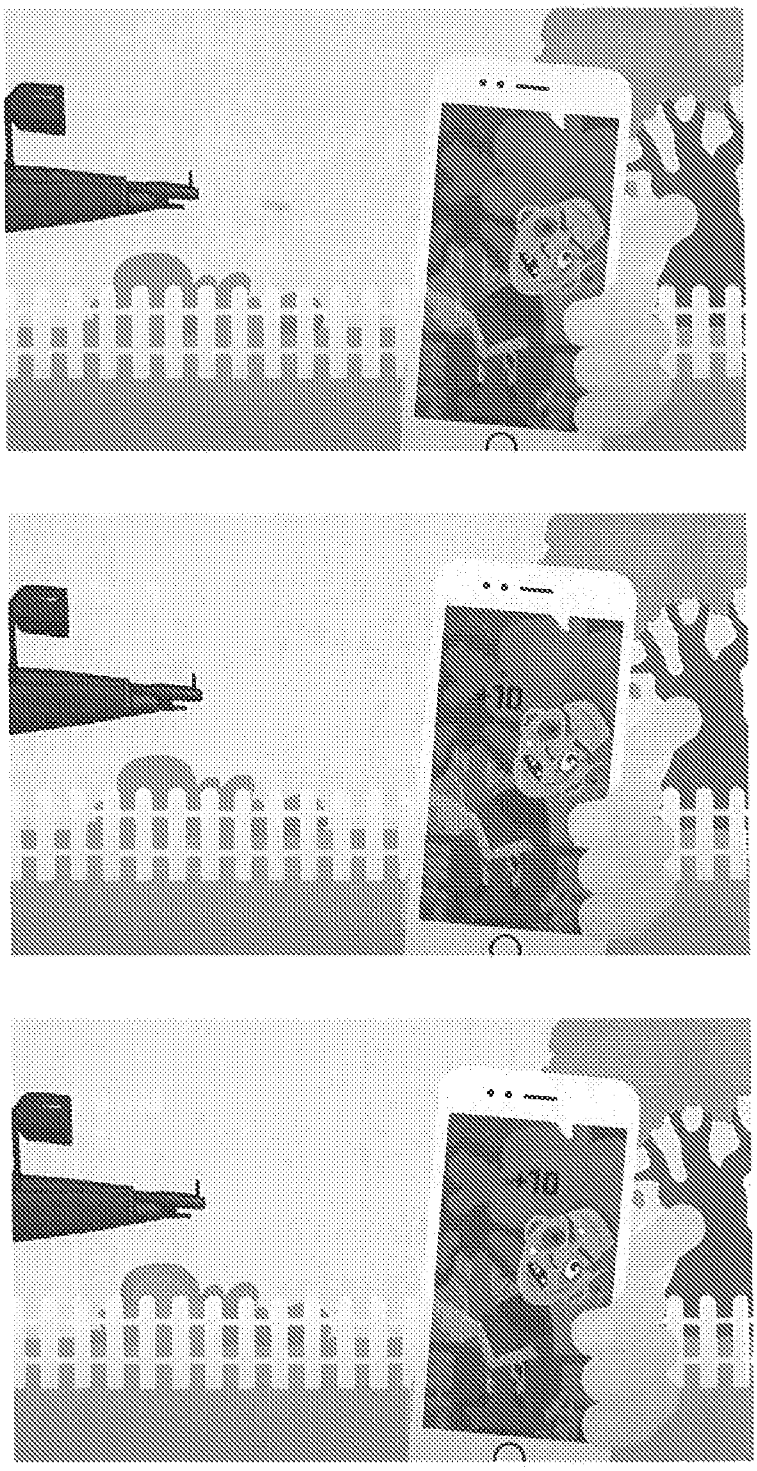
FIG. 15 is a sequence of illustrations of exemplary embodiments of display screens for a user computing device showing updates during a game.

With reference to FIG. 15, an exemplary embodiment of a target displayed on a user computing device shows a sequence of display screens during a game. The upper display screen is before there are any projectile penetrations. The middle display screen shows a first projectile penetration. The lower display screen shows a second projectile penetration along with the first projectile penetration.

Figure 16:
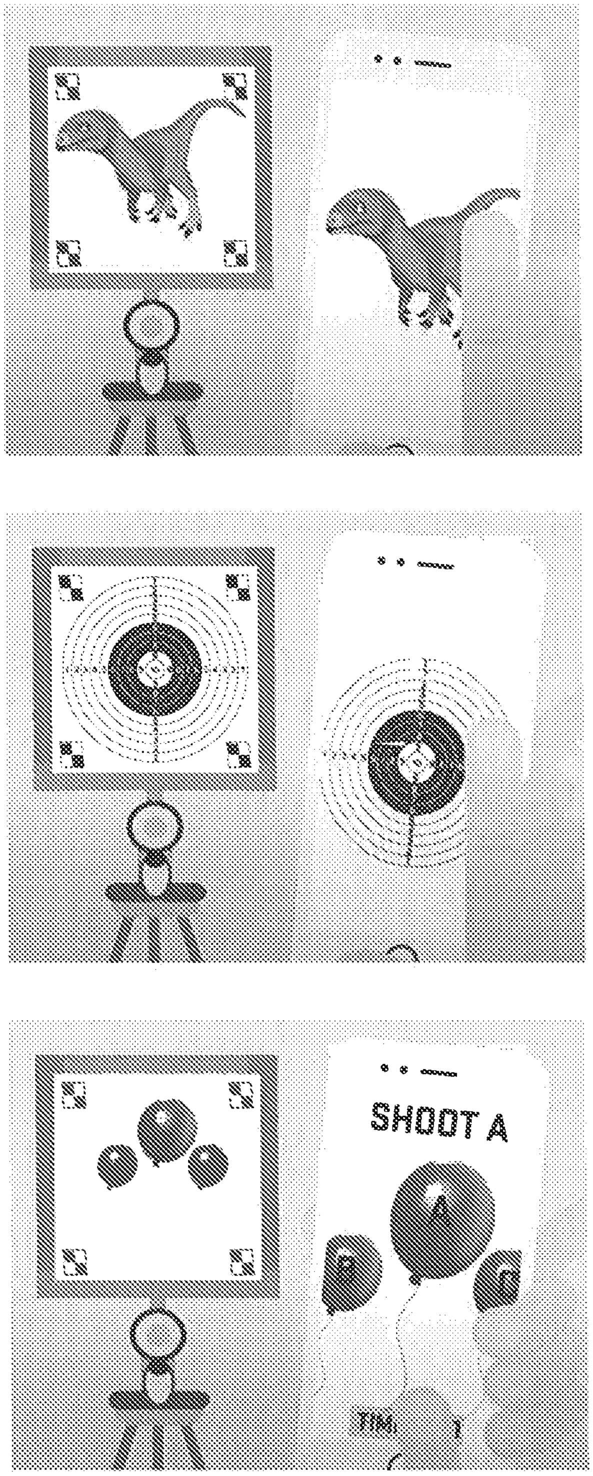
FIG. 16 shows illustrations of exemplary embodiments of a target assembly and a user computing device where a user gaming system is configured for different games.

With reference to FIG. 16, exemplary embodiments of a target assembly and a user computing device where a user gaming system is configured for three different games. The upper illustration shows a dinosaur target installed on the target assembly. In this illustration, the target gaming app displays an image of the dinosaur target on the display of the user computing device. The middle illustration shows a dartboard target installed on the target assembly. In this illustration, the target gaming app displays an image of the dartboard target on the display of the user computing device. The lower illustration shows a target with a set of drawn-on balloons installed on the target assembly. In this illustration, the target gaming app displays an image of the target with the drawn-on balloons on the display of the user computing device.

Figure 17:
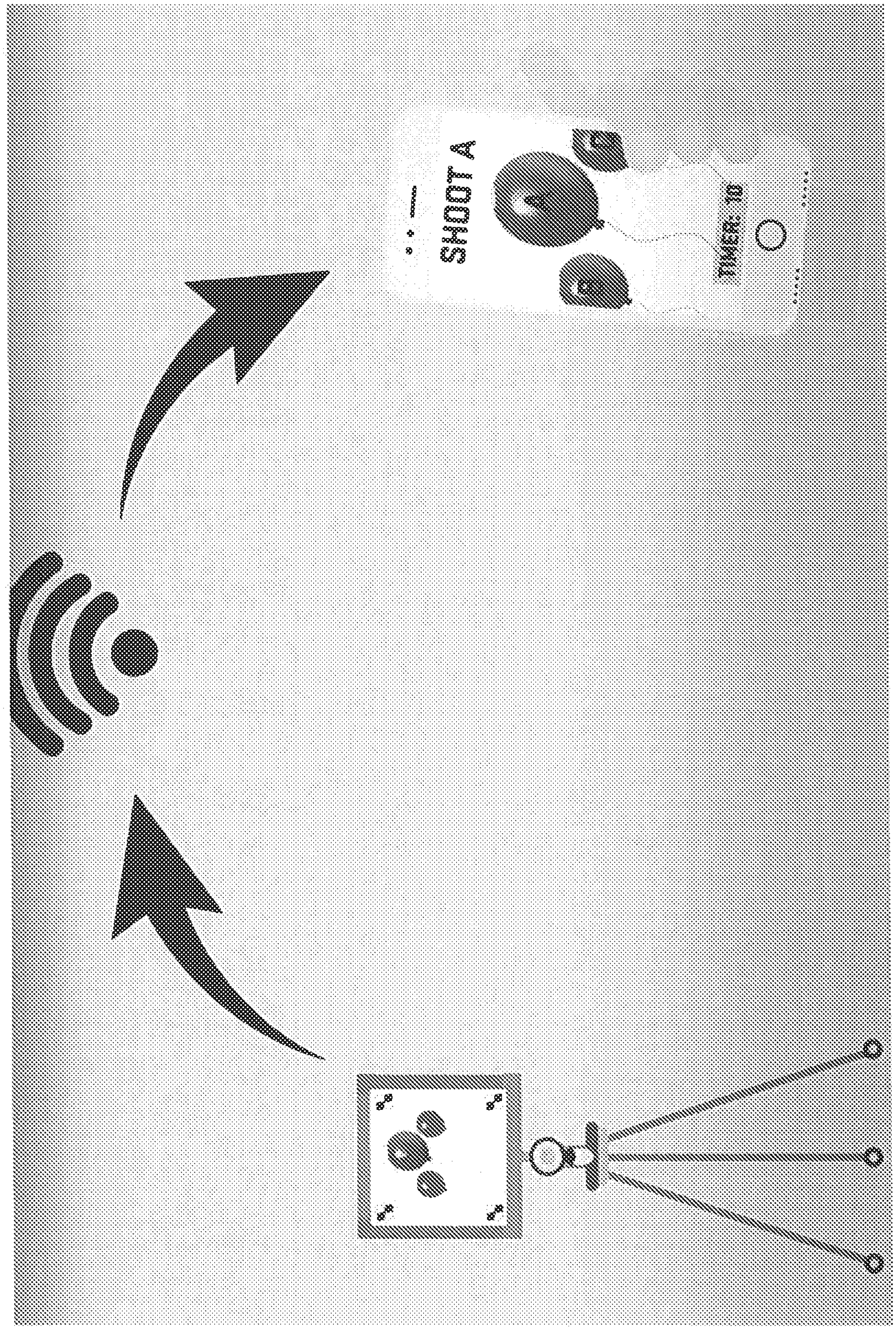
FIG. 17 is an illustration of an exemplary embodiment of a target assembly and a user computing device showing wireless communication between a camera and the user computing device.

With reference to FIG. 17, an exemplary embodiment of a target assembly and a user computing device show wireless communications from the camera on the target assembly to the user computing device.

Figure 18:
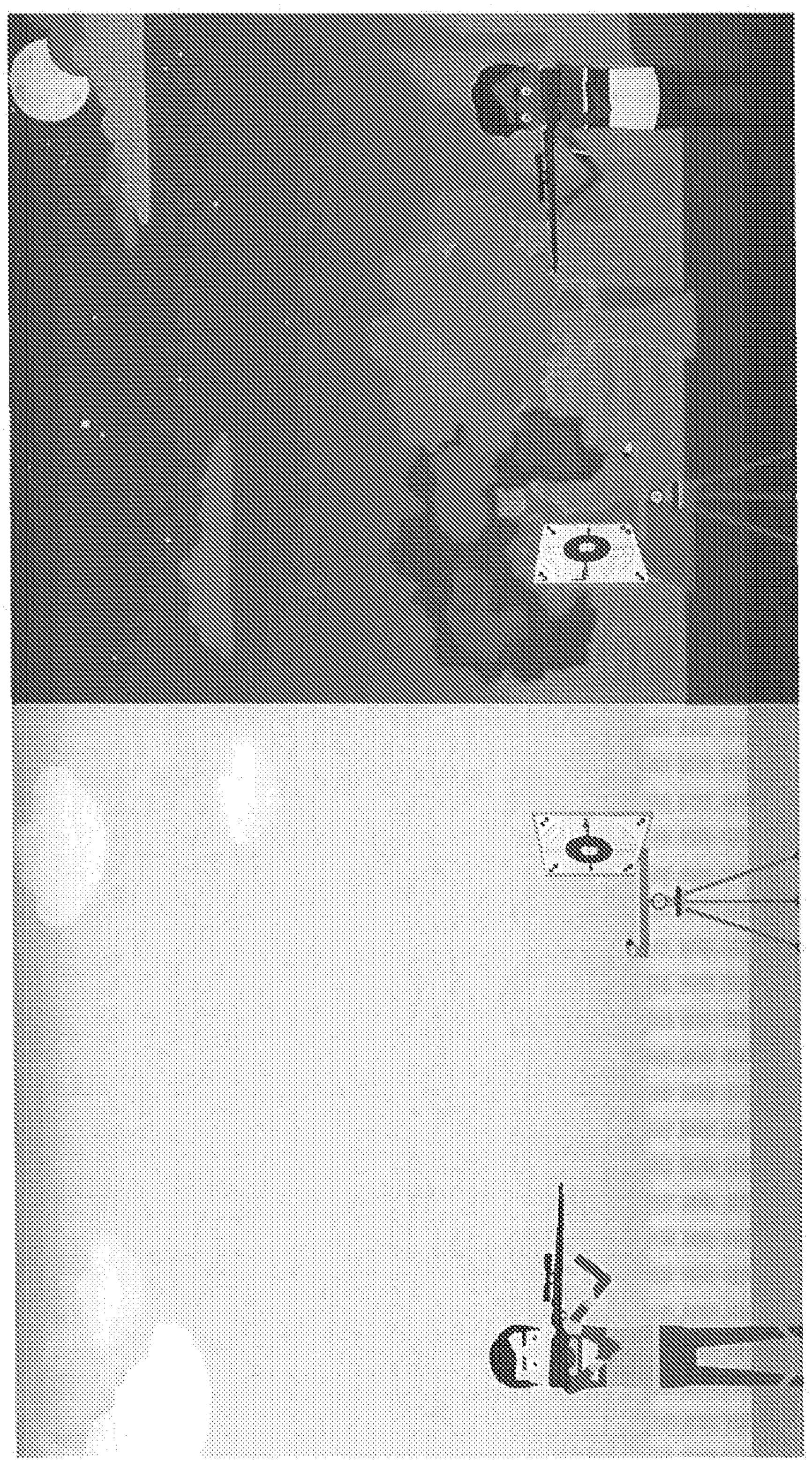
FIG. 18 is an illustration of an exemplary embodiment of an integrated multi-user gaming system where users are at remote locations.

With reference to FIG. 18, an exemplary embodiment of an integrated multi-user gaming system shows two users playing a dart game at remote locations. For example, it is daytime where the first user is playing, and it is nighttime where the second user is playing. This reflects how the target gaming app on multiple user computing devices in distant remote locations can be integrated via a hybrid communication network to permit users to play a recreational or competition game in near real time.

Figure 19:
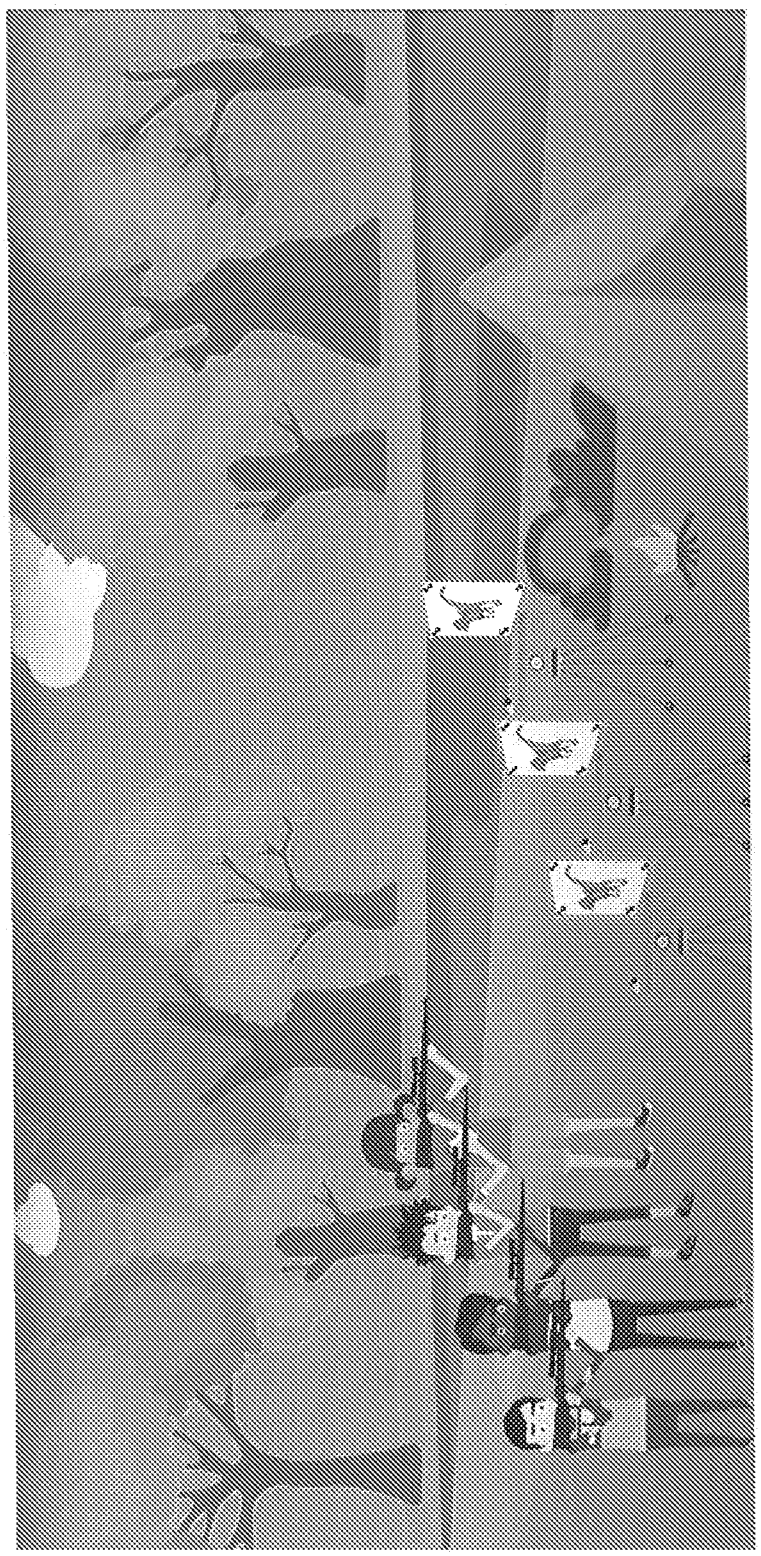
FIG. 19 is an illustration of an exemplary embodiment of an integrated multi-user gaming system where users are at the same location.

With reference to FIG. 19, an exemplary embodiment of an integrated multi-user gaming system shows four users playing a target shooting game at the same location. For example, two of the four users are shooting at the same target and using the same user computing device. The other two users may be playing the target shooting game individually or either one may compete against the two users that are using the same target.

Figure 20A:
FIG. 20A shows a demonstration of an exemplary embodiment of a user gaming system showing a user, a user computing device, and a target assembly at the start of a game.
Figure 20B:
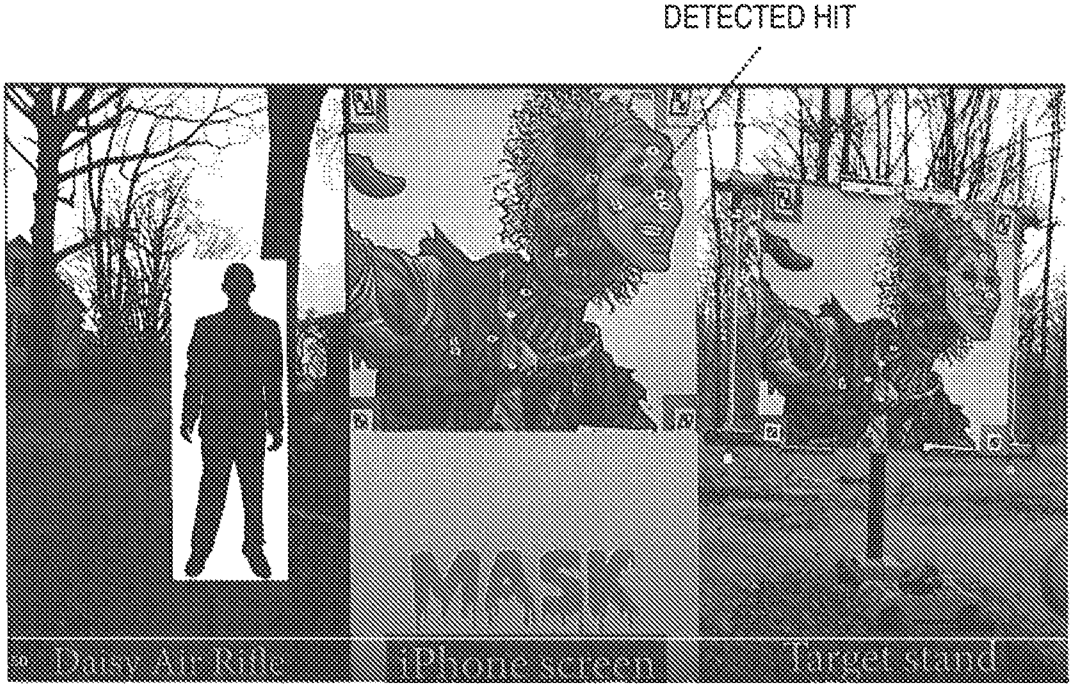
FIG. 20B shows a demonstration of an exemplary embodiment of a user gaming system showing the user, user computing device, and target assembly during the game after a shot to the zombie's mask.
Figure 20C:
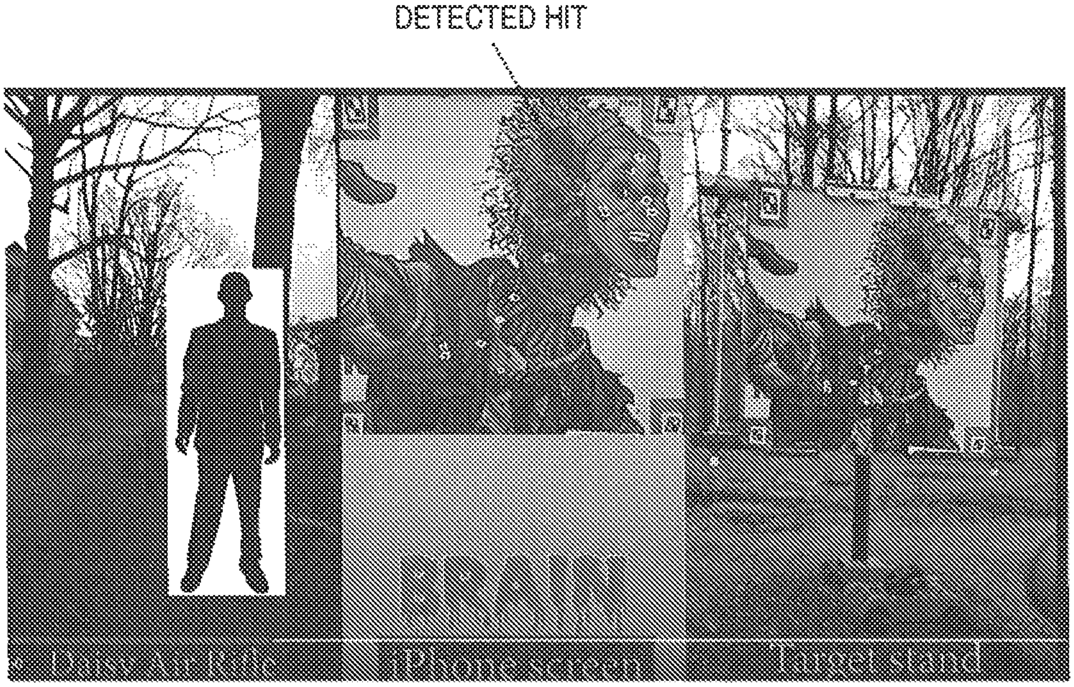
FIG. 20C shows a demonstration of an exemplary embodiment of a user gaming system showing the user, user computing device, and target assembly during the game after a shot to the zombie's brain.
Figure 20D:
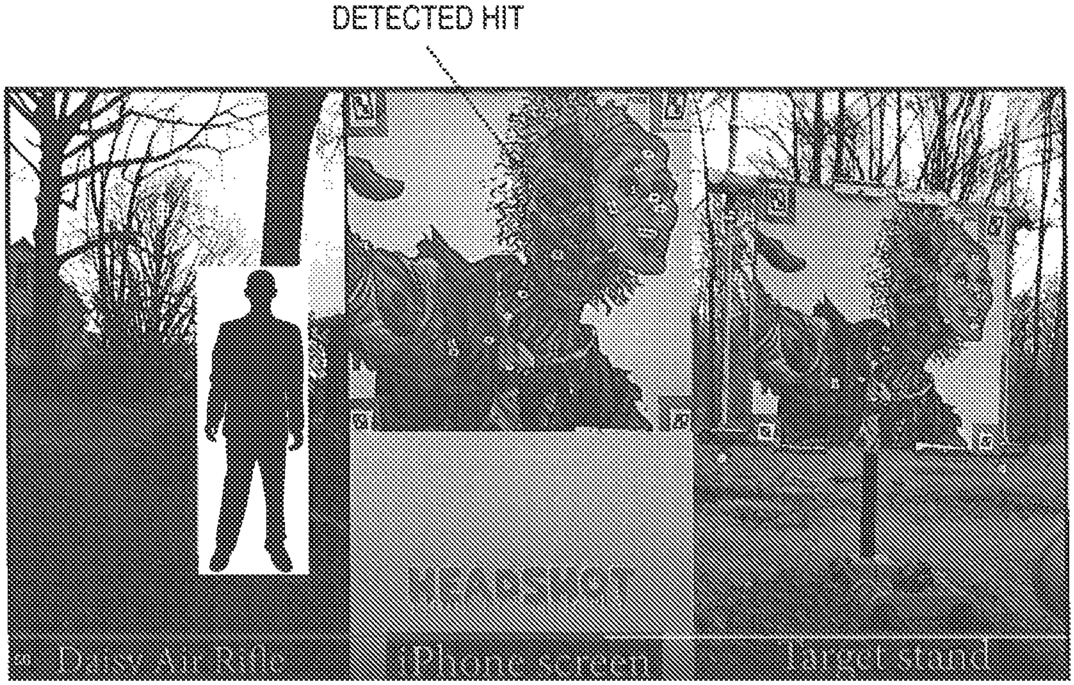
FIG. 20D shows a demonstration of an exemplary embodiment of a user gaming system showing the user, user computing device, and target assembly during the game after a headshot to the zombie.
Figure 20E:
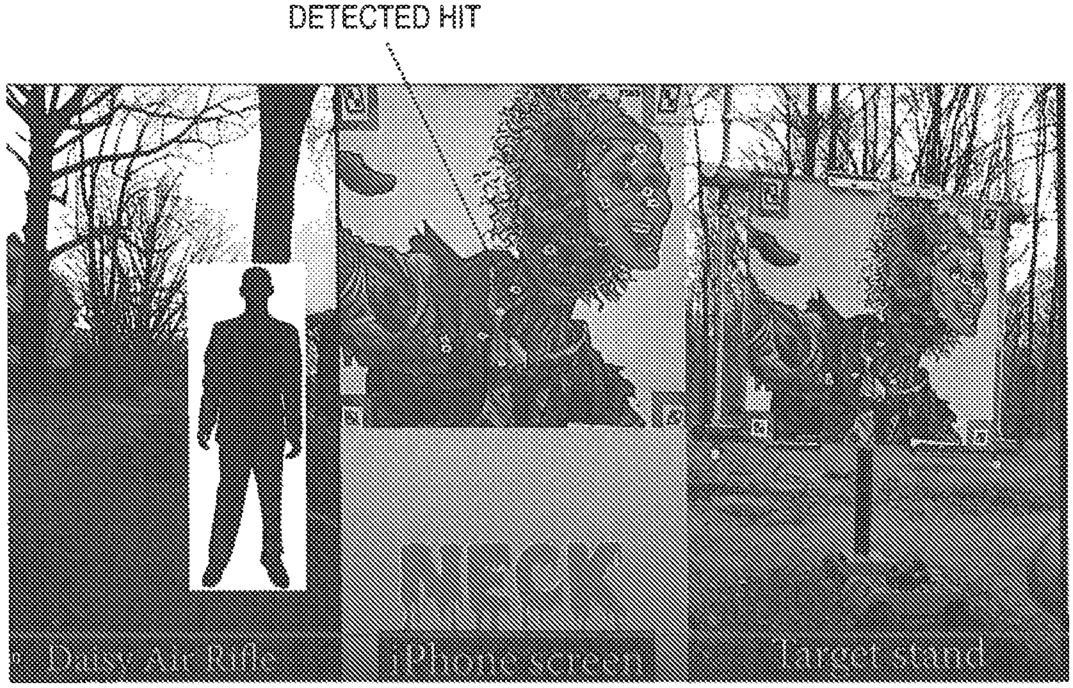
FIG. 20E shows a demonstration of an exemplary embodiment of a user gaming system showing the user, user computing device, and target assembly during the game after a shot to the zombie's neck.
Figure 20F:
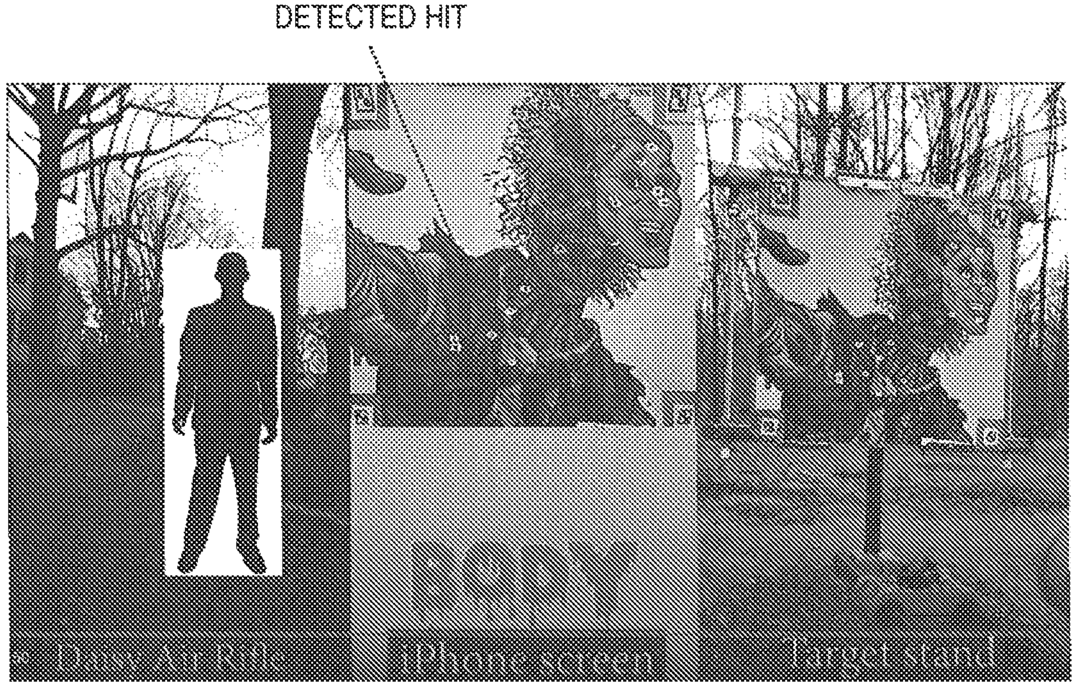
FIG. 20F shows a demonstration of an exemplary embodiment of a user gaming system showing the user, user computing device, and target assembly during the game after a shot to the zombie's body.

With reference to FIGS. 20A through 20F, images from a demonstration of an exemplary embodiment of a user gaming system shows images of a user, a user computing device, and a target assembly at various stages of a zombie game. For example, FIG. 20A shows the user, user computing device, and target assembly in between shots during the game. FIG. 20B shows the user, user computing device, and target assembly during the game after a shot to the zombie's mask. FIG. 20C shows the user, user computing device, and target assembly during the game after a shot to the zombie's brain. FIG. 20D shows the user, user computing device, and target assembly during the game after a headshot to the zombie. FIG. 20E shows the user, user computing device, and target assembly during the game after a shot to the zombie's neck. FIG. 20F shows the user, user computing device, and target assembly during the game after a shot to the zombie's body.

Figure 22:
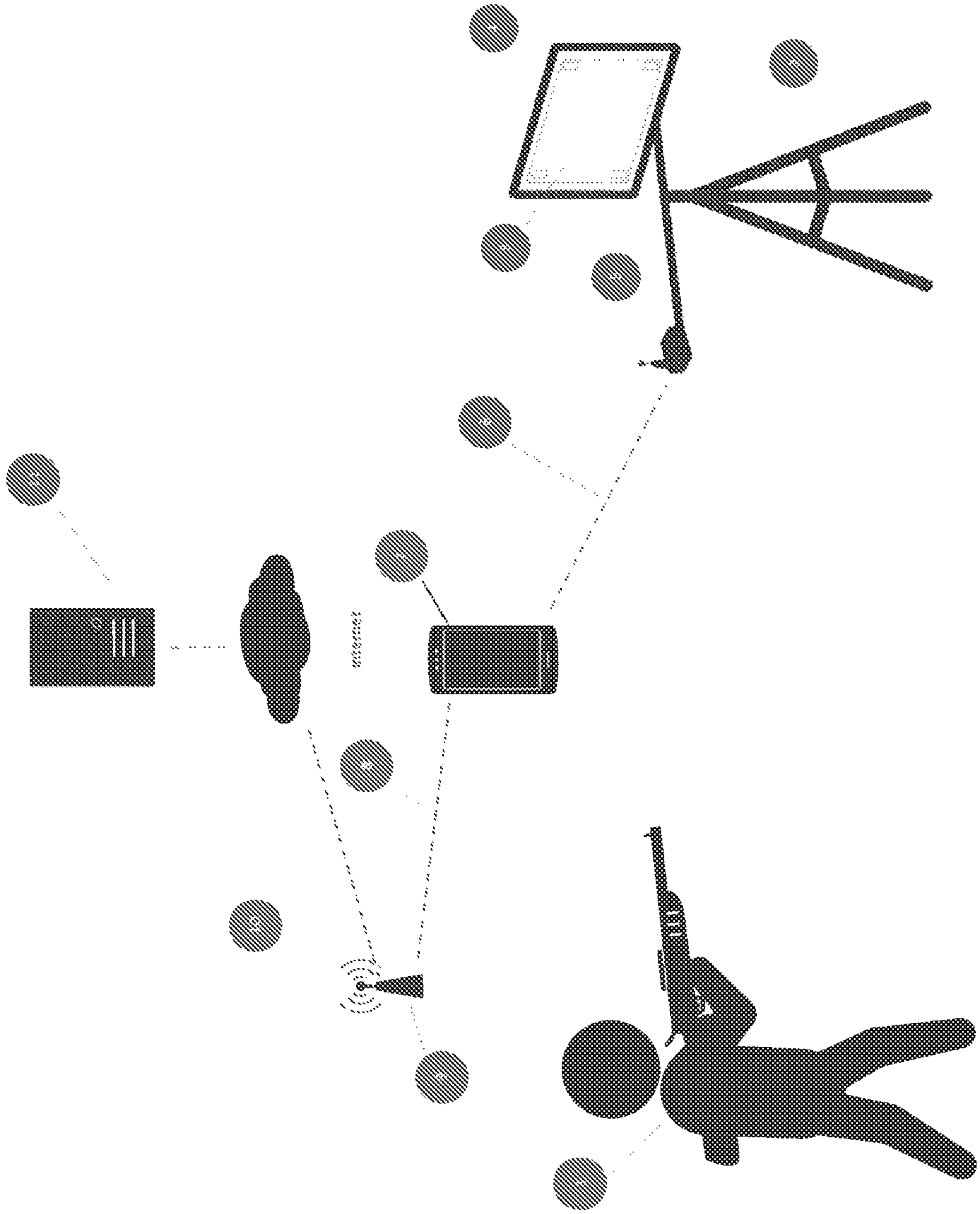
FIG. 22 is a functional diagram of an exemplary embodiment of a user gaming system.

With reference to FIGS. 10 and 22, the user computing device (e.g., smartphone) includes a target gaming app (e.g., BBBlaster) that processes the image data in the video stream from the camera feed. The user computing device detects hits on the target and sends hit information to a gaming system server via a data connection. For example, the data connection may be via any suitable hybrid communication network. For example, the user computing device may access the hybrid communication network via a cellular network or via a Wi-Fi network with an Internet service. The target gaming app allows the user computing device to control playing games, such as classic targeting, zombies, balloons, Simon, card matching, gophers, and darts.

The target gaming app (e.g., BBBlaster) permits a user to create and manage an account with a target gaming service along with the ability to play the games mentioned above. Upon opening the app, the user is asked to login, create an account, or enter "offline mode." Each option will direct the user along a different path that eventually leads to a user's account page. From there, the user can edit his or her profile, navigate the list of games, look at account activity, or shop the store for the app, target games, and/or game accessories. The target gaming app permits the user to navigate through a collection of games and pick a game to play.

Each game determines and maintains scoring for the corresponding game based on the unique rules of the game. Information will be stored for users that have a registered account and for users that play as a guest. There is an option to link an existing account (must enter username and password) or add a guest. Saved entries can be removed. Each game can present instructions when selected with the option to skip the instructions with a "Don't show this screen again option."

The first game, "Classic Target" (see FIG. 3), is based on a bullseye target and is self-explanatory. The user fires a weapon at a bullseye target with points awarded based on where shots land on the target. Multiple player entries will allow for a turn-based competition where a shot limit can be entered. Each player attempts to get the highest score with the amount of shots allowed. A scoreboard will be presented with score adjustments and placements being updated with every turn played. A player can choose to cancel their turn during these competitions.

The second game, "Zombie Game" (see FIG. 13), revolves around players firing at a target with a zombie character. Players can either do a "free play" or "skill play" mode with this game. The game has a list of settings that allows for a set number of shots allowed, difficulty, and competitors for a game with multiple players. Difficulty options are easy, medium, hard, or custom. Each difficulty will set a different amount of time for players to take a shot (e.g., easy is 10 seconds between shots, medium is 5, and hard is 2). The custom difficulty allows the player to set a specific time period between shots (e.g., between 1 to 10 seconds). The main objective is to land shots on the zombie (missing the character is a possibility) with the game sending feedback on where the shot landed. Hitting certain parts of the character may display a specific animation based on the corresponding area of the zombie that was hit. Each completed round may show how many shots were landed on the zombie and how many shots were missed.

The third game, "Balloons" (see FIG. 17), is based on the ability to aim at a target that includes drawn-on balloons and hit a specific balloon when the game asks you to fire at it. The difficulty settings in this game can be the same as "Zombie" where players will set how much time they have to shoot an individual shot (still can pick from easy, medium, hard, or custom). Points are awarded based on the ability to hit balloons on command. Players will only gain points if the proper balloon is hit. Hitting the wrong balloon or completely missing will result in no points being awarded.

The fourth game, "Simon," is a memory-based game where players take turns following a set pattern of colors. In the settings, the starting point for the number of colors to follow in a pattern can be set from 1 to 10. The target and the display on the user computing device will include a set of squares in different colors. Every round, the user computing device will play an animation that will highlight the different colored squares in a certain order that forms up the pattern. Players will have to repeat the pattern by shooting the colored squares on the target in the same order they appeared in the animation. This game continues with patterns that become more and more difficult with each successfully played round. The game ends for a player that shoots the colored squares in an incorrect pattern. The last remaining player is the winner.

The fifth game, “Match”, is another memory game where players attempt to match pairs of cards with the same symbol. There are three levels with customizable rules: i) the number of cards that can be displayed, ii) how much time allowed for a turn, and iii) how many mistakes can be made per turn. Each round starts with the cards being shown on the user computing device with their symbols for a short amount of time and then they are all turned around. The player fires a shot at a single card which will trigger it to turn back around. The player then fires at a second card and that one will also flip over. If both cards match, the user computing device will notify the player that they found a match, both cards stay face up while the player goes on to find another match. If the player manages to match all pairs, they successfully completed the round. If the time limit for the round is complete before all pairs are found, the player will be notified that the round was a failed attempt. The success of each round will be saved so that competing players can keep track of their attempts against each other.

The sixth game, “Gopher,” is an adaptation of the classic “Whack-a-Mole” game with the player attempting to hit a gopher character as it appears on altering locations on a target display on the user computing device. The settings for this game are the same as the other titles with difficulty options of easy, medium, hard, and custom. Each setting will set how quickly the gopher will appear in different locations. A numbered shot limit is set with the game keeping track of hits and misses with hits providing points to players.

The final game, “Darts” (see FIG. 16, middle target), follows the same rules that apply to a real game of darts. Players will fire at a target designed like a real dart board with each turn for an individual player firing shots as if they are attempting to land darts on different parts of the board. Various common dart games played on real dart boards can be implemented. Additionally, the target gaming app can implement a standard dart game with modified rules or a custom dart game.

With reference to FIG. 22, an exemplary embodiment of a user gaming system includes a tripod (2), a target (3), a target frame (4), a camera (5), a wireless connection (6), a user computing device (7) (e.g., mobile device, smartphone). In other embodiments, the user gaming system may also include a second wireless connection (8), a cellular provider (9), a hybrid network connection (10), and a gaming system server (11). A shooter (1) (e.g., user, player) is also shown. The wireless connection (6) enables wireless communications between the camera (5) and the user computing device (7). The second wireless connection enables communications between the user computing device (7) and the cellular provider (9). The hybrid network connection (10) enables communications between the user computing device (7) and the gaming system server (11) via the cellular provider (9). Notably, the user gaming system can operate independently without being connected to the cellular provider (9) or the gaming system server (11).

The shooter represents the human interaction with the user gaming system. The shooter has many different options when it comes to interacting with the target gaming app (e.g., BBBlaster). During all games, the shooter fires a weapon at the target (hit or miss) to advance through the shooting session of the game. The information shared through the devices of the user gaming system is all based on the game selected, the corresponding target, and the shots registered by the shooter. Prior to starting a game, the shooter ensures that the stand, camera, target, and user computing device (e.g., mobile phone) are properly setup.

The tripod holds the camera and the frame for the target. The tripod ensures the target and camera are placed in a position that allows for accurate recordings as the shooter fires at the target. The tripod is designed with two ends. One end holds the camera and the other holds the target frame (allows for placement of target). The distance between the camera and the target frame may be adjusted so the entire target is within the field of view of the camera. For example, the camera sits at a lower elevation in comparison to the target frame, so it is not in the way of the target when the shooter is attempting to fire at the target. The tripod is durable enough so that the force of the shots fired at the target does not alter the placement of the camera or the target frame with whatever target it is holding.

After the user gaming system is set up, the main interaction of the shooter is aiming at the target and firing the weapon. The target can easily be placed and removed from the frame which is mounted on the tripod. The frame holds one target at a time. The user gaming system may include multiple target shooting games. Each game may have a different target. Targets may be removed and replaced with a fresh target after a shooting session. The targets designed for the target gaming app are secured by the frame as long as they are properly placed during setup. The target includes graphic markers, such as quick response (QR) codes. The QR codes may be printed in each corner of a geometric-shaped target. The target may also have QR codes in other locations. If the target is not geometrically shaped, such as a silhouette-style target, QR codes may be located at suitable locations. With QR codes in appropriate numbers and at appropriate locations, the target gaming app is able to obtain the dimensions of the target and adjust the target image on the display from the perspective of the camera to a central axis line of sight. The target is capable of withstanding a large amount of shots fired. Any shot that successfully lands leaves a mark on the target, recorded by the app, and added as a hit on the target displayed by the user computing device (e.g., mobile device).

The target frame can hold a single target on the tripod. The frame is capable of securely holding targets for the target gaming app (e.g., BBBlaster). Holding the target in a secure position enables the app to get accurate readings from the camera while it is recording the target. The frame is located on the tripod at a fixed distance away from the camera which is also located on the tripod. The selected distance between the frame and the camera enables the camera to capture the entire target in the frames of its video stream. The elevation of the frame is above the camera to ensure that the camera is not in the direct aim of the shooter when attempting to fire at the target.

The camera is a relatively small device that is positioned on the tripod to capture video footage of the target. This setup enables the target gaming app to register shots on the target and create information that can be used for scoring, updating the displayed target, and other features within the app. The camera does not actually detect the shots. The camera captures the state of the target before and after a shot hits the target and sending the video footage of the target to the user computing device for detection of the shot. With a Wi-Fi connection at the camera, it can wirelessly send the video footage it has captured to the user computing device. The video footage of the state of the target before and after a shot hits the target is processed by the target gaming app to update the display and determine scoring and other statistical information for the game. The camera includes a rechargeable battery or a connection to a wired power source. If the camera includes a rechargeable battery, it may also include a charging port that permits operation during charging.

The wireless connection between the camera and the user computing device (e.g., mobile device, smartphone) may be a direct Wi-Fi connection. A mobile phone and camera cooperate in this wireless communication setup in order to record and calculate shots fired at a target. With a stable wi-fi connection on both devices, the recording from the camera can be sent to the phone. The camera only records and transmits the footage while the phone processes the footage to detect hits on the target in said footage, to generate changes for the displayed target, and to calculate scoring and other information for the game.

The user computing device may, for example, be a mobile device (e.g., smartphone) that uses an iOS or Android operating system or any suitable computing device. The target gaming app (e.g., BBBlaster) enables the shooter to enjoy his or her time shooting targets. Any mobile device that can run the app with a wi-fi connection will be able to process information from shots being fired at a target. With a video stream from the camera, the mobile device will be able to process the video stream and register shots that hit the target. The target gaming app will take this information and apply its various features. The app has several games that will use the information from the hits on the target to generate scores and keep a record of the shooter's performance.

The second wireless connection is between the user computing device (e.g., mobile device) and the cellular provider (e.g., wireless carrier) via a cellular network. The target gaming app sends information from the user computing device to the gaming system server. Where the user computing device is a mobile device that subscribes to a cellular provider, the information can be provided to the gaming system server via a cellular network associated with the cellular provider.

The cellular provider provides the mobile device with access to the cellular network to send the information from the target gaming app to the gaming system server. The information from the mobile device will be sent to the gaming system server via the cellular network associated with the cellular provider.

The hybrid network connection between the cellular network associated with the cellular provider and the gaming system server may be via any suitable communication network, such as the Internet, and any suitable combination of wired and wireless networks. With an Internet connection, a cellular provider that received information from the mobile device will be able to send the information to the gaming system server via the Internet.

Figure 23:
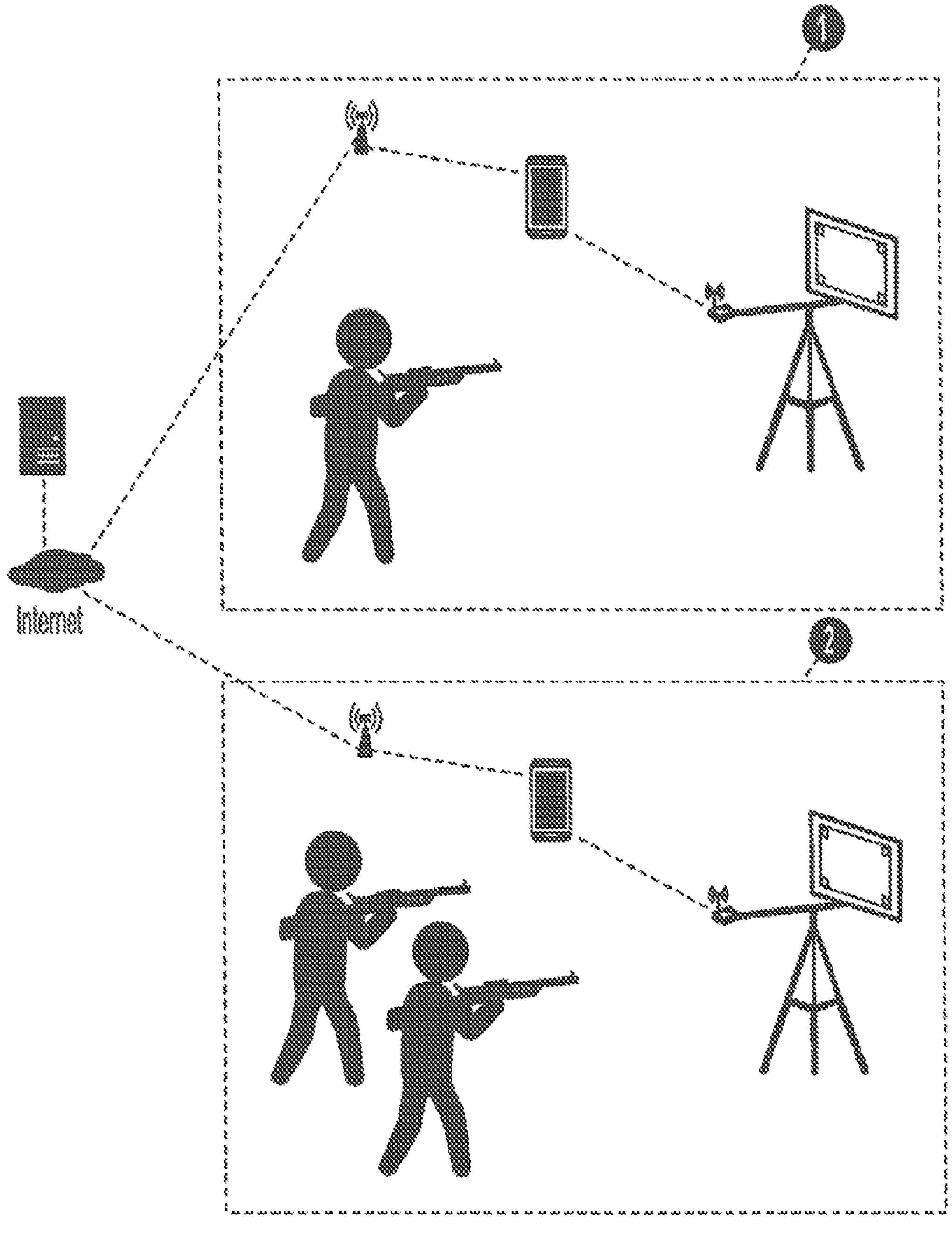
FIG. 23 is a functional diagram of an exemplary embodiment of an integrated multi-user gaming system.

With reference to FIG. 23, an exemplary embodiment of an integrated multi-user gaming system includes a single player at a first remote location and multiple players at a second remote location. As for the single player at the first remote location, the target gaming app allows for both single player and multiplayer options. With a single player, an individual can fire at a target. Shots that hit the target are recorded on the app and sent to a gaming system server. With this information being shared to the server, a single player experience can be shared with other players remotely.

As for the multiple players at the second remote location, multiplayer operation with the target gaming app can be done locally, online, or both. With local play, multiple players in the same location can use one user gaming system or multiple systems as long as each system is connected to a separate user computing device. With the gaming system server, online multiplayer is possible as the information from players using gaming systems at different locations is sent to the server and shared with other players at other locations. Scores and records can be seen on the target gaming app for players without playing the games at the same location. A combination of local and online play is also possible as there can be multiple players in a local setting while also competing with others online. The local and online play information is provided to the gaming system server so that it can be distributed to online players.

The system is configured to use audio cues at various points of a target shooting session. The audio cues may include any combination of music, sound effects, prerecorded voice, and computer-generated voice. For example, audio cues may be used during the playing of a game to enhance the experience, such as using a zombie voice to say "pizza, pizza." Audio cues may also be used for timekeeper functions such as using a voice to countdown to a start of end of a round to provide a status update for a timed round. Another example of audio cues for timekeeper functions is to use a periodic beep sound effect during a round with increasing volume as the round progresses and at the end of the round emitting a buzzer sound effect.

Audio cues can also be used as directives of what to do next in a game such as using a voice instructing the participant to aim at "balloon 1," then "balloon 2," and so forth. Similarly, voice audio cues can be used to explain the rules of a game, provide warnings of hazards and safety procedures, and to provide information in response to help requests or inquiries. Audio cues may also be used to indicate when a shot has missed the target. For example, after detecting a target miss, a buzz or "wa-wa-wa-wa" sound effect may be emitted. After a target penetration is detected, audio cues may also be used as an indicator of success that a shot has hit the correct location on the target. Notice of target penetration audio cues may include a music tone associated with a correct color in the Simon game, a "ta-da" sound effect, a balloon popping sound effect in the balloon game, and a voice indicating a location of the target penetration such as saying "head shot" in the zombie game.

The target shooting session may mimic a known game. Audio cues may be used in a way that is like sounds were used in the known game. For example, the Simon game is a color memorization game like the Simon button pushing game of the 1980's. Each color on the Simon target may have its own "instrumental tone" that is played when the correct colors are penetrated in the correct sequence. Conversely, each time the wrong color is penetrated, no color is penetrated, or there is a target miss, a "buzzer" sound effect may be emitted.

The balloon game is based on shooting different size and color balloons and may have timed rounds. For example, a voice may be used to provide a countdown (e.g., from 10 to 1) as the round progresses. As the end of the countdown nears, there may be a "beep" sound effect with increasing intensity, then a loud "buzzer" sound effect at the end of the countdown. When a balloon is hit, there a "balloon popping" sound effect may be emitted, and a "ta-da" sound effect may follow. When no balloon is hit, there may be a "broken glass" sound effect followed by a "wa-wa-wa-wa" sound effect indicating a "balloon" or target miss. Additionally, voice audio cues may be used to designate which balloon among the balloons on the target the participant should aim at next. For example, the voice may say "balloon 1," "balloon 2," etc., through "Balloon X" at the begging of each round. To add a memory component to the balloon game, each round may include multiple balloons with the specific balloons and sequence being indicated by the voice at the beginning of the corresponding round.

The zombie game is based on shooting at a zombie on the target. A zombie voice audio cue may be used to simulate the zombie speaking, such as saying "pizza, pizza" during the game to indicate the Zombie wants pizza. When a target penetration is detected in the zombie's head, a scorekeeper voice audio cue may say "head shot." The zombie game target may include images of multiple zombies and the zombie voice audio cue may be different for each zombie. For example, when zombie 1 is hit, a male voice audio cue may be a "screaming" sound effect and, when zombie 2 is hit, the "screaming" sound effect may be a female voice audio cue.

Figure 24:
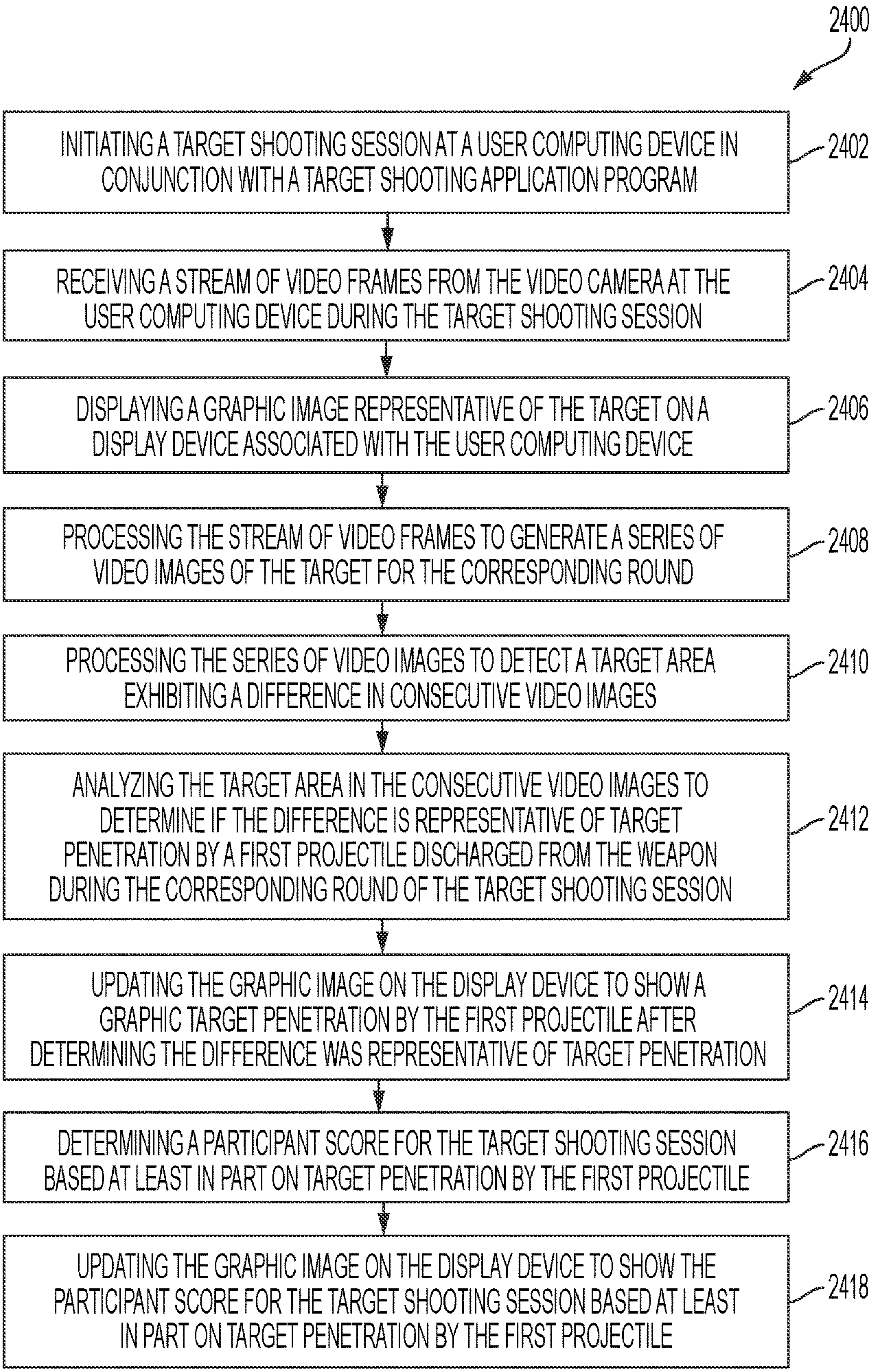
FIG. 24 is a flowchart of an exemplary embodiment of a process for managing and controlling a target shooting session.

With reference to FIG. 24, an exemplary embodiment of a process 2400 for managing and controlling a target shooting session begins at 2402 where a target shooting session is initiated at a user computing device in conjunction with a target shooting application program. The user computing device is in operative communication with a video camera of a target shooting system. The video camera is positioned such that a target is within a field of view of the video camera. The target is releasably secured to a target assembly of the target shooting system. The target shooting session includes a plurality of rounds. A participant operates a weapon to discharge at least one projectile toward the target during each round of the target shooting session. At 2404, a stream of video frames is received from the video camera at the user computing device during the target shooting session. At 2406, a graphic image representative of the target is displayed on a display device associated with the user computing device. At 2408, the stream of video frames is processed to generate a series of video images of the target for the corresponding round. At 2410, the series of video images is processed to detect a target area exhibiting a difference in consecutive video images.

In another embodiment of the process 2400, the target shooting session is a recreational shooting session, a competitive shooting session, a training shooting session, a practice shooting session, a competition shooting session, a qualification shooting session, or any type of shooting session suitable for target shooting. In yet another embodiment of the process 2400, the target shooting session is based on bullseye target shooting, zombie target shooting, balloon target shooting, Simon memory game play, Match Game television show play, Whac-a-Mole arcade game play, dart game play, or any other game or contest suitable for implementation through target shooting.

In still another embodiment of the process 2400, the stream of video frames is transmitted between the video camera and the user computing device in a TCP/IP protocol. In still yet another embodiment of the process 2400, the graphic image of the target is based on at least a portion of the stream of video frames received from the video camera. In another embodiment of the process 2400, the graphic image of the target is based on a pre-existing target image associated with the target shooting session. The pre-existing target image being accessible to the target shooting application program.

In another embodiment, in conjunction with initiating the target shooting session (2402), the process 2400 also includes selecting the target shooting session from a plurality of target shooting sessions available to the target shooting application program. In a further embodiment, the target shooting session is selected in response to a user interaction with an input device of the user computing device. In another further embodiment, the process also includes comparing at least one video image of the series of video images of the target to a plurality of pre-existing target images corresponding to the plurality of target shooting sessions. The plurality of pre-existing target images being available to the target shooting application program. Next, the target shooting session associated with a matching pre-existing target image is selected based on the comparing.

In yet another embodiment, in conjunction with initiating the target shooting session (2402), the process 2400 also includes identifying the participant for the target shooting session to the target shooting application program in response to user interaction with an input device of the user computing device. Next, the weapon being used by the participant for the target shooting session is identified to the target shooting application program in response to user interaction with an input device of the user computing device. Then, the at least one projectile being used in the weapon for the target shooting session is identified to the target shooting application program in response to user interaction with an input device of the user computing device.

Figure 25:
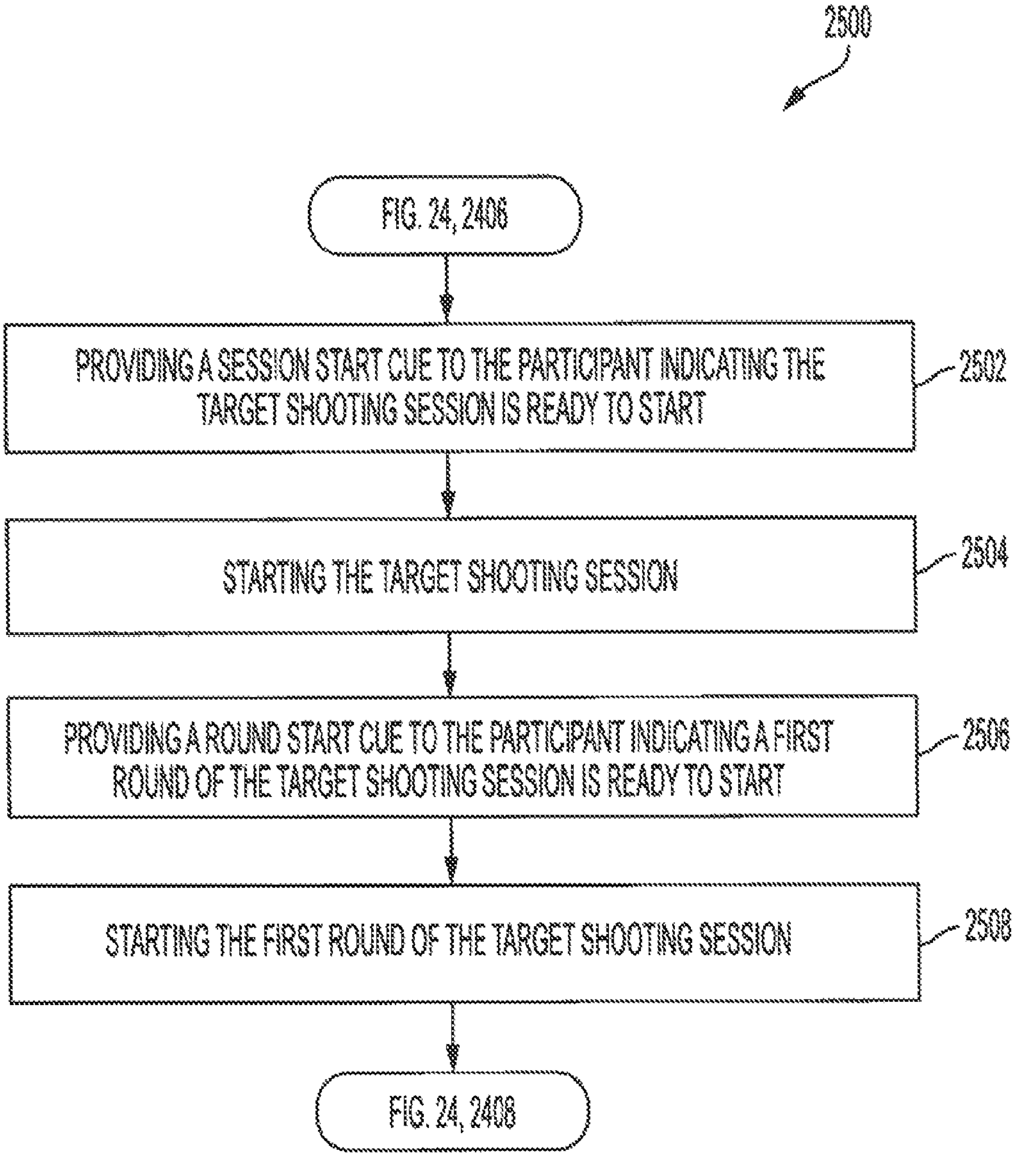
FIG. 25, in combination with FIG. 24, provides a flowchart of another exemplary embodiment of a process for managing and controlling a target shooting session.

With reference to FIG. 25, another exemplary embodiment of a process 2500 includes 2402-2406 of FIG. 24 and continues from 2406 to 2502 where a session start cue is provided to the participant indicating the target shooting session is ready to start. As 2504, the target shooting session is started. At 2506, a round start cue is provided to the participant indicating a first round of the target shooting session is ready to start. At 2508, the first round of the target shooting session is started and the process 2500 continues to 2408 of FIG. 24.

In another embodiment of the process 2500, the session start cue includes at least one of an audible cue provided by a speaker device associated with the user computing device and a visual cue provided by one or more of the display device and an indicator light associated with the user computing device. In a further embodiment, the audible cue includes at least one of a predetermined notification sound, a prerecorded verbal announcement, and a computer-generated verbal announcement. In another further embodiment, the visual cue includes at least one of an update to the graphic image on the display device, an overlay window on the display device, illumination of the indicator light, and flashing of the indicator light. In yet another embodiment of the process 2500, the starting of the target shooting session is delayed for a predetermined time after the session start cue.

In still another embodiment of the process 2500, the starting of the target shooting session is in response to receiving a start acknowledgement cue originated by the participant. In a further embodiment, the start acknowledgement cue includes at least one of an audible cue detected by the user computing device via an audio input device and a user interaction detected by the user computing device via a tactile input device. In an even further embodiment, the audible cue includes at least one of predetermined spoken command, a spoken instruction, and a spoken response to the session start cue. In another even further embodiment, the user interaction includes at least one of activation of a control in the graphic image on the display device, activation of a control in an overlay window on the display device, activation of a switch on the user computing device, activation of a control on a keyboard associated with the user computing device, and submission of a predetermined command, an instruction, or a response to the session start cue using the keyboard.

In still yet another embodiment of the process 2500, the starting of the first round of the target shooting session is delayed for a predetermined time after the round start cue. In another embodiment of the process 2500, the starting of the first round of the target shooting session is in response to receiving a round acknowledgement cue originated by the participant. In a further embodiment, the round acknowledgement cue includes at least one of an audible cue detected by the user computing device via an audio input device and a user interaction detected by the user computing device via a tactile input device.

Figure 26:
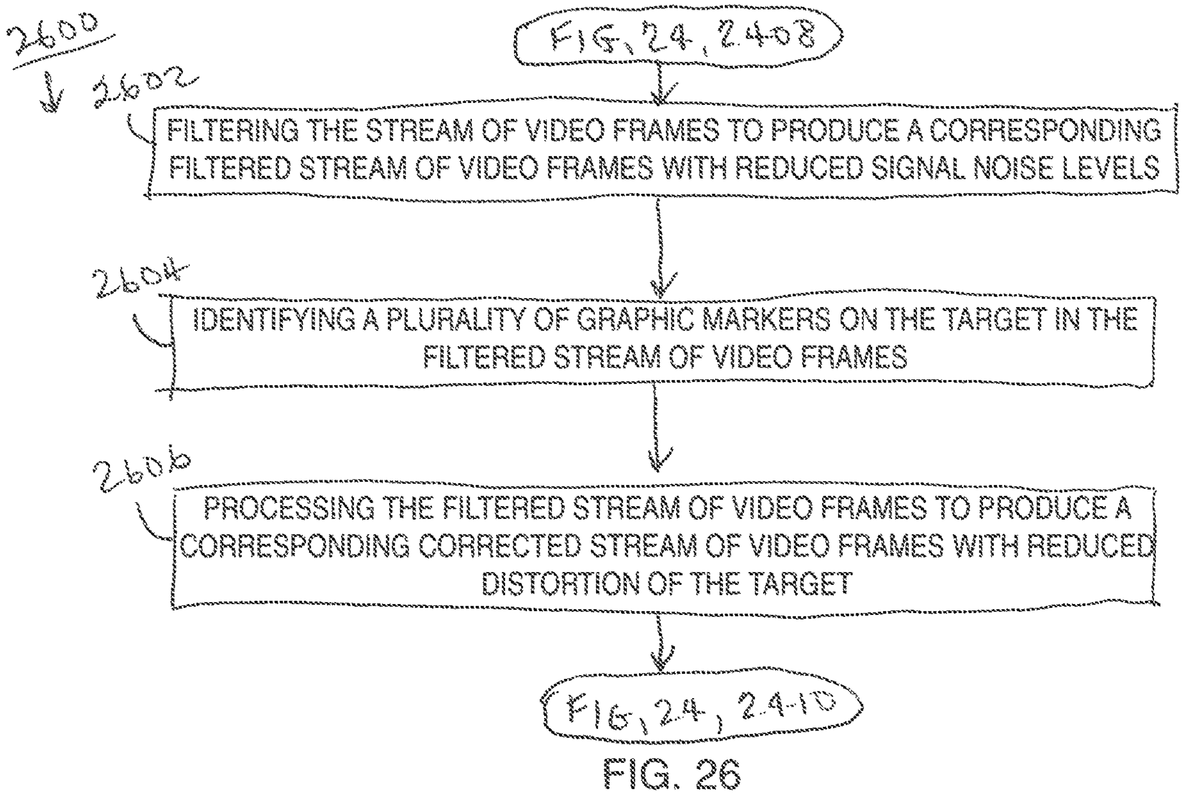
FIG. 26, in combination with FIG. 24, provides a flowchart of yet another exemplary embodiment of a process for managing and controlling a target shooting session.

With reference to FIG. 26, yet another exemplary embodiment of a process 2600 includes 2402-2408 from the process 2400 of FIG. 24. The process 2600 continues from 2408 to 2602 where the stream of video frames is filtered to produce a corresponding filtered stream of video frames with reduced signal noise levels. At 2604, a plurality of graphic markers are identified on the target in the filtered stream of video frames. The plurality of graphic markers are at known locations on the target. At 2606, the filtered stream of video frames is processed to produce a corresponding corrected stream of video frames with reduced distortion of the target. The distortion is based on a camera central axis relating to a field of view of the video camera being offset from a target central axis. The target central axis is in perpendicular relation to a 2-dimensional plane associated with the target. Correction for the distortion is based at least in part on known geometric relationships of the graphic markers in the 2-dimensional plane. After 2606, the process 2600 continues to 2410 of FIG. 24.

Figure 27:
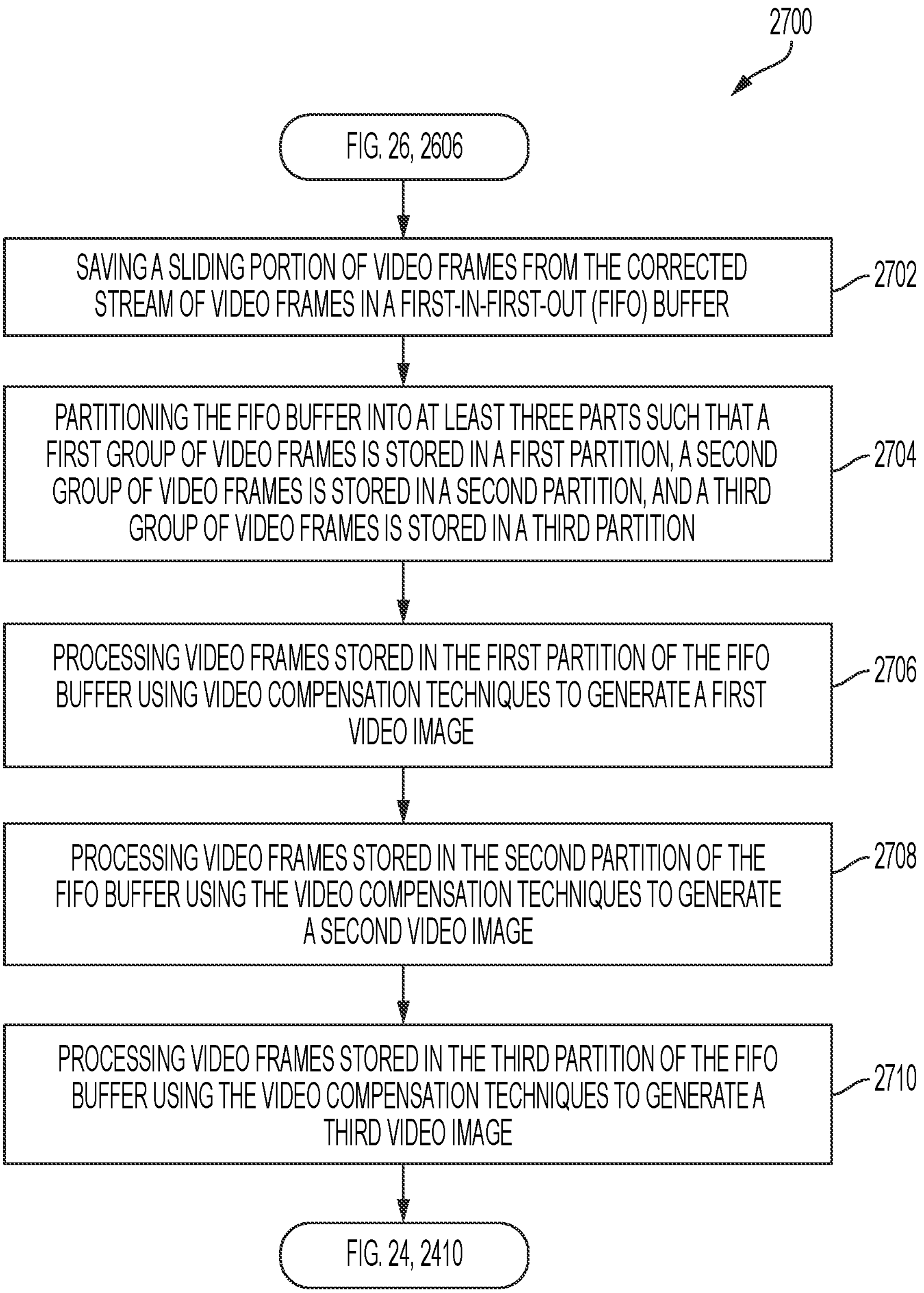
FIG. 27, in combination with FIGS. 24 and 26, provides a flowchart of still another exemplary embodiment of a process for managing and controlling a target shooting session.

With reference to FIG. 27, still another exemplary embodiment of a process 2700 includes 2402-2408 from the process 2400 of FIG. 24 and the process 2600 of FIG. 26. The process 2700 continues from 2606 to 2702 where a sliding portion of video frames from the corrected stream of video frames is saved in a first-in-first-out (FIFO) buffer. At 2704, the FIFO buffer is partitioned into at least three parts such that a first group of video frames is stored in a first partition, a second group of video frames is stored in a second partition, and a third group of video frames is stored in a third partition. At 2706, video frames stored in the first partition of the FIFO buffer are processed using video compensation techniques to generate a first video image. The first video image is representative of an average of the video frames stored in the first partition and indicative of a previous condition of the target. At 2708, video frames stored in the second partition of the FIFO buffer are processed using the video compensation techniques to generate a second video image. The second video image is representative of an average of the video frames stored in the second partition and indicative of a current condition of the target. At 2710, video frames stored in the third partition of the FIFO buffer are processed using the video compensation techniques to generate a third video image. The third video image is representative of an average of the video frames stored in the third partition and indicative of a next condition of the target. After 2710, the process 2700 continues to 2410 of FIG. 24.

Figure 28:
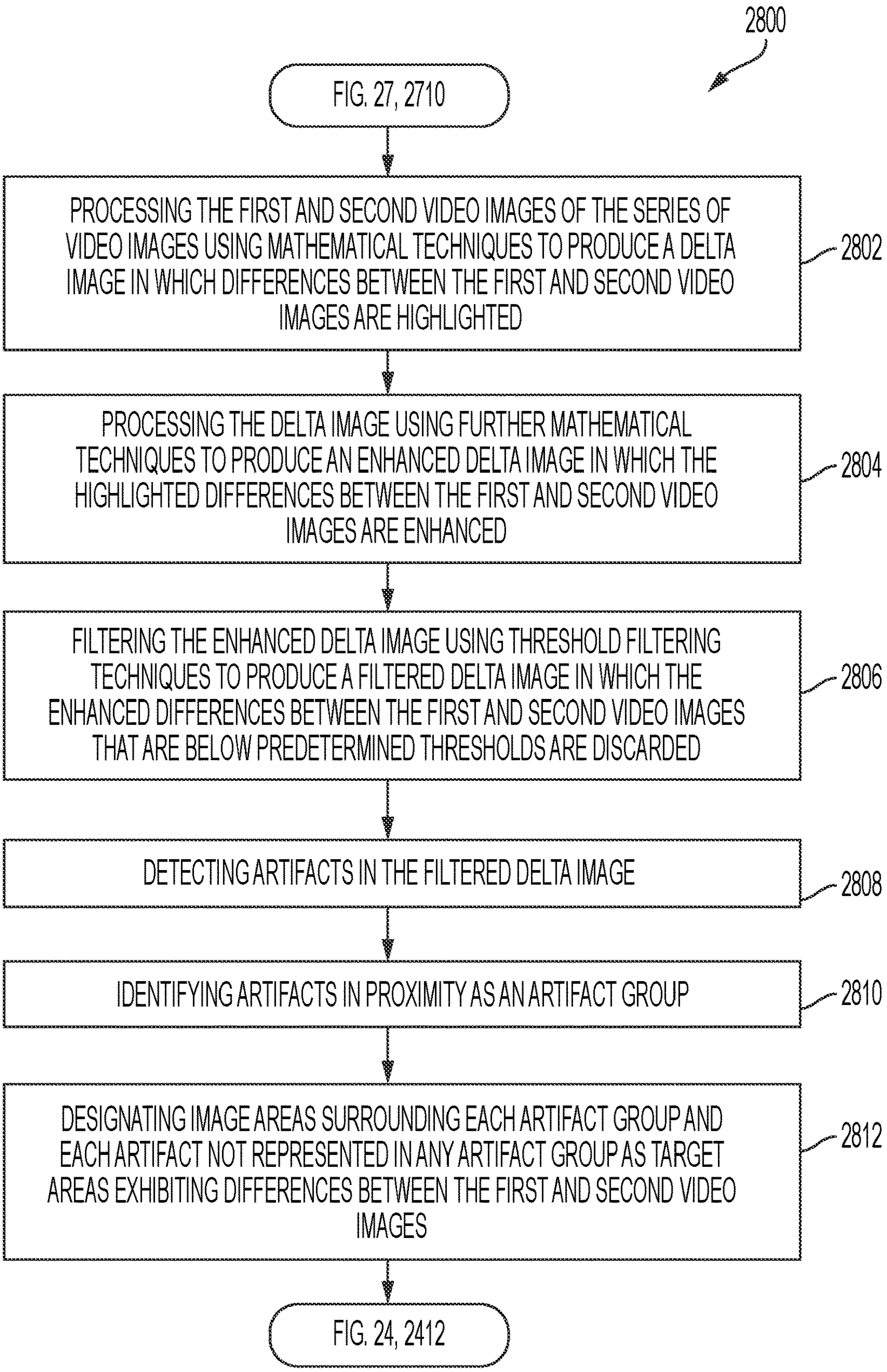
FIG. 28, in combination with FIGS. 24, 26, and 27, provides a flowchart of still yet another exemplary embodiment of a process for managing and controlling a target shooting session.

With reference to FIG. 28, still yet another exemplary embodiment of a process 2800 includes 2402-2410 from the process 2400 of FIG. 24, the process 2600 of FIG. 26, and the process 2700 of FIG. 27. The process 2800 continues from 2710 to 2802 where the first and second video images of the series of video images are processed using mathematical techniques to produce a delta image in which differences between the first and second video images are highlighted. At 2804, the delta image is processed using further mathematical techniques to produce an enhanced delta image in which the highlighted differences between the first and second video images are enhanced. At 2806, the enhanced delta image is filtered using threshold filtering techniques to produce a filtered delta image in which the enhanced differences between the first and second video images that are below predetermined thresholds are discarded. At 2808, artifacts in the filtered delta image are detected. At 2810, artifacts in proximity are identified as an artifact group. At 2812, image areas surrounding each artifact group and each artifact not represented in any artifact group are designated as target areas exhibiting differences between the first and second video images. After 2812, the process 2800 continues to 2412 of FIG. 24.

With reference again to FIG. 24, in another exemplary embodiment, the process 2400 also includes analyzing the target area in the consecutive video images to determine if the difference is representative of target penetration by a first projectile discharged from the weapon during the corresponding round of the target shooting session (2412).

In yet another exemplary embodiment, the process 2400 also includes updating the graphic image on the display device to show a graphic target penetration by the first projectile after determining the difference was representative of target penetration (2414). At 2416, a participant score for the target shooting session is determined based at least in part on target penetration by the first projectile. At 2418, the graphic image on the display device is updated to show the participant score for the target shooting session based at least in part on target penetration by the first projectile.

In a further embodiment, in conjunction with updating the graphic image to show the target penetration, the process 2400 also includes providing a target penetration cue to the participant indicating the first projectile penetrated the target. In an even further embodiment, the target penetration cue includes at least one of an audible cue provided by a speaker device associated with the user computing device and a visual cue provided by one or more of the display device and an indicator light associated with the user computing device.

In another further embodiment, in conjunction with updating the graphic image to show the participant score, the process 2400 also includes providing a next round start cue to the participant indicating a next round of the target shooting session is ready to start. Next, the second round of the target shooting session is started. In an even further embodiment, the starting of the next round of the target shooting session is delayed for a predetermined time after the next round start cue. In another even further embodiment, the starting of the next round of the target shooting session is in response to receiving a next round acknowledgement cue originated by the participant. In an even yet further embodiment, the next round start cue includes at least one of an audible cue provided by a speaker device associated with the user computing device and a visual cue provided by one or more of the display device and an indicator light associated with the user computing device.

In yet another further embodiment, the process 2400 also includes continuing to process the series of video images during the corresponding round to detect a second target area exhibiting a second difference in the consecutive video images. Next, the second target area in the consecutive video images is analyzed to determine if the second difference is representative of target penetration by a second projectile discharged from the weapon during the corresponding round of the target shooting session. Then, the graphic image on the display device is updated to show a second graphic target penetration by the second projectile after determining the second difference was representative of target penetration. Next, the participant score for the target shooting session is determined based at least in part on target penetration by the first and second projectiles. Then, the graphic image on the display device is updated to show a graphic indication of the participant score for the target shooting session based at least in part on target penetration by the first and second projectiles.

In still another further embodiment, the process 2400 also includes repeating the processing of the stream of video frames (2408) for each projectile discharged during each round of the target shooting session. In this embodiment, the processing of the series of video images (2410) for each projectile discharged is also repeated during each round of the target shooting session. Similarly, the analyzing of the target area (2412) is repeated for each projectile discharged during each round of the target shooting session. In this embodiment, the updating of the graphic image based on target penetration (2414) is repeated for each projectile discharged during each round of the target shooting session. Similarly, the determining of the participant score (2416) is repeated for at least each round of the target shooting session. Likewise, the updating of the graphic image based on the score (2418) is repeated for at least each round of the target shooting session.

Figure 29:
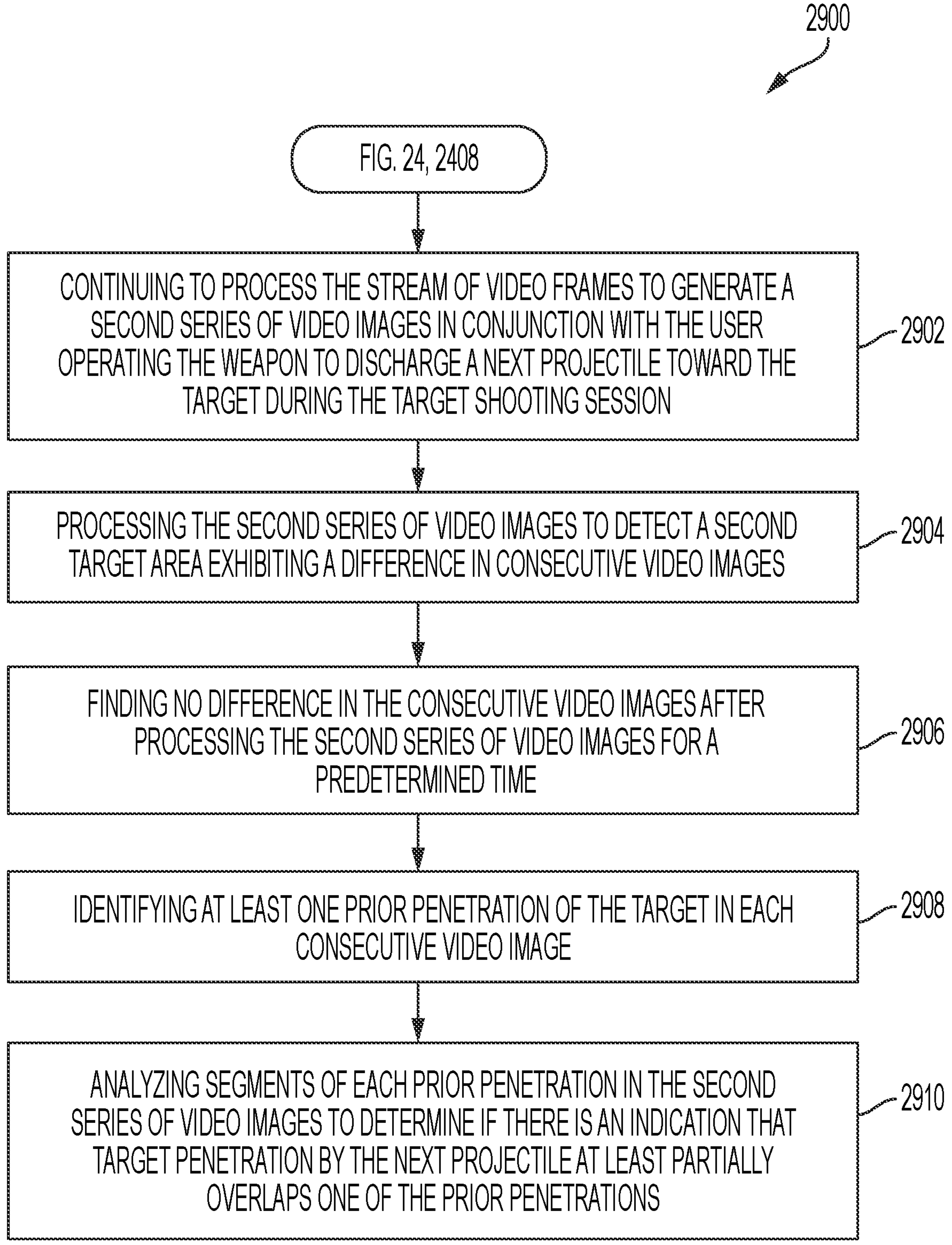
FIG. 29, in combination with FIG. 24, provides a flowchart of another exemplary embodiment of a process for managing and controlling a target shooting session.

With reference to FIG. 29, another exemplary embodiment of a process 2900 includes 2402-2408 from the process 2400 of FIG. 24. The process 2900 continues from 2408 to 2902 where the processing of the stream of video frames is continued to generate a second series of video images in conjunction with the user operating the weapon to discharge a next projectile toward the target during the target shooting session. At 2904, the second series of video images is processed to detect a second target area exhibiting a difference in consecutive video images. At 2906, no difference in the consecutive video images is found after processing the second series of video images for a predetermined time. At 2908, at least one prior penetration of the target is identified in each consecutive video image. At 2910, segments of each prior penetration in the second series of video images are analyzed to determine if there is an indication that target penetration by the next projectile at least partially overlaps one of the prior penetrations.

In a further embodiment, the process 3000 also includes updating the graphic image on the display device to show a next graphic target penetration by the next projectile after determining target penetration by the next projectile at least partially overlaps one of the prior penetrations. Next, the participant score for the target shooting session is determined based at least in part on target penetration by the next projectile and prior penetrations. Then, the graphic image on the display device is updated to show the participant score for the target shooting session based at least in part on target penetration by the next projectile and prior penetrations.

In another further embodiment, the process 3000 also includes determining the next projectile missed the target after analyzing segments of each prior penetration in the second series of video images and finding no indication that target penetration by the next projectile at least partially overlaps one of the prior penetrations. Next, the graphic image on the display device is updated to show the next projectile was a target miss. Then, the participant score for the target shooting session is determined based at least in part on the target miss by the next projectile. Next, the graphic image on the display device is updated to show the participant score for the target shooting session based at least in part on the target miss by the next projectile.

Figure 30:
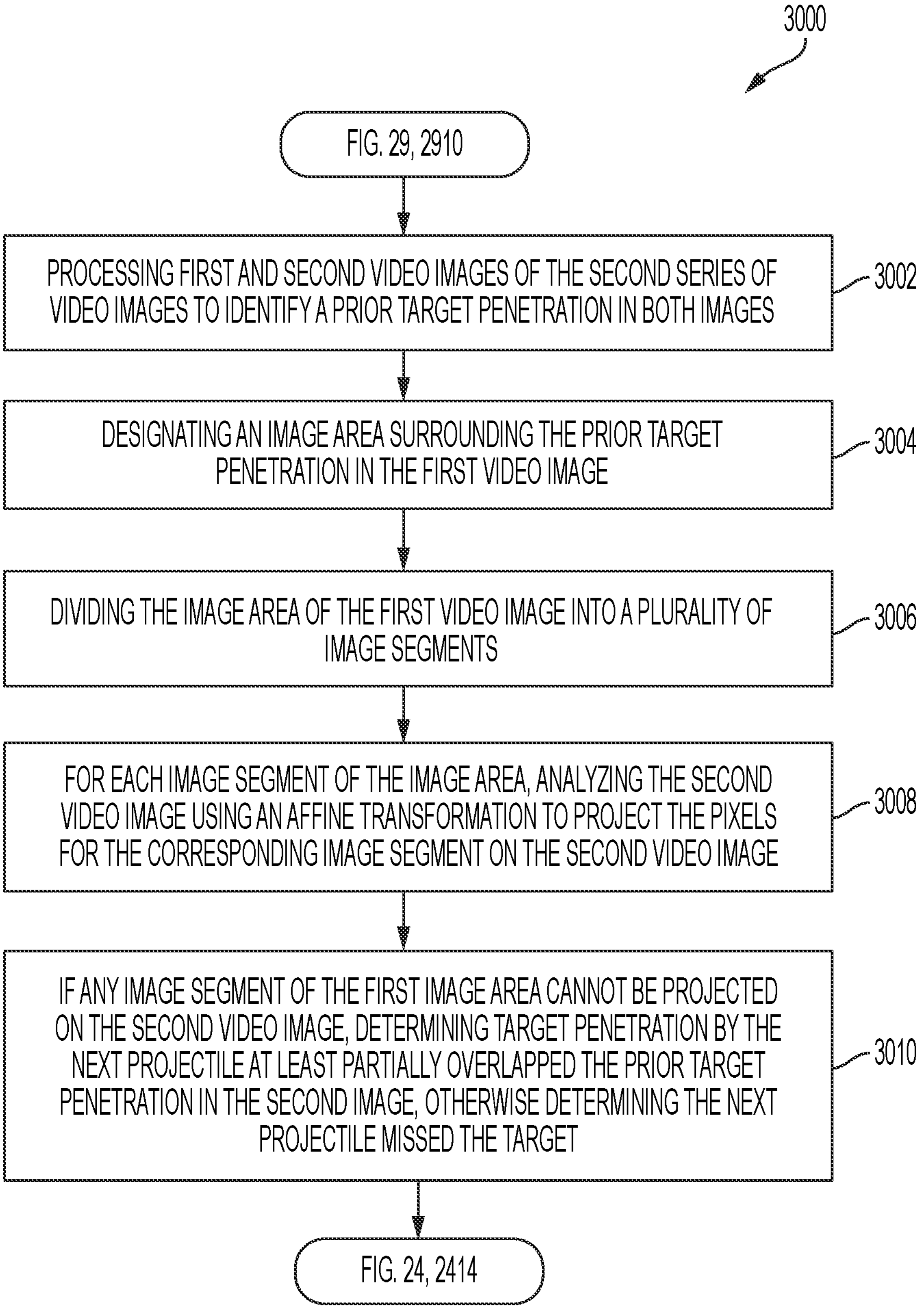
FIG. 30, in combination with FIGS. 24 and 29, provides a flowchart of yet another exemplary embodiment of a process for managing and controlling a target shooting session.

With reference to FIG. 30, yet another exemplary embodiment of a process 3000 includes the process 2400 of FIG. 24 and the process 2900 of FIG. 29. The process 3000 continues from 2910 to 3002 where, in conjunction with identifying at least one prior penetration and analyzing segments of each prior penetration, first and second video images of the second series of video images are processed to identify a prior target penetration in both images. The first video image is indicative of a previous condition of the target and the second video image is indicative of a current condition of the target. At 3004, an image area surrounding the prior target penetration is designated in the first video image. At 3006, the image area of the first video image is divided into a plurality of image segments. Each segment includes a select number of pixels. At 3008, for each image segment of the image area, analyzing the second video image using an affine transformation to project the pixels for the corresponding image segment on the second video image. At 3010, if any image segment of the image area cannot be projected on the second video image, determining target penetration by the next projectile at least partially overlapped the prior target penetration in the second image, otherwise determining the next projectile missed the target.

With continued reference to FIG. 24, another embodiment of the process 2400 also includes dismissing the difference in the consecutive video images after determining the difference was not representative of target penetration by the first projectile. Next, the processing of the series of video images is continued during the corresponding round to detect a second target area exhibiting a second difference in the consecutive video images. Then, the second target area that exhibits the second difference is analyzed to determine if the second difference is representative of target penetration by the first projectile. Next, the graphic image on the display device is updated to show a graphic target penetration by the first projectile after determining the second difference was representative of target penetration. Then, a participant score for the target shooting session is determined based at least in part on target penetration by the first projectile. Next, the graphic image on the display device is updated to show the participant score for the target shooting session based at least in part on target penetration by the first projectile.

Figure 31:
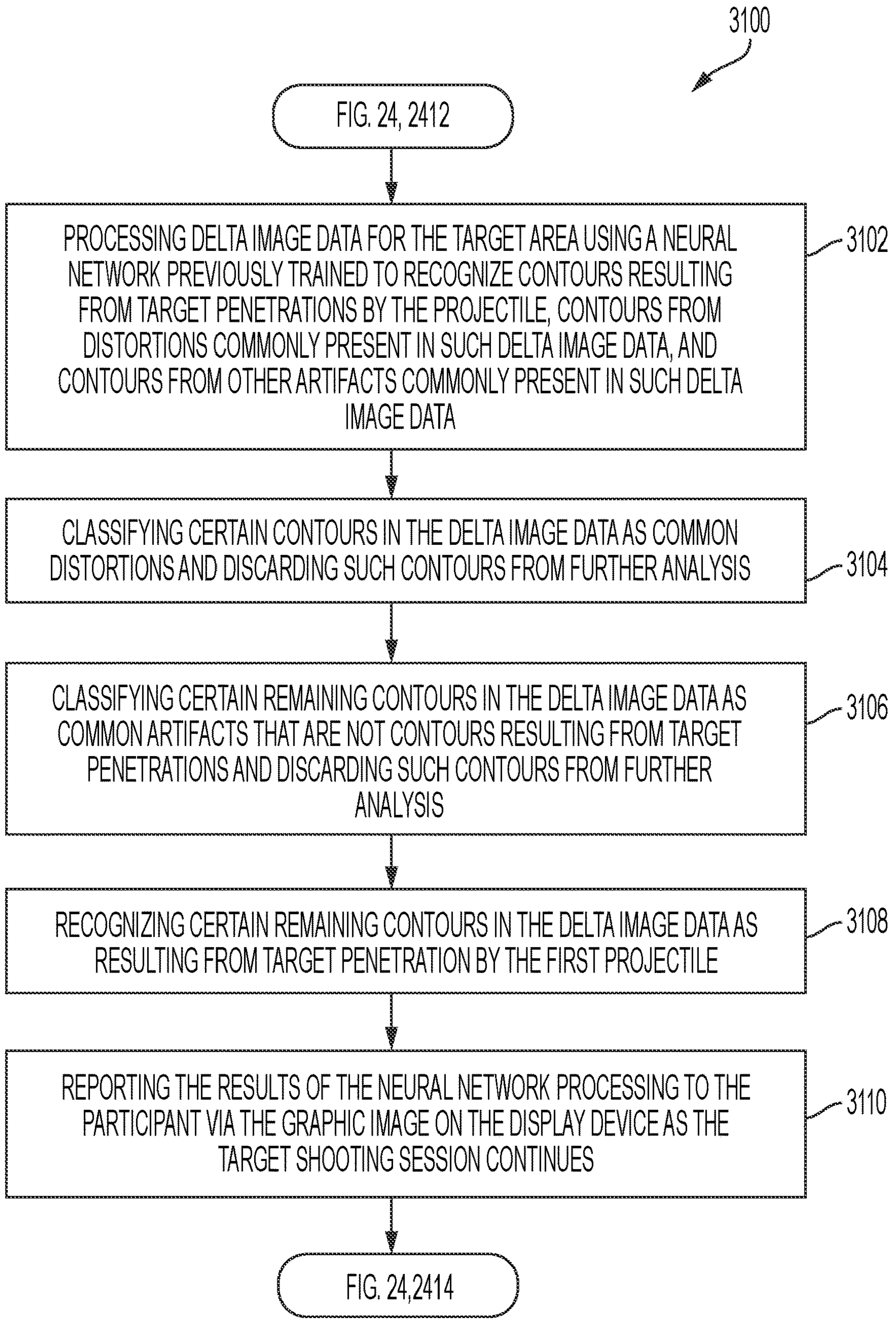
FIG. 31, in combination with FIG. 24, provides a flowchart of still another exemplary embodiment of a process for managing and controlling a target shooting session.

With reference to FIG. 31, yet another exemplary embodiment of a process 3100 includes the process 2400 of FIG. 24. The process 3100 continues from 2412 to 3102 where delta image data for the target area is processed using a neural network previously trained to recognize contours resulting from target penetrations by the projectile, contours from distortions commonly present in such delta image data, and contours from other artifacts commonly present in such delta image data. At 3104, certain contours in the delta image data are classified as common distortions. Such contours are discarded from further analysis. At 3106, certain remaining contours in the delta image data are classified as common artifacts that are not contours resulting from target penetrations. Such contours are discarded from further analysis. At 3108, certain remaining contours in the delta image data are recognized as resulting from target penetration by the first projectile. At 3110, the results of the neural network processing is reported to the participant via the graphic image on the display device as the target shooting session continues as the process 3100 continues to 2414 of FIG. 24.

In still another embodiment, the process 2400 also includes determining the first projectile missed the target after processing the series of video images for a predetermined time and finding no difference in the consecutive video images. Next, the graphic image on the display device is updated to show the first projectile was a target miss. Then, a participant score for the target shooting session is determined based at least in part on the target miss by the first projectile. Next, the graphic image on the display device is updated to show the participant score for the target shooting session based at least in part on the target miss by the first projectile.

In still yet another embodiment of the process 2400, the target shooting session is configured for a second participant such that the participant and the second participant take turns discharging at least one projectile during each round. In a further embodiment, the participant and the second participant are at a common location. In an even further embodiment, the target shooting application program on the user computing device is configured to manage and control the target shooting session for the participant and the second participant. In this embodiment, the participant and the second participant use the same target during the target shooting session. In another even further embodiment, the participant and the second participant use the same weapon during the target shooting session.

Figure 32:
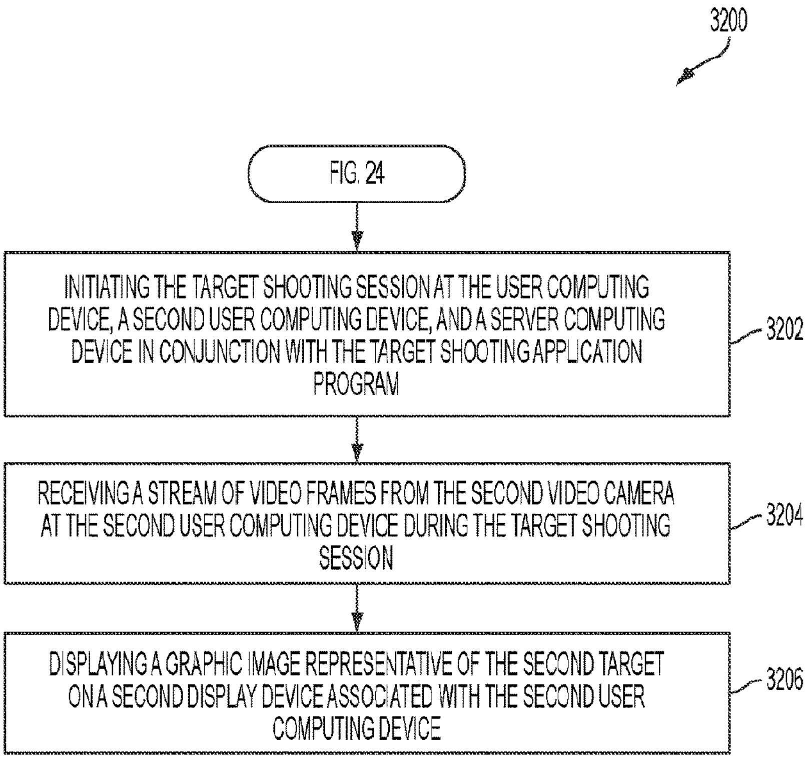
FIG. 32, in combination with FIG. 24, provides a flowchart of an exemplary embodiment of a process for managing and controlling a multiplayer target shooting session.

With reference to FIG. 32, another exemplary embodiment of a process 3200 also includes the process 2400 of FIG. 24. At 3202, in relation to 2402, the target shooting session is initiated at the user computing device, a second user computing device, and a server computing device in conjunction with the target shooting application program. The server computing device is in operative communication with the user computing device and the second user computing device via a local area network (LAN). The server computing device, in conjunction with the target shooting application program, is configured to synchronize management and control of the target shooting session with the user computing device and the second user computing device via the LAN. The second user computing device is in operative communication with a second video camera of the target shooting system. The second video camera is positioned such that a second target is within a field of view of the second video camera. The second target is releasably secured to a second target assembly of the target shooting system. At 3204, in relation to 2404, a stream of video frames is received from the second video camera at the second user computing device during the target shooting session. At 3206, in relation to 2406; a graphic image representative of the second target is displayed on a second display device associated with the second user computing device.

Figure 33:
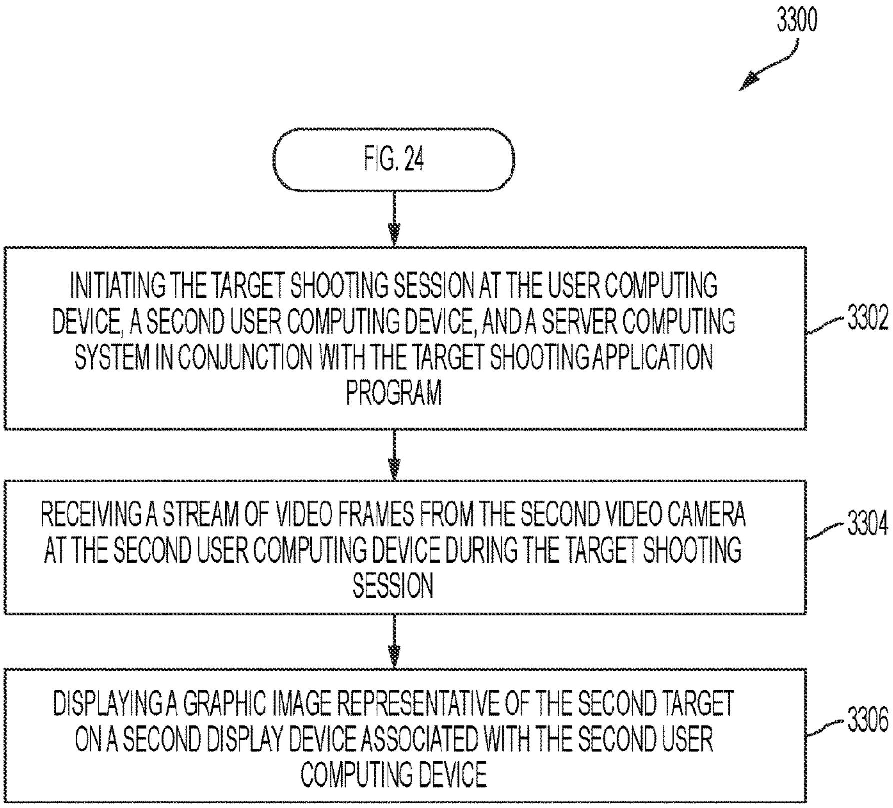
FIG. 33, in combination with FIG. 24, provides a flowchart of another exemplary embodiment of a process for managing and controlling a multiplayer target shooting session.

With reference to FIG. 33, yet another exemplary embodiment of a process 3300 also includes the process 2400 of FIG. 24. In this embodiment, the participant and the second participant are at different locations. At 3302, in relation to 2402, the target shooting session is initiated at the user computing device, a second user computing device, and a server computing system in conjunction with the target shooting application program. The server computing system is configured to host a target shooting service. The server computing system, in conjunction with the target shooting application program, is configured to manage and control the target shooting system and the target shooting service. The server computing system is in operative communication with the user computing device and the second user computing device via a wide area network (WAN). The server computing system, in conjunction with the target shooting application program, is configured to synchronize management and control of the target shooting session with the user computing device and the second user computing device via the WAN. The second user computing device is in operative communication with a second video camera of the target shooting system. The second video camera is positioned such that a second target is within a field of view of the second video camera. The second target is releasably secured to a second target assembly of the target shooting system. At 3304, in relation to 2404, a stream of video frames is received from the second video camera at the second user computing device during the target shooting session. At 3306, in relation to 2406, a graphic image representative of the second target is displayed on a second display device associated with the second user computing device.

In another embodiment of the process 3300, the server computing system is cloud-based. In yet another embodiment of the process 3300, the server computing system provides the target shooting service using a software-as-a-service (SAAS) model.

Figure 34:
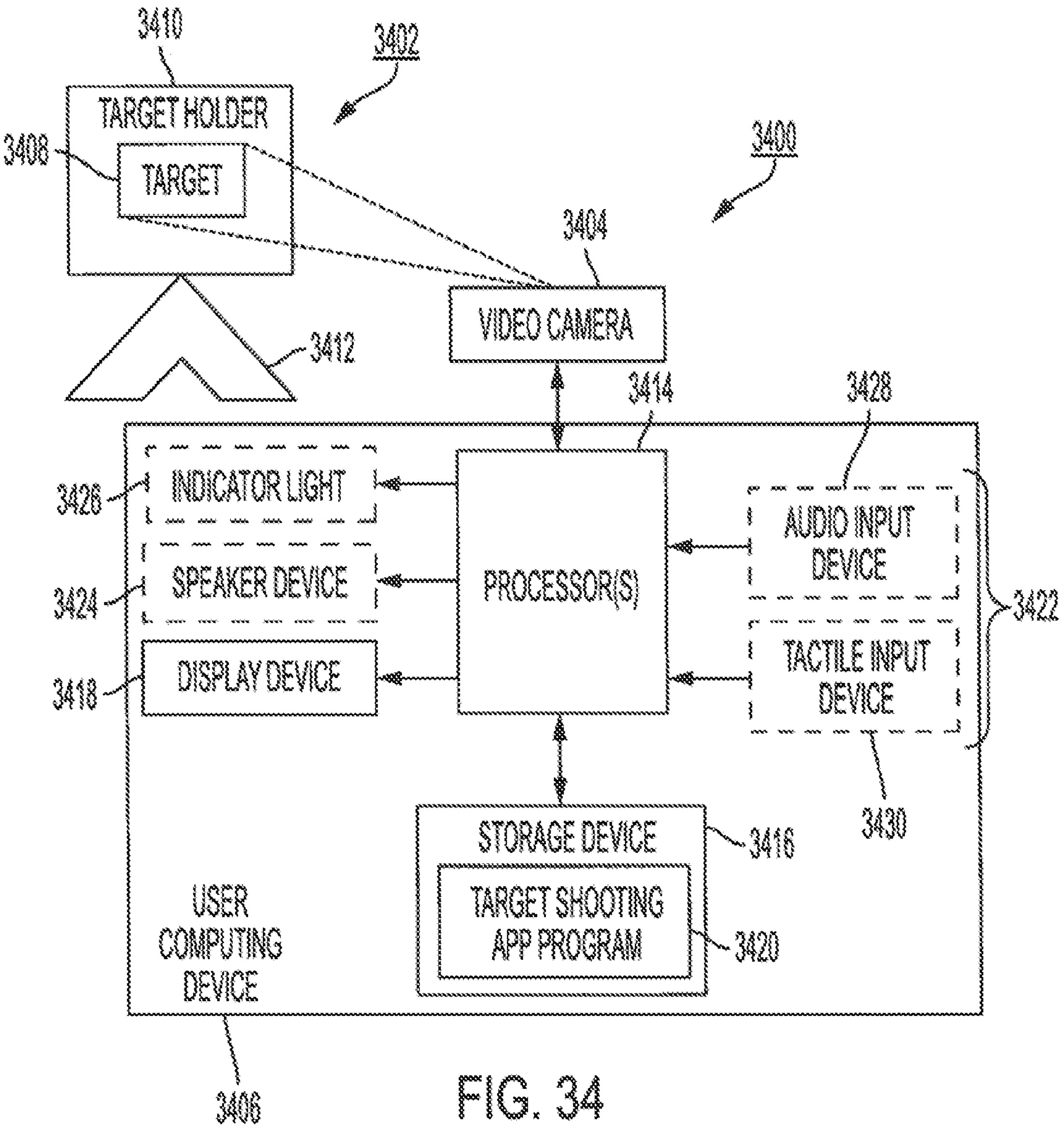
FIG. 34 is a block of an exemplary embodiment of a system for managing and controlling a target shooting session.

With reference to FIG. 34, an exemplary embodiment of a target shooting system 3400 for managing and controlling a target shooting session includes a target assembly 3402, a video camera 3404, and a user computing device 3406. The target assembly 3402 including a target 3408, a target holder 3410, and a target stand 3412. The target holder 3410 configured to releasably secure the target 3408. The target stand 3412 configured to support the target holder 3410 and to secure the target holder 3410 in a desired position. The system 3400 is configured to permit positioning of the video camera 3404 and the target assembly 3402 such that the target 3408 is within a field of view of the video camera 3404. The user computing device 3406 in operative communication with the video camera 3404 and configured to manage and control a target shooting session. The user computing device 3406 including at least one processor 3414, a storage device 3416, and a display device 3418. The storage device 3416 in operative communication with the at least one processor 3414 and storing a target shooting application program 3420. The display device 3418 in operative communication with the at least one processor 3414.

The at least one processor 3414, in conjunction with the target shooting application program 3420, is configured to initiate the target shooting session. The target shooting session includes a plurality of rounds. The system 3400 is configured to enable a participant to operate a weapon to discharge at least one projectile toward the target 3408 during each round of the target shooting session. The at least one processor 3414, in conjunction with the target shooting application program 3420, is configured to receive a stream of video frames from the video camera 3404 during the target shooting session. The at least one processor 3414, in conjunction with the target shooting application program 3420, is configured to display a graphic image representation of the target 3408 on the display device 3418. The at least one processor 3414, in conjunction with the target shooting application program 3420, is configured to process the stream of video frames to generate a series of video images of the target 3408 for the corresponding round. The at least one processor 3414, in conjunction with the target shooting application program 3420, is configured to process the series of video images to detect a target area exhibiting a difference in consecutive video images.

In another embodiment of the system 3400, the target 3408 is based on at least one of bullseye target shooting, zombie target shooting, balloon target shooting, Simon memory game play, Match Game television show play, Whac-a-Mole arcade game play, and dart game play. In yet another embodiment of the system 3400, the user computing device 3406 is at least one of a smartphone, a mobile device, a cell phone, a tablet, a portable computer, a laptop computer, and a portable computing device. In still another embodiment of the system 3400, the video camera 3404 is at least one of an internet protocol (IP) video camera, a Wi-Fi video camera, an AC-powered video camera, a battery-powered video camera, a power over Ethernet (POE) video camera, a solar-powered video camera, a webcam, a netcam, a digital video camera, a pan-tilt-zoom (PTZ) video camera, and an auto-tracking video camera. In still yet another embodiment of the system 3400, the weapon is at least one of an air gun, a pneumatic gun, a compressed gas gun, a BB gun, a pellet gun, an airsoft gun, a long gun, a carbine, a handgun, a firearm, a bow, a crossbow, and a blowgun. In another embodiment of the system 3400, the projectile is at least one of a metallic pellet, a metallic BB, a metallic ball, a slug, a kinetic projectile, an airsoft pellet, a plastic pellet, a plastic BB, a plastic ball, a biodegradable pellet, a ceramic pellet, an arrow, a bolt, and a dart.

In yet another embodiment of the system 3400, the target 3408 is secured to the target holder 3410 in a manner that resists movement of the target 3408 during the target shooting session. In still another embodiment of the system 3400, the target holder 3410 is secured to the target stand 3412 in a manner that resists movement of the target holder 3410 during the target shooting session.

In still yet another embodiment of the system 3400, the at least one processor 3414, in conjunction with the target shooting application program 3420, is configured to select the target shooting session from a plurality of target shooting sessions available to the target shooting application program 3420. In a further embodiment, the user computing device 3406 also includes an input device 3422. The at least one processor 3414, in conjunction with the target shooting application program 3420, is configured to select the target shooting session in response to a user interaction with the input device 3422. In an even further embodiment, the input device 3422 is at least one of a touchscreen, a pointing device, a mouse, a touchpad, a keyboard, and a microphone.

In another further embodiment, the at least one processor 3414, in conjunction with the target shooting application program 3420, is configured to compare at least one video image of the series of video images of the target 3408 to a plurality of pre-existing target images corresponding to the plurality of target shooting sessions available to the target shooting application program 3420. The at least one processor 3414, in conjunction with the target shooting application program 3420, is configured to select the target shooting session associated with a matching pre-existing target image based on the comparing.

In another embodiment of the system 3400, the user computing device 3406 also includes an input device 3422. The at least one processor 3414, in conjunction with the target shooting application program 3420, is configured to identify the participant for the target shooting session in response to user interaction with the input device 3422. The at least one processor 3414, in conjunction with the target shooting application program 3420, is configured to identify the weapon being used by the participant for the target shooting session in response to user interaction with the input device 3422. The at least one processor 3414, in conjunction with the target shooting application program 3420, is configured to identify the at least one projectile being used in the weapon for the target shooting session in response to user interaction with the input device 3422.

In yet another embodiment of the system 3400, the at least one processor 3414, in conjunction with the target shooting application program 3420, is configured to provide a session start cue to the participant indicating the target shooting session is ready to start. The at least one processor 3414, in conjunction with the target shooting application program 3420, is configured to start the target shooting session. The at least one processor 3414, in conjunction with the target shooting application program 3420, is configured to provide a round start cue to the participant indicating a first round of the target shooting session is ready to start. The at least one processor 3414, in conjunction with the target shooting application program 3420, is configured to start the first round of the target shooting session. In a further embodiment, the user computing device 3406 also includes a speaker device 3424 and an indicator light 3426. The session start cue includes at least one of an audible cue provided by the speaker device 3424 and a visual cue provided by one or more of the display device 3418 and the indicator light 3426.

In another further embodiment, the at least one processor 3414, in conjunction with the target shooting application program 3420, is configured to start the target shooting session in response to receiving a start acknowledgement cue originated by the participant. In an even further embodiment, the user computing device 3406 also includes an audio input device 3428 and a tactile input device 3430. The start acknowledgement cue includes at least one of an audible cue detected via the audio input device 3428 and a user interaction detected via the tactile input device 3430.

In a still further embodiment, the audible cue includes at least one of predetermined spoken command, a spoken instruction, and a spoken response to the session start cue. In another still further embodiment, the audio input device 3428 is a microphone. In yet another still further embodiment, the user interaction includes at least one of activation of a control in the graphic image on the display device 3418, activation of a control in an overlay window on the display device 3418, activation of a switch on the user computing device 3406, activation of a control on a keyboard associated with the user computing device 3406, and submission of a predetermined command, an instruction, or a response to the session start cue using the keyboard. In another still further embodiment, the tactile input device 3430 is at least one of a touchscreen, a pointing device, a mouse, a touchpad, a switch, and a keyboard.

In yet another further embodiment, the at least one processor 3414, in conjunction with the target shooting application program 3420, is configured to start the first round of the target shooting session in response to receiving a round acknowledgement cue originated by the participant. In an even further embodiment, the user computing device 3406 also includes an audio input device 3428 and a tactile input device 3430. The round acknowledgement cue includes at least one of an audible cue detected via the audio input device 3428 and a user interaction detected via the tactile input device 3430.

In still another embodiment of the system 3400, the at least one processor 3414, in conjunction with the target shooting application program 3420, is configured to filter the stream of video frames to produce a corresponding filtered stream of video frames with reduced signal noise levels. The at least one processor 3414, in conjunction with the target shooting application program 3420, is configured to identify a plurality of graphic markers on the target 3408 in the filtered stream of video frames. The plurality of graphic markers are at known locations on the target 3408. The at least one processor 3414, in conjunction with the target shooting application program 3420, is configured to process the filtered stream of video frames to produce a corresponding corrected stream of video frames with reduced distortion of the target 3408. The distortion is based on a camera central axis relating to a field of view of the video camera 3404 being offset from a target central axis. The target central axis is in perpendicular relation to a 2-dimensional plane associated with the target 3408. The correction for the distortion is based at least in part on known geometric relationships of the graphic markers in the 2-dimensional plane.

In a further embodiment, the at least one processor 3414, in conjunction with the target shooting application program 3420, is configured to save a sliding portion of video frames from the corrected stream of video frames in a first-in-first-out (FIFO) buffer. The at least one processor 3414, in conjunction with the target shooting application program 3420, is configured to partition the FIFO buffer into at least three parts such that a first group of video frames is stored in a first partition, a second group of video frames is stored in a second partition, and a third group of video frames is stored in a third partition. The at least one processor 3414, in conjunction with the target shooting application program 3420, is configured to process video frames stored in the first partition of the FIFO buffer using video compensation techniques to generate a first video image. The first video image is representative of an average of the video frames stored in the first partition and indicative of a previous condition of the target 3408. The at least one processor 3414, in conjunction with the target shooting application program 3420, is configured to process video frames stored in the second partition of the FIFO buffer using the video compensation techniques to generate a second video image. The second video image is representative of an average of the video frames stored in the second partition and indicative of a current condition of the target 3408. The at least one processor 3414, in conjunction with the target shooting application program 3420, is configured to process video frames stored in the third partition of the FIFO buffer using the video compensation techniques to generate a third video image. The third video image is representative of an average of the video frames stored in the third partition and indicative of a next condition of the target.

In an even further embodiment, the at least one processor 3414, in conjunction with the target shooting application program 3420, is configured to process the first and second video images of the series of video images using mathematical techniques to produce a delta image in which differences between the first and second video images are highlighted. The at least one processor 3414, in conjunction with the target shooting application program 3420, is configured to process the delta image using further mathematical techniques to produce an enhanced delta image in which the highlighted differences between the first and second video images are enhanced. The at least one processor 3414, in conjunction with the target shooting application program 3420, is configured to filter the enhanced delta image using threshold filtering techniques to produce a filtered delta image in which the enhanced differences between the first and second video images that are below predetermined thresholds are discarded. The at least one processor 3414, in conjunction with the target shooting application program 3420, is configured to detect artifacts in the filtered delta image. The at least one processor 3414, in conjunction with the target shooting application program 3420, is configured to identify artifacts in proximity as an artifact group. The at least one processor 3414, in conjunction with the target shooting application program 3420, is configured to designate image areas surrounding each artifact group and each artifact not represented in any artifact group as target areas exhibiting differences between the first and second video images.

In still yet another embodiment of the system 3400, the at least one processor 3414, in conjunction with the target shooting application program 3420, is configured to analyze the target area in the consecutive video images to determine if the difference is representative of target penetration by a first projectile discharged from the weapon during the corresponding round of the target shooting session.

In a further embodiment, the at least one processor 3414, in conjunction with the target shooting application program 3420, is configured to update the graphic image on the display device 3418 to show a graphic target penetration by the first projectile after determining the difference was representative of target penetration. The at least one processor 3414, in conjunction with the target shooting application program 3420, is configured to determine a participant score for the target shooting session based at least in part on target penetration by the first projectile. The at least one processor 3414, in conjunction with the target shooting application program 3420, is configured to update the graphic image on the display device 3418 to show the participant score for the target shooting session based at least in part on target penetration by the first projectile.

In an even further embodiment, the at least one processor 3414, in conjunction with the target shooting application program 3420, is configured to provide a target penetration cue to the participant indicating the first projectile penetrated the target. In a still further embodiment, the user computing device 3406 also includes a speaker device 3424 and an indicator light 3426. The target penetration cue includes at least one of an audible cue provided by the speaker device 3424 and a visual cue provided by one or more of the display device 3418 and the indicator light 3426.

In another even further embodiment, the at least one processor 3414, in conjunction with the target shooting application program 3420, is configured to provide a next round start cue to the participant indicating a next round of the target shooting session is ready to start. The at least one processor 3414, in conjunction with the target shooting application program 3420, is configured to start the second round of the target shooting session. In a still further embodiment, the at least one processor 3414, in conjunction with the target shooting application program 3420, is configured to start of the next round of the target shooting session in response to receiving a next round acknowledgement cue originated by the participant. In a yet further embodiment, the user computing device 3406 also includes a speaker device 3424 and an indicator light 3426. The next round start cue includes at least one of an audible cue provided by the speaker device 3424 and a visual cue provided by one or more of the display device 3418 and the indicator light 3426.

In another even further embodiment, the at least one processor 3414, in conjunction with the target shooting application program 3420, is configured to continue processing the series of video images during the corresponding round to detect a second target area exhibiting a second difference in the consecutive video images. The at least one processor 3414, in conjunction with the target shooting application program 3420, is configured to analyze the second target area in the consecutive video images to determine if the second difference is representative of target penetration by a second projectile discharged from the weapon during the corresponding round of the target shooting session. The at least one processor 3414, in conjunction with the target shooting application program 3420, is configured to update the graphic image on the display device 3418 to show a second graphic target penetration by the second projectile after determining the second difference was representative of target penetration. The at least one processor 3414, in conjunction with the target shooting application program 3420, is configured to determine the participant score for the target shooting session based at least in part on target penetration by the first and second projectiles. The at least one processor 3414, in conjunction with the target shooting application program 3420, is configured to update the graphic image on the display device 3418 to show a graphic indication of the participant score for the target shooting session based at least in part on target penetration by the first and second projectiles.

In yet another even further embodiment, the at least one processor 3414, in conjunction with the target shooting application program 3420, is configured to repeat the processing of the stream of video frames for each projectile discharged during each round of the target shooting session. The at least one processor 3414, in conjunction with the target shooting application program 3420, is configured to repeat the processing of the series of video images for each projectile discharged during each round of the target shooting session. The at least one processor 3414, in conjunction with the target shooting application program 3420, is configured to repeat the analyzing of the target area for each projectile discharged during each round of the target shooting session. The at least one processor 3414, in conjunction with the target shooting application program 3420, is configured to repeat the updating of the graphic image based on target penetration for each projectile discharged during each round of the target shooting session. The at least one processor 3414, in conjunction with the target shooting application program 3420, is configured to repeat the determining of the participant score for at least each round of the target shooting session. The at least one processor 3414, in conjunction with the target shooting application program 3420, is configured to repeat the updating of the graphic image based on the score for at least each round of the target shooting session.

In still another even further embodiment, the at least one processor 3414, in conjunction with the target shooting application program 3420, is configured to continue processing the stream of video frames to generate a second series of video images in conjunction with the user operating the weapon to discharge a next projectile toward the target during the target shooting session. The at least one processor 3414, in conjunction with the target shooting application program 3420, is configured to process the second series of video images to detect a second target area exhibiting a difference in consecutive video images. The at least one processor 3414, in conjunction with the target shooting application program 3420, is configured to find no difference in the consecutive video images after processing the second series of video images for a predetermined time. The at least one processor 3414, in conjunction with the target shooting application program 3420, is configured to identify at least one prior penetration of the target in each consecutive video image. The at least one processor 3414, in conjunction with the target shooting application program 3420, is configured to analyze segments of each prior penetration in the second series of video images to determine if there is an indication that target penetration by the next projectile at least partially overlaps one of the prior penetrations.

In a still further embodiment, the at least one processor 3414, in conjunction with the target shooting application program 3420, is configured to update the graphic image on the display device 3418 to show a next graphic target penetration by the next projectile after determining target penetration by the next projectile at least partially overlaps one of the prior penetrations. The at least one processor 3414, in conjunction with the target shooting application program 3420, is configured to determine the participant score for the target shooting session based at least in part on target penetration by the next projectile and prior penetrations. The at least one processor 3414, in conjunction with the target shooting application program 3420, is configured to update the graphic image on the display device 3418 to show the participant score for the target shooting session based at least in part on target penetration by the next projectile and prior penetrations.

In another still further embodiment, the at least one processor 3414, in conjunction with the target shooting application program 3420, is configured to determine the next projectile missed the target after analyzing segments of each prior penetration in the second series of video images and finding no indication that target penetration by the next projectile at least partially overlaps one of the prior penetrations. The at least one processor 3414, in conjunction with the target shooting application program 3420, is configured to update the graphic image on the display device 3418 to show the next projectile was a target miss. The at least one processor 3414, in conjunction with the target shooting application program 3420, is configured to determine the participant score for the target shooting session based at least in part on the target miss by the next projectile. The at least one processor 3414, in conjunction with the target shooting application program 3420, is configured to update the graphic image on the display device 3418 to show the participant score for the target shooting session based at least in part on the target miss by the next projectile.

The at least one processor 3414, in conjunction with the target shooting application program 3420, is configured to process first and second video images of the second series of video images to identify a prior target penetration in both images. The first video image is indicative of a previous condition of the target and the second video image is indicative of a current condition of the target. The at least one processor 3414, in conjunction with the target shooting application program 3420, is configured to designate an image area surrounding the prior target penetration in the first video image. The at least one processor 3414, in conjunction with the target shooting application program 3420, is configured to divide the image area of the first video image into a plurality of image segments. Each segment includes a select number of pixels. The at least one processor 3414, in conjunction with the target shooting application program 3420, in conjunction with the target shooting application program, is configured to analyze the second video image using an affine transformation to project the pixels for the corresponding image segment on the second video image. If any image segment of the image area cannot be projected on the second video image, the at least one processor 3414, in conjunction with the target shooting application program 3420, is configured to determine target penetration by the next projectile at least partially overlapped the prior target penetration in the second image, otherwise to determine the next projectile missed the target.

In another further embodiment, the at least one processor 3414, in conjunction with the target shooting application program 3420, is configured to dismiss the difference in the consecutive video images after determining the difference was not representative of target penetration by the first projectile. The at least one processor 3414, in conjunction with the target shooting application program 3420, is configured to continue processing the series of video images during the corresponding round to detect a second target area exhibiting a second difference in the consecutive video images. The at least one processor 3414, in conjunction with the target shooting application program 3420, is configured to analyze the second target area that exhibits the second difference to determine if the second difference is representative of target penetration by the first projectile. The at least one processor 3414, in conjunction with the target shooting application program 3420, is configured to update the graphic image on the display device 3418 to show a graphic target penetration by the first projectile after determining the second difference was representative of target penetration. The at least one processor 3414, in conjunction with the target shooting application program 3420, is configured to determine a participant score for the target shooting session based at least in part on target penetration by the first projectile. The at least one processor 3414, in conjunction with the target shooting application program 3420, is configured to update the graphic image on the display device 3418 to show the participant score for the target shooting session based at least in part on target penetration by the first projectile.

In yet another further embodiment, the at least one processor 3414, in conjunction with the target shooting application program 3420, is configured to process delta image data for the target area using a neural network previously trained to recognize contours resulting from target penetrations by the projectile, contours from distortions commonly present in such delta image data, and contours from other artifacts commonly present in such delta image data. The at least one processor 3414, in conjunction with the target shooting application program 3420, is configured to classify certain contours in the delta image data as common distortions and to discard such contours from further analysis. The at least one processor 3414, in conjunction with the target shooting application program 3420, is configured to classify certain remaining contours in the delta image data as common artifacts that are not contours resulting from target penetrations and to discard such contours from further analysis. The at least one processor 3414, in conjunction with the target shooting application program 3420, is configured to recognize certain remaining contours in the delta image data as resulting from target penetration by the first projectile. The at least one processor 3414, in conjunction with the target shooting application program 3420, is configured to report the results of the neural network processing to the participant via the graphic image on the display device 3418 as the target shooting session continues.

In another embodiment of the system 3400, the at least one processor 3414, in conjunction with the target shooting application program 3420, is configured to determine the first projectile missed the target after processing the series of video images for a predetermined time and finding no difference in the consecutive video images. The at least one processor 3414, in conjunction with the target shooting application program 3420, is configured to update the graphic image on the display device 3418 to show the first projectile was a target miss. The at least one processor 3414, in conjunction with the target shooting application program 3420, is configured to determine a participant score for the target shooting session based at least in part on the target miss by the first projectile. The at least one processor 3414, in conjunction with the target shooting application program 3420, is configured to update the graphic image on the display device 3418 to show the participant score for the target shooting session based at least in part on the target miss by the first projectile.

Figure 35:
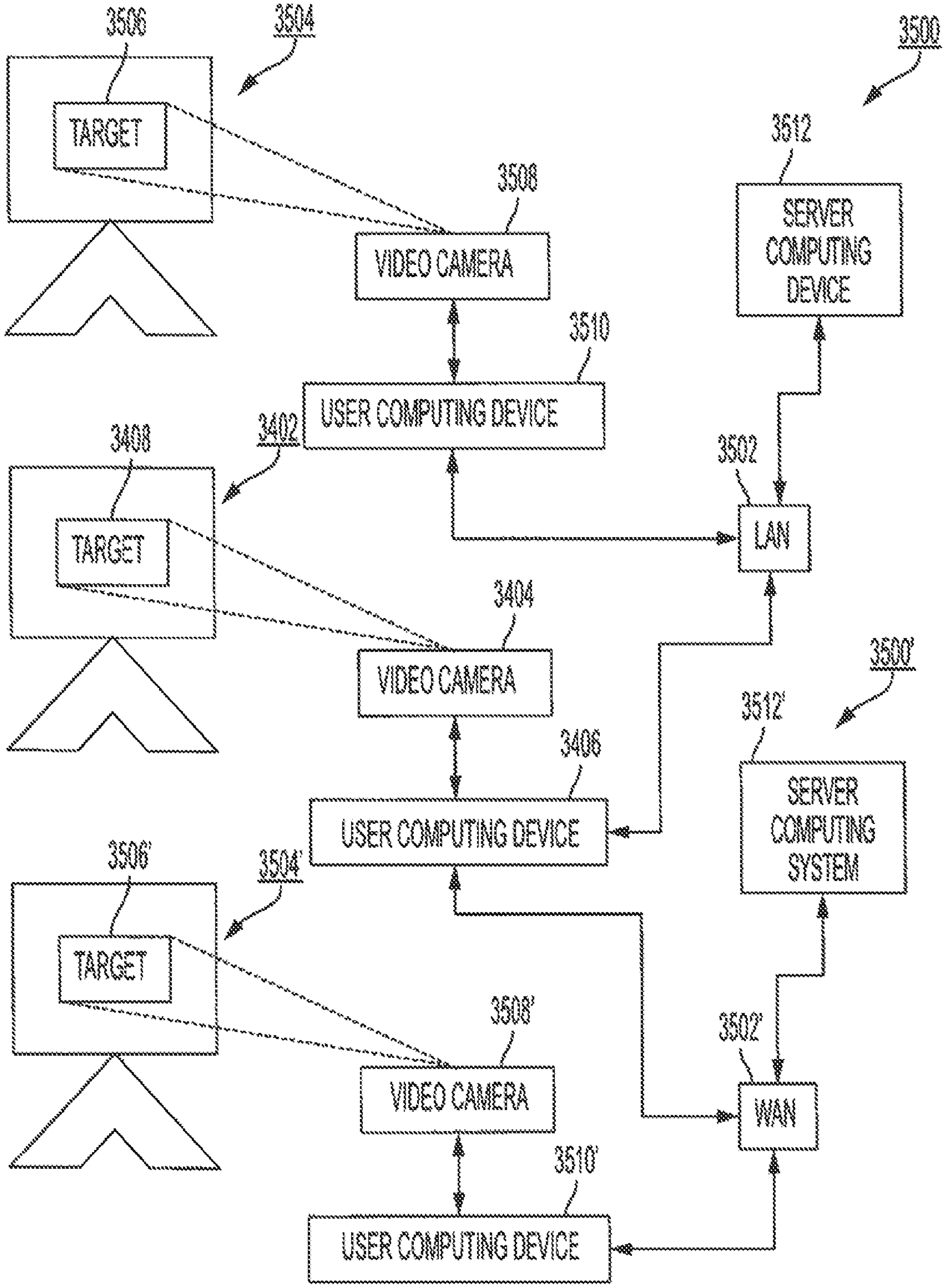
FIG. 35 is a block showing several exemplary embodiments of a system for managing and controlling a multiplayer target shooting session.

With continued reference to FIG. 34 and with reference to FIG. 35, several exemplary embodiments of the target shooting system 3400, 3500, 3500' are configured to enable a second participant to participate in the target shooting session such that the participant and the second participant take turns discharging at least one projectile during each round. In several embodiments, the system 3400, 3500 is configured to enable the participant and the second participant to participate in the target shooting session at a common location. In a further embodiment of the system 3400, the at least one processor 3414, in conjunction with the target shooting application program 3420, is configured to manage and control the target shooting session for the participant and the second participant. In this embodiment, the system 3400 is configured to enable the participant and the second participant to use the same target 3408 during the target shooting session. In another further embodiment, the system 3400 is configured to enable the participant and the second participant to use the same weapon during the target shooting session.

With continued reference to FIG. 35, another exemplary embodiment of the target shooting system 3500 includes the target assembly 3408 with the target 3408, the video camera 3404, and the user computing device 3406. The system 3500 also includes a local area network (LAN) 3502, a second target assembly 3504 configured to releasably secured to a second target 3506, a second video camera 3508, a second user computing device 3510, and a server computing device 3512. The second video camera 3508 configured to permit positioning such that the second target 3506 is within a field of view of the second video camera 3508. The second user computing device 3510 in operative communication with the second video camera 3508. The server computing device 3512 in operative communication with the user computing device 3406 and the second user computing device 3510 via the LAN 3502. The server computing device 3512, in conjunction with the target shooting application program (not shown), is configured to synchronize management and control of the target shooting session with the user computing device 3406 and the second user computing device 3510 via the LAN 3502. The system 3500, in conjunction with the target shooting application program, is configured to initiate the target shooting session at the user computing device 3406, the second user computing device 3510, and the server computing device 3512. The second user computing device 3510, in conjunction with the target shooting application program, is configured to receive a stream of video frames from the second video camera 3508 during the target shooting session. The second user computing device 3510, in conjunction with the target shooting application program, is configured to display a graphic image representative of the second target on a second display device (not shown) associated with the second user computing device 3510.

With continued reference to FIG. 35, the exemplary embodiment of the target shooting system 3500' is configured to enable the participant and the second participant to participate in the target shooting session at different locations. The system 3500' includes the target assembly 3408 with the target 3408, the video camera 3404, and the user computing device 3406. The system 3500' also includes a wide area network (WAN) 3502', a second target assembly 3504' configured to releasably secured to a second target 3506', a second video camera 3508', a second user computing device 3510', and a server computing system 3512'. The second video camera 3508' configured to permit positioning such that the second target 3506' is within a field of view of the second video camera 3508'. The second user computing device 3510' in operative communication with the second video camera 3508'. The server computing system 3512' in operative communication with the user computing device 3406 and the second user computing device 3510' via the WAN 3502'. The server computing system 3512' is configured to host a target shooting service. The server computing system 3512', in conjunction with the target shooting application program (not shown), is configured to manage and control the target shooting system 3500' and the target shooting service. The server computing system 3512', in conjunction with the target shooting application program, is configured to synchronize management and control of the target shooting session with the user computing device 3406 and the second user computing device 3510' via the WAN 3502'. The system 3500', in conjunction with the target shooting application program, is configured to initiate the target shooting session at the user computing device 3406, the second user computing device 3510', and the server computing system 3512'. The second user computing device 3510', in conjunction with the target shooting application program, is configured to receive a stream of video frames from the second video camera 3508' at the second user computing device 3510' during the target shooting session. The second user computing device 3510', in conjunction with the target shooting application program, is configured to display a graphic image representative of the second target 3506' on a second display device (not shown) associated with the second user computing device 3510'. In another embodiment of the system 3500', the server computing system 3512' is cloud-based.

Figure 36:
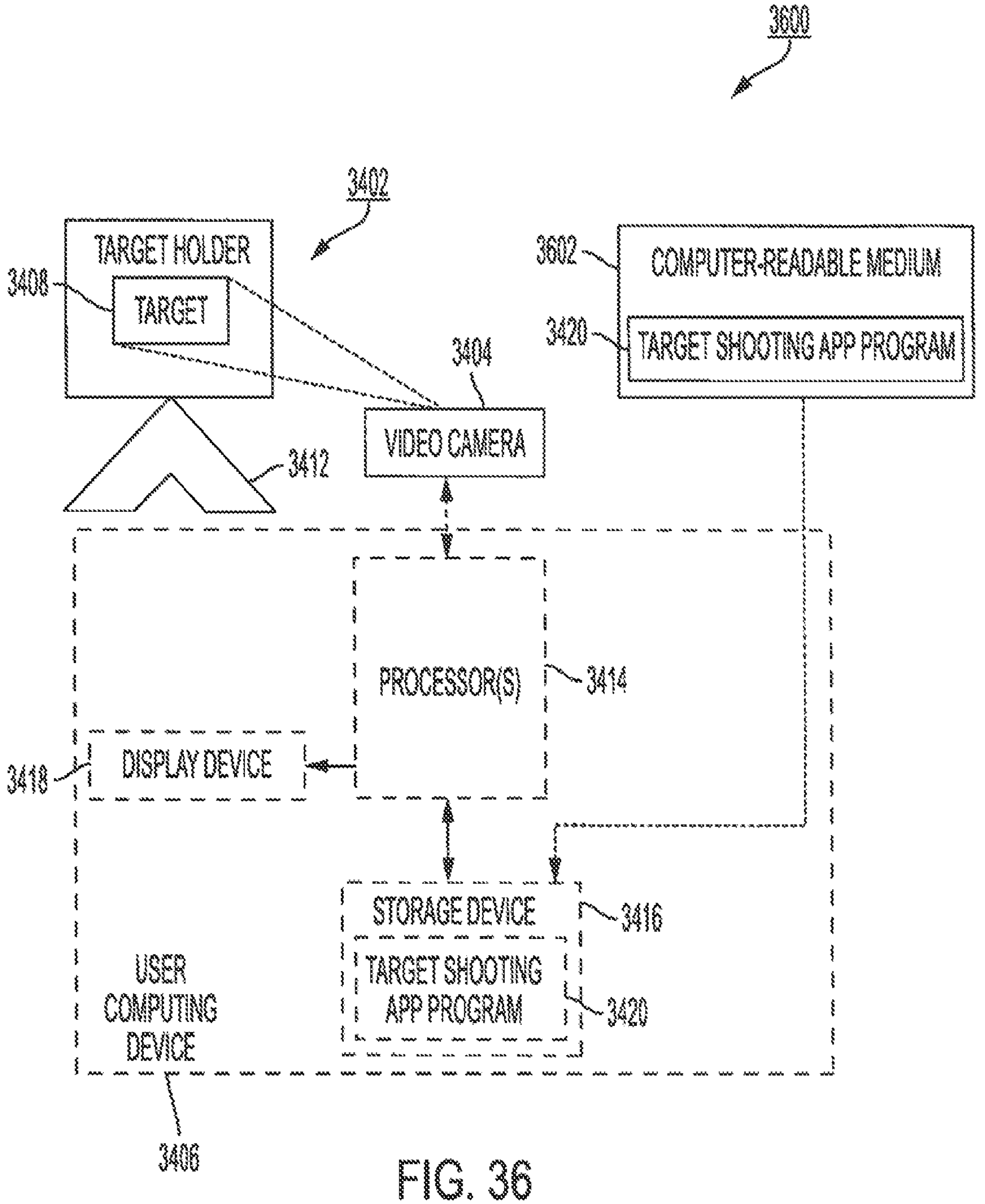
FIG. 36 is a block of another exemplary embodiment of a system for managing and controlling a target shooting session.

With reference to FIG. 36, an exemplary embodiment of a target shooting system 3600 for managing and controlling a target shooting session includes the target assembly 3402, the video camera 3404, and a non-transitory computer-readable medium 3602. The target assembly 3402 including the target 3408, the target holder 3410, and the target stand 3412. The target holder 3410 configured to releasably secure the target 3408. The target stand 3412 configured to support the target holder 3410 and to secure the target holder 3410 in a desired position. The system 3600 is configured to permit positioning of the video camera 3404 and the target assembly 3402 such that the target 3408 is within a field of view of the video camera 3404. The non-transitory computer-readable medium 3602 storing a target shooting application program 3420 that, when executed by at least one processor 3414, cause a user computing device 3406 in operative communication with the video camera 3404 to perform a method for managing and controlling a target shooting session.

In an exemplary embodiment, the method includes initiating the target shooting session. The target shooting session includes a plurality of rounds. The system 3600 is configured to enable a participant to operate a weapon to discharge at least one projectile toward the target 3408 during each round of the target shooting session. Next, the method includes receiving a stream of video frames from the video camera 3404 during the target shooting session. Then, the method includes displaying a graphic image representative of the target 3408 on a display device 3418 associated with the user computing device 3406. Next, the method includes processing the stream of video frames to generate a series of video images of the target 3408 for the corresponding round. Then, the method includes processing the series of video images to detect a target area exhibiting a difference in consecutive video images. Next, the method includes analyzing, the target area in the consecutive video images to determine if the difference is representative of target penetration by a first projectile discharged from the weapon during the corresponding round of the target shooting session. Then, the method includes updating the graphic image on the display device 3418 to show a graphic target penetration by the first projectile after determining the difference was representative of target penetration. Next, the method includes determining a participant score for the target shooting session based at least in part on target penetration by the first projectile. Then, the method includes updating the graphic image on the display device 3418 to show the participant score for the target shooting session based at least in part on target penetration by the first projectile.

With reference to FIGS. 24-36, various exemplary embodiments of non-transitory computer-readable medium storing program instructions that, when executed by at least one processor 3414, cause a corresponding user computing device (e.g., 3406, 3510, 3510') to perform a method for managing and controlling a target shooting session. For example, various embodiments of target shooting systems (e.g., 3400, 3500, 3500', 3600) are described above with reference to FIGS. 34-36. Various embodiments of the method for managing and controlling a target shooting session are described above with reference to FIGS. 24-33. In other words, the program instructions of the various exemplary embodiments of non-transitory computer-readable medium are defined by any suitable combination of the processes 2400, 2500, 2600, 2700, 2800, 2900, 3000, 3100, 3200, 3300 described above with reference to FIGS. 24-33. Similarly, the at least one processor 3414 associated with the various exemplary embodiments of non-transitory computer-readable medium are defined by any suitable combination of the target shooting systems 3400, 3500, 3500', 3600 described above with reference to FIGS. 34-36.

Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiments also relate to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

A computer-readable medium or machine-readable medium includes any mechanism for storing or transmitting information in a form readable by a machine (e.g., computing platform, user computing device, or any suitable computer or computing device). For instance, a computer-readable medium includes read only memory (ROM); random access memory (RAM); magnetic disk storage media; optical storage media; flash memory devices; and electrical, optical, acoustical, or other form of propagated signals (e.g., carrier waves, infrared signals, digital signals, etc.), just to mention a few examples.

The methods illustrated throughout the specification, may be implemented in a computer program product that may be executed by one or more processors on one or more computing devices. The computer program product may comprise a non-transitory computer-readable medium on which a computer program is stored, such as a disk, hard drive, or the like. Common forms of a non-transitory computer-readable medium include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use computer programs.

The exemplary embodiments have been described with reference to certain combinations of elements, components, and features. Obviously, modifications and alterations will occur to others upon reading and understanding the preceding detailed description. It will be appreciated that variants of the above-disclosed and other features and functions, or alternatives thereof, may be combined into many other different systems or applications. It is intended that the exemplary embodiments be construed as including all such modifications and alterations insofar as they come within the scope of the appended claims or the equivalents thereof. Various presently unforeseen or unanticipated alternatives, modifications, variations, or improvements therein may be subsequently made by those skilled in the art which are also intended to be encompassed by the following claims.

What is claimed is:

1. A method for managing and controlling a target shooting session, comprising:

initiating a target shooting session at a user computing device in conjunction with a target shooting application program, wherein the user computing device is in operative communication with a video camera of a target shooting system, wherein the video camera is positioned such that a target is within a field of view of the video camera, wherein the target is releasably secured to a target assembly of the target shooting system, wherein the target shooting session includes a plurality of rounds, wherein a participant operates a weapon to discharge at least one projectile toward the target during each round of the target shooting session;

receiving a stream of video frames from the video camera at the user computing device during the target shooting session;

displaying a graphic image representative of the target on a display device associated with the user computing device;

processing the stream of video frames to generate a series of video images of the target for the corresponding round including:

filtering the stream of video frames to produce a corresponding filtered stream of video frames with reduced signal noise levels;

identifying a plurality of graphic markers on the target in the filtered stream of video frames, wherein the plurality of graphic markers are at known locations on the target; and processing the filtered stream of video frames to produce a corresponding corrected stream of video frames with reduced distortion of the target, wherein the distortion is based on a camera central axis relating to a field of view of the video camera being offset from a target central axis, wherein the target central axis is in perpendicular relation to a 2-dimensional plane associated with the target, wherein correction for the distortion is based at least in part on known geometric relationships of the graphic markers in the 2-dimensional plane; and processing the series of video images to detect a target area exhibiting a difference in consecutive video images.

2. The method of claim 1, in conjunction with displaying the graphic image of the target, the method further comprising:

providing a session start cue to the participant indicating the target shooting session is ready to start;

starting the target shooting session;

providing a round start cue to the participant indicating a first round of the target shooting session is ready to start; and starting the first round of the target shooting session.

3. The method of claim 1, in conjunction with generating the series of video images, the method further comprising:

saving a sliding portion of video frames from the corrected stream of video frames in a first-in-first-out (FIFO) buffer;

partitioning the FIFO buffer into at least three parts such that a first group of video frames is stored in a first partition, a second group of video frames is stored in a second partition, and a third group of video frames is stored in a third partition;

processing video frames stored in the first partition of the FIFO buffer using video compensation techniques to generate a first video image, wherein the first video image is representative of an average of the video frames stored in the first partition and indicative of a previous condition of the target;

processing video frames stored in the second partition of the FIFO buffer using the video compensation techniques to generate a second video image, wherein the second video image is representative of an average of the video frames stored in the second partition and indicative of a current condition of the target; and processing video frames stored in the third partition of the FIFO buffer using the video compensation techniques to generate a third video image, wherein the third video image is representative of an average of the video frames stored in the third partition and indicative of a next condition of the target.

4. The method of claim 1, further comprising:

analyzing the target area in the consecutive video images to determine if the difference is representative of target penetration by a first projectile discharged from the weapon during the corresponding round of the target shooting session;

updating the graphic image on the display device to show a graphic target penetration by the first projectile after determining the difference was representative of target penetration;

determining a participant score for the target shooting session based at least in part on target penetration by the first projectile;

updating the graphic image on the display device to show the participant score for the target shooting session based at least in part on target penetration by the first projectile;

continuing to process the stream of video frames to generate a second series of video images in conjunction with the user operating the weapon to discharge a next projectile toward the target during the target shooting session;

processing the second series of video images to detect a second target area exhibiting a difference in consecutive video images;

finding no difference in the consecutive video images after processing the second series of video images for a predetermined time;

identifying at least one prior penetration of the target in each consecutive video image; and analyzing segments of each prior penetration in the second series of video images to determine if there is an indication that target penetration by the next projectile at least partially overlaps one of the prior penetrations.

5. The method of claim 4, further comprising:

determining the next projectile missed the target after analyzing segments of each prior penetration in the second series of video images and finding no indication that target penetration by the next projectile at least partially overlaps one of the prior penetrations;

updating the graphic image on the display device to show the next projectile was a target miss;

determining the participant score for the target shooting session based at least in part on the target miss by the next projectile; and updating the graphic image on the display device to show the participant score for the target shooting session based at least in part on the target miss by the next projectile.

6. The method of claim 1, further comprising:

analyzing the target area in the consecutive video images to determine if the difference is representative of target penetration by a first projectile discharged from the weapon during the corresponding round of the target shooting session;

dismissing the difference in the consecutive video images after determining the difference was not representative of target penetration by the first projectile;

continuing to process the series of video images during the corresponding round to detect a second target area exhibiting a second difference in the consecutive video images;

analyzing the second target area that exhibits the second difference to determine if the second difference is representative of target penetration by the first projectile;

updating the graphic image on the display device to show a graphic target penetration by the first projectile after determining the second difference was representative of target penetration;

determining a participant score for the target shooting session based at least in part on target penetration by the first projectile; and updating the graphic image on the display device to show the participant score for the target shooting session based at least in part on target penetration by the first projectile.

7. The method of claim 1, in conjunction with analyzing the target area, the method further comprising:

analyzing the target area in the consecutive video images to determine if the difference is representative of target penetration by a first projectile discharged from the weapon during the corresponding round of the target shooting session;

processing delta image data for the target area using a neural network previously trained to recognize contours resulting from target penetrations by the projectile, contours from distortions commonly present in such delta image data, and contours from other artifacts commonly present in such delta image data;

classifying certain contours in the delta image data as common distortions and discarding such contours from further analysis;

classifying certain remaining contours in the delta image data as common artifacts that are not contours resulting from target penetrations and discarding such contours from further analysis;

recognizing certain remaining contours in the delta image data as resulting from target penetration by the first projectile; and reporting the results of the neural network processing to the participant via the graphic image on the display device as the target shooting session continues.

8. The method of claim 1, further comprising:

determining the first projectile missed the target after processing the series of video images for a predetermined time and finding no difference in the consecutive video images;

updating the graphic image on the display device to show the first projectile was a target miss;

determining a participant score for the target shooting session based at least in part on the target miss by the first projectile; and updating the graphic image on the display device to show the participant score for the target shooting session based at least in part on the target miss by the first projectile.

9. The method of claim 1 wherein the target shooting session is configured for a second participant such that the participant and the second participant take turns discharging at least one projectile during each round and wherein the participant and the second participant are at a common location, the method, further comprising:

initiating the target shooting session at the user computing device, a second user computing device, and a server computing device in conjunction with the target shooting application program, wherein the server computing device is in operative communication with the user computing device and the second user computing device via a local area network (LAN), wherein the server computing device, in conjunction with the target shooting application program, is configured to synchronize management and control of the target shooting session with the user computing device and the second user computing device via the LAN, wherein the second user computing device is in operative communication with a second video camera of the target shooting system, wherein the second video camera is positioned such that a second target is within a field of view of the second video camera, wherein the second target is releasably secured to a second target assembly of the target shooting system;

receiving a stream of video frames from the second video camera at the second user computing device during the target shooting session; and displaying a graphic image representative of the second target on a second display device associated with the second user computing device.

10. The method of claim 1 wherein the target shooting session is configured for a second participant such that the participant and the second participant take turns discharging at least one projectile during each round and wherein the participant and the second participant are at different locations, the method further comprising:

initiating the target shooting session at the user computing device, a second user computing device, and a server computing system in conjunction with the target shooting application program, wherein the server computing system is configured to host a target shooting service, wherein the server computing system, in conjunction with the target shooting application program, is configured to manage and control the target shooting system and the target shooting service, wherein the server computing system is in operative communication with the user computing device and the second user computing device via a wide area network (WAN), wherein the server computing system, in conjunction with the target shooting application program, is configured to synchronize management and control of the target shooting session with the user computing device and the second user computing device via the WAN, wherein the second user computing device is in operative communication with a second video camera of the target shooting system, wherein the second video camera is positioned such that a second target is within a field of view of the second video camera, wherein the second target is releasably secured to a second target assembly of the target shooting system;

receiving a stream of video frames from the second video camera at the second user computing device during the target shooting session; and displaying a graphic image representative of the second target on a second display device associated with the second user computing device.

11. A system for managing and controlling a target shooting session, comprising:

a target assembly, comprising:

a target;

a target holder configured to releasably secure the target; and a target stand configured to support the target holder and to secure the target holder in a desired position;

a video camera, wherein the system is configured to permit positioning of the video camera and the target assembly such that the target is within a field of view of the video camera; and a user computing device in operative communication with the video camera and configured to manage and control a target shooting session, the user computing device comprising:

at least one processor;

a storage device in operative communication with the at least one processor and storing a target shooting application program; and a display device in operative communication with the at least one processor;

wherein the at least one processor, in conjunction with the target shooting application program, is configured to initiate the target shooting session, wherein the target shooting session includes a plurality of rounds, wherein the system is configured to enable a participant to operate a weapon to discharge at least one projectile toward the target during each round of the target shooting session;

wherein the at least one processor, in conjunction with the target shooting application program, is configured to receive a stream of video frames from the video camera during the target shooting session;

wherein the at least one processor, in conjunction with the target shooting application program, is configured to display a graphic image representation of the target on the display device;

wherein the at least one processor, in conjunction with the target shooting application program, is configured to process the stream of video frames to generate a series of video images of the target for the corresponding round;

wherein the at least one processor, in conjunction with the target shooting application program, is configured to process the series of video images to detect a target area exhibiting a difference in consecutive video images;

wherein the target shooting session is configured for a second participant such that the participant and the second participant take turns discharging at least one projectile during each round and wherein the participant and the second participant are at a common location, the least one processor being further configured to:

initiate the target shooting session at the user computing device, a second user computing device, and a server computing device in conjunction with the target shooting application program, wherein the server computing device is in operative communication with the user computing device and the second user computing device via a local area network (LAN), wherein the server computing device, in conjunction with the target shooting application program, is configured to synchronize management and control of the target shooting session with the user computing device and the second user computing device via the LAN, wherein the second user computing device is in operative communication with a second video camera of the target shooting system, wherein the second video camera is positioned such that a second target is within a field of view of the second video camera, wherein the second target is releasably secured to a second target assembly of the target shooting system;

receive a stream of video frames from the second video camera at the second user computing device during the target shooting session; and display a graphic image representative of the second target on a second display device associated with the second user computing device.

12. The system of claim 11 wherein the at least one processor, in conjunction with the target shooting application program, is configured to filter the stream of video frames to produce a corresponding filtered stream of video frames with reduced signal noise levels;

wherein the at least one processor, in conjunction with the target shooting application program, is configured to identify a plurality of graphic markers on the target in the filtered stream of video frames, wherein the plurality of graphic markers are at known locations on the target;

wherein the at least one processor, in conjunction with the target shooting application program, is configured to process the filtered stream of video frames to produce a corresponding corrected stream of video frames with reduced distortion of the target, wherein the distortion is based on a camera central axis relating to a field of view of the video camera being offset from a target central axis, wherein the target central axis is in perpendicular relation to a 2-dimensional plane associated with the target, wherein correction for the distortion is based at least in part on known geometric relationships of the graphic markers in the 2-dimensional plane.

13. The system of claim 12 wherein the at least one processor, in conjunction with the target shooting application program, is configured to save a sliding portion of video frames from the corrected stream of video frames in a first-in-first-out (FIFO) buffer;

wherein the at least one processor, in conjunction with the target shooting application program, is configured to partition the FIFO buffer into at least three parts such that a first group of video frames is stored in a first partition, a second group of video frames is stored in a second partition, and a third group of video frames is stored in a third partition;

wherein the at least one processor, in conjunction with the target shooting application program, is configured to process video frames stored in the first partition of the FIFO buffer using video compensation techniques to generate a first video image, wherein the first video image is representative of an average of the video frames stored in the first partition and indicative of a previous condition of the target;

wherein the at least one processor, in conjunction with the target shooting application program, is configured to process video frames stored in the second partition of the FIFO buffer using the video compensation techniques to generate a second video image, wherein the second video image is representative of an average of the video frames stored in the second partition and indicative of a current condition of the target;

wherein the at least one processor, in conjunction with the target shooting application program, is configured to process video frames stored in the third partition of the FIFO buffer using the video compensation techniques to generate a third video image, wherein the third video image is representative of an average of the video frames stored in the third partition and indicative of a next condition of the target.

14. The system of claim 13 wherein the at least one processor, in conjunction with the target shooting application program, is configured to process the first and second video images of the series of video images using mathematical techniques to produce a delta image in which differences between the first and second video images are highlighted;

wherein the at least one processor, in conjunction with the target shooting application program, is configured to process the delta image using further mathematical techniques to produce an enhanced delta image in which the highlighted differences between the first and second video images are enhanced;

wherein the at least one processor, in conjunction with the target shooting application program, is configured to filter the enhanced delta image using threshold filtering techniques to produce a filtered delta image in which the enhanced differences between the first and second video images that are below predetermined thresholds are discarded;

wherein the at least one processor, in conjunction with the target shooting application program, is configured to detect artifacts in the filtered delta image;

wherein the at least one processor, in conjunction with the target shooting application program, is configured to identify artifacts in proximity as an artifact group;

wherein the at least one processor, in conjunction with the target shooting application program, is configured to designate image areas surrounding each artifact group and each artifact not represented in any artifact group as target areas exhibiting differences between the first and second video images.

15. The system of claim 11 wherein the at least one processor, in conjunction with the target shooting application program, is configured to analyze the target area in the consecutive video images to determine if the difference is representative of target penetration by a first projectile discharged from the weapon during the corresponding round of the target shooting session;

wherein the at least one processor, in conjunction with the target shooting application program, is configured to update the graphic image on the display device to show a graphic target penetration by the first projectile after determining the difference was representative of target penetration;

wherein the at least one processor, in conjunction with the target shooting application program, is configured to determine a participant score for the target shooting session based at least in part on target penetration by the first projectile;

wherein the at least one processor, in conjunction with the target shooting application program, is configured to update the graphic image on the display device to show the participant score for the target shooting session based at least in part on target penetration by the first projectile;

wherein the at least one processor, in conjunction with the target shooting application program, is configured to continue processing the stream of video frames to generate a second series of video images in conjunction with the user operating the weapon to discharge a next projectile toward the target during the target shooting session;

wherein the at least one processor, in conjunction with the target shooting application program, is configured to process the second series of video images to detect a second target area exhibiting a difference in consecutive video images;

wherein the at least one processor, in conjunction with the target shooting application program, is configured to find no difference in the consecutive video images after processing the second series of video images for a predetermined time;

wherein the at least one processor, in conjunction with the target shooting application program, is configured to identify at least one prior penetration of the target in each consecutive video image;

wherein the at least one processor, in conjunction with the target shooting application program, is configured to analyze segments of each prior penetration in the second series of video images to determine if there is an indication that target penetration by the next projectile at least partially overlaps one of the prior penetrations.

16. The system of claim 15 wherein the at least one processor, in conjunction with the target shooting application program, is configured to process first and second video images of the second series of video images to identify a prior target penetration in both images, wherein the first video image is indicative of a previous condition of the target and the second video image is indicative of a current condition of the target;

wherein the at least one processor, in conjunction with the target shooting application program, is configured to designate an image area surrounding the prior target penetration in the first video image;

wherein the at least one processor, in conjunction with the target shooting application program, is configured to divide the image area of the first video image into a plurality of image segments, wherein each segment includes a select number of pixels;

wherein, for each image segment of the image area, the at least one processor, in conjunction with the target shooting application program, is configured to analyze the second video image using an affine transformation to project the pixels for the corresponding image segment on the second video image;

wherein, if any image segment of the image area cannot be projected on the second video image, the at least one processor, in conjunction with the target shooting application program, is configured to determine target penetration by the next projectile at least partially overlapped the prior target penetration in the second image, otherwise to determine the next projectile missed the target.

17. The system of claim 11 wherein the system is configured to enable a second participant to participate in the target shooting session such that the participant and the second participant take turns discharging at least one projectile during each round;

wherein the system is configured to enable the participant and the second participant to participate in the target shooting session at a common location, the system further comprising:

a local area network (LAN);

a second target assembly configured to releasably secured to a second target;

a second video camera configured to permit positioning such that the second target is within a field of view of the second video camera;

a second user computing device in operative communication with the second video camera;

a server computing device in operative communication with the user computing device and the second user computing device via the LAN, wherein the server computing device, in conjunction with the target shooting application program, is configured to synchronize management and control of the target shooting session with the user computing device and the second user computing device via the LAN;

wherein the system, in conjunction with the target shooting application program, is configured to initiate the target shooting session at the user computing device, the second user computing device, and the server computing device;

wherein the second user computing device, in conjunction with the target shooting application program, is configured to receive a stream of video frames from the second video camera during the target shooting session;

wherein the second user computing device, in conjunction with the target shooting application program, is configured to display a graphic image representative of the second target on a second display device associated with the second user computing device.

18. The system of claim 11 wherein the system is configured to enable a second participant to participate in the target shooting session such that the participant and the second participant take turns discharging at least one projectile during each round;

wherein the system is configured to enable the participant and the second participant to participate in the target shooting session at different locations, the system further comprising:

a wide area network (WAN);

a second target assembly configured to releasably secured to a second target;

a second video camera configured to permit positioning such that the second target is within a field of view of the second video camera;

a second user computing device in operative communication with the second video camera;

a server computing system in operative communication with the user computing device and the second user computing device via the WAN, wherein the server computing system is configured to host a target shooting service, wherein the server computing system, in conjunction with the target shooting application program, is configured to manage and control the target shooting system and the target shooting service, wherein the server computing system, in conjunction with the target shooting application program, is configured to synchronize management and control of the target shooting session with the user computing device and the second user computing device via the WAN;

wherein the system, in conjunction with the target shooting application program, is configured to initiate the target shooting session at the user computing device, the second user computing device, and the server computing system;

wherein the second user computing device, in conjunction with the target shooting application program, is configured to receive a stream of video frames from the second video camera at the second user computing device during the target shooting session;

wherein the second user computing device, in conjunction with the target shooting application program, is configured to display a graphic image representative of the second target on a second display device associated with the second user computing device.

19. A system for managing and controlling a target shooting session, comprising:

a target assembly, comprising:

a target;

a target holder configured to releasably secure the target; and a target stand configured to support the target holder and to secure the target holder in a desired position;

a video camera, wherein the system is configured to permit positioning of the video camera and the target assembly such that the target is within a field of view of the video camera; and a non-transitory computer-readable medium storing a target shooting application program that, when executed by at least one processor, cause a user computing device in operative communication with the video camera to perform a method for managing and controlling a target shooting session, the method comprising:

initiating the target shooting session, wherein the target shooting session includes a plurality of rounds, wherein the system is configured to enable a participant to operate a weapon to discharge at least one projectile toward the target during each round of the target shooting session;

receiving a stream of video frames from the video camera during the target shooting session;

displaying a graphic image representative of the target on a display device associated with the user computing device;

processing the stream of video frames to generate a series of video images of the target for the corresponding round;

processing the series of video images to detect a target area exhibiting a difference in consecutive video images;

analyzing the target area in the consecutive video images to determine if the difference is representative of target penetration by a first projectile discharged from the weapon during the corresponding round of the target shooting session;

updating the graphic image on the display device to show a graphic target penetration by the first projectile after determining the difference was representative of target penetration;

determining a participant score for the target shooting session based at least in part on target penetration by the first projectile;

updating the graphic image on the display device to show the participant score for the target shooting session based at least in part on target penetration by the first projectile;

continuing to process the stream of video frames to generate a second series of video images in conjunction with the user operating the weapon to discharge a next projectile toward the target during the target shooting session;

processing the second series of video images to detect a second target area exhibiting a difference in consecutive video images;

finding no difference in the consecutive video images after processing the second series of video images for a predetermined time;

identifying at least one prior penetration of the target in each consecutive video image; and analyzing segments of each prior penetration in the second series of video images to determine if there is an indication that target penetration by the next projectile at least partially overlaps one of the prior penetrations.

* * * * *